(12) United States Patent
Florissi et al.

(10) Patent No.: US 10,366,111 B1
(45) Date of Patent: Jul. 30, 2019

(54) SCALABLE DISTRIBUTED COMPUTATIONS UTILIZING MULTIPLE DISTINCT COMPUTATIONAL FRAMEWORKS

(71) Applicant: EMC IP Holding Company LLC, Hopkinton, MA (US)

(72) Inventors: Patricia Gomes Soares Florissi, Briarcliff Manor, NY (US); Ofri Masad, Beer-Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 15/683,243

(22) Filed: Aug. 22, 2017

Related U.S. Application Data

(63) Continuation-in-part of application No. 14/982,341, filed on Dec. 29, 2015, now Pat. No. 10,015,106.

(60) Provisional application No. 62/143,404, filed on Apr. 6, 2015, provisional application No. 62/143,685, filed on Apr. 6, 2015, provisional application No.
(Continued)

(51) Int. Cl.
| | |
|---|---|
| *G06F 15/173* | (2006.01) |
| *G06F 16/28* | (2019.01) |
| *G06F 16/27* | (2019.01) |
| *G06F 16/951* | (2019.01) |
| *G06F 16/2458* | (2019.01) |
| *G06F 16/22* | (2019.01) |

(52) U.S. Cl.
CPC ........ *G06F 16/285* (2019.01); *G06F 16/2477* (2019.01); *G06F 16/27* (2019.01); *G06F 16/951* (2019.01); *G06F 16/2246* (2019.01)

(58) Field of Classification Search
CPC .... G06F 9/5066; G06F 9/5038; H04W 28/26; H04W 72/00; H04W 84/18
See application file for complete search history.

(56) References Cited

U.S. PATENT DOCUMENTS

| 6,516,350 B1 | 2/2003 | Lumelsky et al. |
| 7,934,018 B1 | 4/2011 | Lavallee et al. |
(Continued)

OTHER PUBLICATIONS

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.
(Continued)

*Primary Examiner* — Shean Tokuta
(74) *Attorney, Agent, or Firm* — Ryan, Mason & Lewis, LLP

(57) ABSTRACT

An apparatus in one embodiment comprises at least one processing device having a processor coupled to a memory. The processing device is configured to initiate distributed computations across a plurality of data processing clusters associated with respective data zones, and to combine local processing results of the distributed computations from respective ones of the data processing clusters. Each of the data processing clusters is configured to process data from a data source of the corresponding data zone using a local data structure and an associated computational framework of that data processing cluster. A first one of data processing clusters utilizes a first local data structure configured to support a first computational framework, and at least a second one of the data processing clusters utilizes a second local data structure different than the first local data structure and configured to support a second computational framework different than the first computational framework.

20 Claims, 57 Drawing Sheets

Related U.S. Application Data

62/377,957, filed on Aug. 22, 2016, provisional application No. 62/378,101, filed on Aug. 22, 2016, provisional application No. 62/378,129, filed on Aug. 22, 2016.

(56) References Cited

U.S. PATENT DOCUMENTS

| | | | |
|---|---|---|---|
| 8,224,825 B2 | 7/2012 | Wang et al. | |
| 8,732,118 B1* | 5/2014 | Cole | G06F 16/254 707/607 |
| 8,806,061 B1 | 8/2014 | Lobo et al. | |
| 8,938,416 B1* | 1/2015 | Cole | G06F 16/283 707/607 |
| 9,020,802 B1* | 4/2015 | Florissi | G06F 9/445 703/24 |
| 9,031,992 B1 | 5/2015 | Florissi et al. | |
| 9,130,832 B1* | 9/2015 | Boe | G06F 16/24 |
| 9,158,843 B1 | 10/2015 | Florissi et al. | |
| 9,229,952 B1* | 1/2016 | Meacham | G06F 17/3023 |
| 9,235,446 B2* | 1/2016 | Bruno | G06F 9/5066 |
| 9,280,381 B1 | 3/2016 | Florissi et al. | |
| 9,338,218 B1 | 5/2016 | Florissi et al. | |
| 9,361,263 B1 | 6/2016 | Florissi et al. | |
| 9,418,085 B1* | 8/2016 | Shih | G06F 16/211 |
| 9,489,233 B1 | 11/2016 | Florissi et al. | |
| 9,678,497 B2* | 6/2017 | Karypis | G05B 19/0421 |
| 9,747,127 B1 | 8/2017 | Florissi et al. | |
| 9,747,128 B1 | 8/2017 | Vijendra et al. | |
| 9,767,149 B2* | 9/2017 | Ozcan | G06F 16/2471 |
| 9,838,410 B2* | 12/2017 | Muddu | G06F 16/254 |
| 9,996,662 B1 | 6/2018 | Florissi et al. | |
| 10,015,106 B1 | 7/2018 | Florissi et al. | |
| 10,111,492 B2 | 10/2018 | Florissi et al. | |
| 10,122,806 B1 | 11/2018 | Florissi et al. | |
| 10,127,352 B1 | 11/2018 | Florissi et al. | |
| 2002/0073167 A1 | 6/2002 | Powell et al. | |
| 2005/0010712 A1 | 1/2005 | Kim et al. | |
| 2005/0102354 A1 | 5/2005 | Hollenbeck et al. | |
| 2005/0114476 A1 | 5/2005 | Chen et al. | |
| 2005/0132297 A1 | 6/2005 | Milic-Frayling et al. | |
| 2005/0153686 A1 | 7/2005 | Kall et al. | |
| 2006/0002383 A1 | 1/2006 | Jeong et al. | |
| 2006/0122927 A1 | 6/2006 | Huberman et al. | |
| 2007/0026426 A1 | 2/2007 | Fuernkranz et al. | |
| 2007/0076703 A1 | 4/2007 | Yoneda et al. | |
| 2007/0088703 A1 | 4/2007 | Kasiolas et al. | |
| 2008/0027954 A1 | 1/2008 | Gan et al. | |
| 2008/0028086 A1 | 1/2008 | Chetuparambil et al. | |
| 2008/0077607 A1 | 3/2008 | Gatawood et al. | |
| 2008/0279167 A1 | 11/2008 | Cardei et al. | |
| 2009/0062623 A1 | 3/2009 | Cohen et al. | |
| 2009/0076651 A1 | 3/2009 | Rao | |
| 2009/0150084 A1 | 6/2009 | Colwell et al. | |
| 2009/0319188 A1 | 12/2009 | Otto | |
| 2010/0042809 A1* | 2/2010 | Schenfeld | G06F 9/5061 712/29 |
| 2010/0076845 A1 | 3/2010 | Mullins | |
| 2010/0076856 A1 | 3/2010 | Mullins | |
| 2010/0131639 A1 | 5/2010 | Narayana et al. | |
| 2010/0184093 A1 | 7/2010 | Donovan et al. | |
| 2010/0229178 A1 | 9/2010 | Ito | |
| 2010/0290468 A1 | 11/2010 | Lynam et al. | |
| 2010/0299437 A1 | 11/2010 | Moore | |
| 2011/0020785 A1 | 1/2011 | Lowery, Jr. et al. | |
| 2011/0029999 A1 | 2/2011 | Foti | |
| 2011/0103364 A1 | 5/2011 | Li | |
| 2011/0314002 A1 | 12/2011 | Oliver et al. | |
| 2012/0030599 A1 | 2/2012 | Butt et al. | |
| 2013/0035956 A1 | 2/2013 | Carmeli et al. | |
| 2013/0044925 A1 | 2/2013 | Kozuka et al. | |
| 2013/0194928 A1 | 8/2013 | Iqbal | |
| 2013/0246460 A1 | 9/2013 | Maltbie et al. | |
| 2013/0282897 A1* | 10/2013 | Siegel | H04L 43/0876 709/224 |
| 2013/0318257 A1 | 11/2013 | Lee et al. | |
| 2013/0346988 A1* | 12/2013 | Bruno | G06F 9/5066 718/102 |
| 2014/0012843 A1 | 1/2014 | Soon-Shiong | |
| 2014/0025393 A1 | 1/2014 | Wang et al. | |
| 2014/0075161 A1 | 3/2014 | Zhang et al. | |
| 2014/0173618 A1 | 6/2014 | Neuman et al. | |
| 2014/0280298 A1 | 9/2014 | Petride et al. | |
| 2014/0280363 A1 | 9/2014 | Heng et al. | |
| 2014/0280604 A1 | 9/2014 | Ahiska et al. | |
| 2014/0280990 A1 | 9/2014 | Dove et al. | |
| 2014/0310718 A1 | 10/2014 | Gerphagnon et al. | |
| 2014/0325041 A1 | 10/2014 | Xu et al. | |
| 2014/0372611 A1* | 12/2014 | Matsuda | H04L 45/12 709/225 |
| 2015/0006619 A1* | 1/2015 | Banadaki | H04L 67/10 709/203 |
| 2015/0019710 A1 | 1/2015 | Shaashua et al. | |
| 2015/0039667 A1* | 2/2015 | Shah | H04L 67/1044 709/201 |
| 2015/0066646 A1* | 3/2015 | Sriharsha | G06Q 30/0256 705/14.54 |
| 2015/0088786 A1 | 3/2015 | Anandhakrishnan | |
| 2015/0120791 A1* | 4/2015 | Gummaraju | G06F 9/45558 707/823 |
| 2015/0121371 A1* | 4/2015 | Gummaraju | G06F 9/45533 718/1 |
| 2015/0178052 A1 | 6/2015 | Gupta et al. | |
| 2015/0254558 A1* | 9/2015 | Arnold | G06F 16/245 700/19 |
| 2015/0269230 A1 | 9/2015 | Kardes et al. | |
| 2015/0277791 A1* | 10/2015 | Li | G06F 3/0689 711/114 |
| 2015/0295781 A1 | 10/2015 | Maes | |
| 2015/0302075 A1* | 10/2015 | Schechter | G06F 9/5066 707/641 |
| 2015/0339210 A1* | 11/2015 | Kopp | G06F 11/3495 718/100 |
| 2016/0004827 A1 | 1/2016 | Silva et al. | |
| 2016/0063191 A1 | 3/2016 | Vesto et al. | |
| 2016/0072726 A1 | 3/2016 | Soni et al. | |
| 2016/0098021 A1 | 4/2016 | Zornio et al. | |
| 2016/0098472 A1* | 4/2016 | Appleton | G06F 16/245 707/737 |
| 2016/0098662 A1* | 4/2016 | Voss | G06Q 10/06316 705/7.26 |
| 2016/0112531 A1 | 4/2016 | Milton et al. | |
| 2016/0132576 A1* | 5/2016 | Qi | G06F 17/30575 707/600 |
| 2016/0179642 A1 | 6/2016 | Cai | |
| 2016/0179979 A1 | 6/2016 | Aasman et al. | |
| 2016/0188594 A1* | 6/2016 | Ranganathan | G06F 16/24552 707/769 |
| 2016/0205106 A1 | 7/2016 | Yacoub et al. | |
| 2016/0241893 A1 | 8/2016 | Allhands et al. | |
| 2016/0267132 A1 | 9/2016 | Castellanos et al. | |
| 2016/0269228 A1 | 9/2016 | Franke et al. | |
| 2016/0337473 A1 | 11/2016 | Rao | |
| 2017/0006135 A1* | 1/2017 | Siebel | H04L 67/02 |
| 2017/0032263 A1 | 2/2017 | Yuan et al. | |
| 2017/0083573 A1 | 3/2017 | Rogers et al. | |
| 2017/0187785 A1 | 6/2017 | Johnson et al. | |
| 2017/0220646 A1* | 8/2017 | Schechter | G06F 9/5066 |
| 2017/0272458 A1* | 9/2017 | Muddu | G06F 16/254 |
| 2017/0323028 A1* | 11/2017 | Jonker | G06F 16/9024 |
| 2018/0054355 A1 | 2/2018 | Balser et al. | |
| 2018/0101583 A1 | 4/2018 | Li et al. | |
| 2018/0189296 A1 | 7/2018 | Ashour et al. | |
| 2018/0308585 A1 | 10/2018 | Holmes et al. | |

OTHER PUBLICATIONS

A.C. Murthy et al., "Apache Hadoop YARN: Moving beyond MapReduce and Batch Processing with Apache Hadoop 2," Addison-Wesley Professional, Mar. 29, 2014, 78 pages.

Global Alliance for Genomics and Health, "Beacons," https://genomicsandhealth.org/work-products-demonstration-projects/beacons, Jun. 27, 2014, 2 pages.

Data Working Group, "Global Alliance Genomics API," http://ga4gh.org/#documentation, Dec. 28, 2015, 2 pages.

Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.

U.S. Appl. No. 14/982,341 filed in the name of Patricia Gomes Soares Florissi et al., filed Dec. 29, 2015 and entitled "Multi-Cluster Distributed Data Processing Platform."

U.S. Appl. No. 14/982,351 filed in the name of Patricia Gomes Soares Florissi et al., filed Dec. 29, 2015 and entitled "Distributed Catalog Service for Multi-Cluster Data Processing Platform."

U.S. Appl. No. 15/395,340 filed in the name of Bryan Duerk et al., filed Dec. 30, 2016 and entitled "Data-Driven Automation Mechanism for Analytics Workload Distribution."

Wikipedia, "Apache Spark," https://en.wikipedia.org/wiki/Apache_Spark, Apr. 10, 2017, 6 pages.

U.S. Appl. No. 15/485,843 filed in the name of Patricia Gomes Soares Florissi et al., filed Apr. 12, 2017 and entitled "Scalable Distributed In-Memory Computation."

U.S. Appl. No. 15/582,743 filed in the name of Patricia Gomes Soares Florissi et al., filed Apr. 30, 2017 and entitled "Scalable Distributed In-Memory Computation Utilizing Batch Mode Extensions."

M.K. Gardner et al., "Parallel Genomic Sequence-Searching on an Ad-Hoc Grid: Experiences, Lessons Learned, and Implications," Proceedings of the 2006 ACM/IEEE SC/06 Conference, IEEE Computer Society, 2006, 14 pages.

A.G. Craig et al., "Ordering of Cosmid Clones Covering the Herpes Simplex Virus Type I (HSV-I) Genome: A Test Case for Fingerprinting by Hybridisation," Nucleic Acids Research, vol. 18, 1990, pp. 2653-2660.

T.R. Golub et al., "Molecular classification of Cancer: Class Discovery and Class Prediction by Gene Expression Monitoring," Science, vol. 286, Oct. 15, 1999, pp. 531-537.

D. Singh et al., "Gene Expression Correlates of Clinical Prostate Cancer Behavior," Cancer Cell, vol. 1, Mar. 2002, pp. 203-209.

U.S. Appl. No. 15/281,248 filed in the name of Patricia Gomes Soares Florissi et al., filed Sep. 30, 2016 and entitled "Methods and Apparatus Implementing Data Model for Disease Monitoring, Characterization and Investigation."

P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.

J.Y.L. Lee et al., "Sufficiency Revisited: Rethinking Statistical Algorithms in the Big Data Era," The American Statistician, Dec. 15, 2016, 22 pages.

S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.

K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.

Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.

X. Wu et al., "Privacy Preserving Data Mining Research: Current Status and Key Issues," Proceedings of the 7th International Conference on Computational Science, Part III: ICCS 2007, May 2007, pp. 762-772.

A.P. Kulkarni et al., "Survey on Hadoop and Introduction to YARN," International Journal of Emerging Technology and Advanced Engineering, May 2014, pp. 82-67, vol. 4, No. 5.

* cited by examiner

2700

SCALABLE DISTRIBUTED COMPUTATIONS UTILIZING MULTIPLE DISTINCT COMPUTATIONAL FRAMEWORKS

RELATED APPLICATIONS

The present application is a continuation-in-part of U.S. patent application Ser. No. 14/982,341, filed Dec. 29, 2015 and entitled "Multi-Cluster Distributed Data Processing Platform," now U.S. Pat. No. 10,015,106, which is incorporated by reference herein in its entirety, and which claims priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and incorporated by reference herein in their entirety. The present application also claims priority to U.S. Provisional Application Ser. Nos. 62/377,957, 62/378,101 and 62/378,129, all filed Aug. 22, 2016 and entitled "WWH Spark," which are incorporated by reference herein in their entirety.

FIELD

The field relates generally to information processing systems, and more particularly to information processing systems that implement distributed processing across a plurality of processing nodes.

BACKGROUND

The need to extract knowledge from data collected on a global scale continues to grow. In many cases the data may be dispersed across multiple geographic locations, owned by different entities, and in different formats. Although numerous distributed data processing frameworks exist today, these frameworks have significant drawbacks. For example, data-intensive computing tasks often use data processing frameworks such as MapReduce or Spark. However, these frameworks typically require deployment of a distributed file system shared by all of the processing nodes, and are therefore limited to data that is accessible via the shared distributed file system. Such a shared distributed file system can be difficult to configure and maintain over multiple local sites that are geographically dispersed and possibly also subject to the above-noted differences in ownership and data format. In the absence of a shared distributed file system, conventional arrangements may require that data collected from sources in different geographic locations be copied from their respective local sites to a single centralized site configured to perform data analytics. Such an arrangement is not only slow and inefficient, but it can also raise serious privacy concerns regarding the copied data.

SUMMARY

Illustrative embodiments of the present invention provide information processing systems that are configured to distribute computations over multiple distributed data processing clusters utilizing multiple distinct computational frameworks.

In one embodiment, an apparatus comprises at least one processing device having a processor coupled to a memory. The processing device is configured to initiate distributed computations across a plurality of data processing clusters associated with respective data zones, and to combine local processing results of the distributed computations from respective ones of the data processing clusters. Each of the data processing clusters is configured to process data from a data source of the corresponding data zone using a local data structure and an associated computational framework of that data processing cluster. A first one of data processing clusters utilizes a first local data structure configured to support a first computational framework, and at least a second one of the data processing clusters utilizes a second local data structure different than the first local data structure and configured to support a second computational framework different than the first computational framework.

The local processing results of the distributed computations from respective ones of the data processing clusters are combined utilizing a global data structure configured based at least in part on the local data structures in order to produce global processing results of the distributed computations.

In some embodiments, the first computational framework comprises a MapReduce framework and the second computational framework comprises a Spark framework.

Additionally or alternatively, at least one of the data processing clusters may be configured in accordance with a Spark batch framework and one or more other ones of the data processing clusters may be configured in accordance with a Spark streaming framework.

The data processing clusters associated with the respective data zones in some embodiments are organized in accordance with a global computation graph for performance of the distributed computations. The global computation graph illustratively comprises a plurality of nodes corresponding to respective ones of the data processing clusters, with the nodes being arranged in multiple levels each including at least one of the nodes. A particular one of the data processing clusters corresponding to a root node of the global computation graph initiates the distributed computations in accordance with a control flow that propagates from the root node toward leaf nodes of the global computation graph via one or more intermediate nodes of the global computation graph. Local processing results from respective ones of the data processing clusters corresponding to respective ones of the nodes propagate back from those nodes toward the root node.

Each of the data processing clusters is illustratively configured to generate its corresponding portion of the local processing results independently of and at least partially in parallel with the other data processing clusters.

Additionally or alternatively, each of the data processing clusters may be configured to generate its portion of the local processing results asynchronously with respect to portions of the local processing results generated by the other data processing clusters, with the local processing results of the data processing clusters eventually being synchronized across the data processing clusters in conjunction with generation of the global processing results.

The global data structure may comprise a plurality of local data structures of respective ones of the data processing clusters, with at least a subset of the local data structures having respective different formats so as to support local data heterogeneity across the data processing clusters.

The plurality of data processing clusters in a given embodiment may comprise respective YARN clusters, although other types of data processing clusters may be used in other embodiments.

The distribution of computations across the data processing clusters may be implemented at least in part in a recursive manner. For example, in some embodiments at least one of the local data structures itself comprises a global data structure having a plurality of additional local data structures of respective additional data processing clusters associated therewith.

These and other illustrative embodiments include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
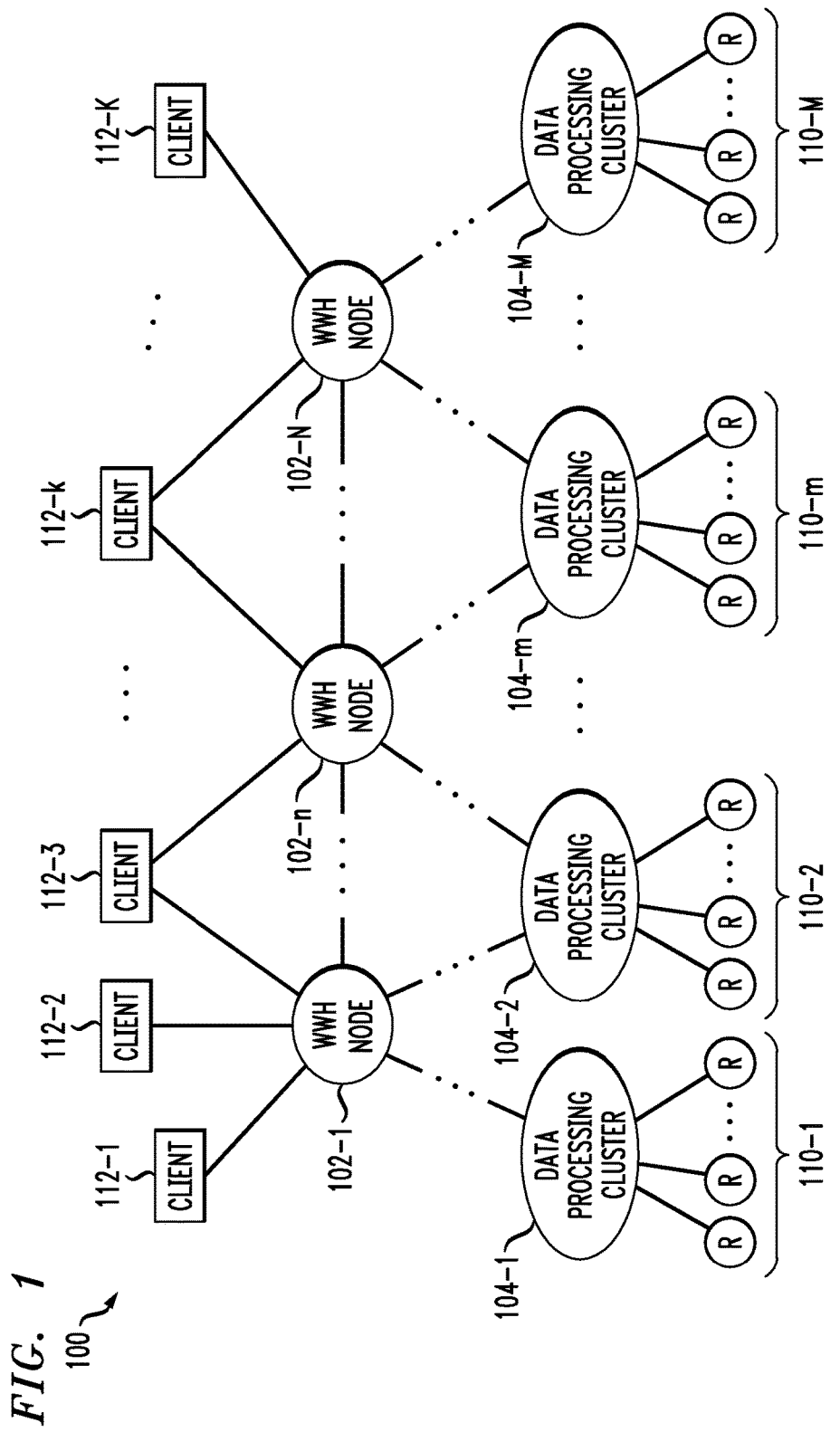
FIG. 1 is a block diagram of an information processing system comprising a multi-cluster distributed data processing platform in an illustrative embodiment of the invention.

FIG. 1 shows an information processing system 100 comprising a multi-cluster distributed data processing platform in an illustrative embodiment. The system 100 comprises a plurality of processing nodes 102, individually denoted as 102-1, . . . 102-n, . . . 102-N, each of which communicates with one or more distributed data processing clusters 104, individually denoted as 104-1, 104-2, . . . 104-m, . . . 104-M.

In some implementations of the FIG. 1 embodiment, one or more of the distributed data processing clusters 104 comprise respective Apache Hadoop YARN ("Yet Another Resource Negotiator") clusters. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein. Numerous alternative types of distributed data processing clusters may be used in place of or in addition to Apache Hadoop YARN clusters.

The processing nodes 102 are configured to communicate with one another and with their associated distributed data processing clusters 104 over one or more networks that are not explicitly shown in the figure.

The processing nodes 102 are illustratively implemented as respective worldwide data nodes, and more particularly as respective worldwide Hadoop (WWH) nodes, although numerous alternative processing node types can be used in other embodiments. The WWH nodes are assumed to be configured to perform operations in accordance with any framework supported by Hadoop YARN clusters or other types of clusters comprising respective ones of the distributed data processing clusters 104. Examples of frameworks supported by Hadoop YARN clusters include MapReduce, Spark, Hive, MPI and numerous others.

The acronym WWH as used in conjunction with some embodiments herein is additionally or alternatively intended to refer to a "worldwide herd" arrangement where the term "herd" in this context illustratively connotes multiple geographically-distributed Hadoop platforms. More generally, WWH is used to denote a worldwide data processing platform potentially comprising multiple clusters.

In the FIG. 1 embodiment, the multi-cluster distributed data processing platform more particularly comprises a WWH platform having one or more layers of WWH nodes 102 and a plurality of potentially geographically-distributed data processing clusters 104. Each of the distributed data processing clusters 104 illustratively comprises a corresponding cluster of distributed data processing nodes. The WWH platform is illustratively configured for worldwide scale, geographically-dispersed computations and other types of cluster-based processing based on locally-accessible data resources, as will be described in more detail elsewhere herein.

It is to be appreciated that a wide variety of other types of processing nodes 102 can be used in other embodiments. Accordingly, the use of WWH nodes in the FIG. 1 embodiment and other embodiments disclosed herein is by way of illustrative example only, and should not be construed as limiting in any way.

It should also be noted that one or more of the WWH nodes 102 in some embodiments can be part of a corresponding one of the distributed data processing clusters 104. For example, in some embodiments of a WWH platform as disclosed herein, the distributed data processing clusters 104 themselves each comprise one or more layers of WWH nodes. Accordingly, these and other embodiments need not include a separate layer of WWH nodes 102 above the distributed data processing clusters 104. The WWH nodes 102 may be viewed as examples of what are more generally referred to herein as distributed data processing nodes. The distributed data processing clusters 104 are each also assumed to comprise a plurality of additional or alternative distributed data processing nodes.

Each distributed data processing cluster 104 illustratively includes a resource manager for that cluster. For example, in some embodiments YARN can be used to provide a cluster-wide operating system that allows applications to utilize the dynamic and parallel resource infrastructure a computer cluster offers. However, conventional YARN implementations are generally configured to operate in single-cluster environments, and do not provide any support for managing distributed applications which span across more than one cluster.

The WWH platform in the FIG. 1 embodiment is an example of what is more generally referred to herein as a "multi-cluster distributed data processing platform." This WWH platform and other WWH platforms disclosed herein advantageously extend YARN to multi-cluster environments. For example, the WWH platform in some embodiments is configured to orchestrate the execution of distributed WWH applications on a worldwide scale, across multiple, potentially geographically-distributed YARN clusters. The WWH platform therefore provides a platform for running distributed applications across multiple data zones each having a corresponding YARN cluster.

Other types of multi-cluster distributed data processing platforms may be implemented in other embodiments. Accordingly, references herein to a WWH platform, YARN clusters and associated features are intended as illustrative examples only, and should not be construed as limiting in any way. For example, other embodiments can be implemented without using WWH nodes or YARN clusters. Accordingly, it should be understood that the distributed data processing techniques disclosed herein are more generally applicable to a wide variety of other types of multi-cluster platforms.

Each of the distributed data processing clusters 104 in the system 100 is associated with a corresponding set of local data resources 110, individually denoted as local data resources sets 110-1, 110-2, . . . 110-$m$, . . . 110-M. The local data resource sets each provide one or more local data resources to the corresponding cluster for analytics processing. Results of the processing performed within a given cluster utilizing one or more locally available data resources accessible to that cluster are illustratively provided to one or more other ones of the clusters or to an associated one of the WWH nodes 102 for additional processing associated with provision of analytics functionality within the system 100.

The data resources of each of the sets 110 of data resources are individually identified using the letter R in FIG. 1. Although these data resources are illustratively shown as being external to the distributed data processing clusters 104, this is by way of example only and it is assumed in some embodiments that at least a subset of the data resources of a given set 110 are within the corresponding distributed data processing cluster 104. Accordingly, a given cluster can perform processing operations using a combination of internal and external local data resources.

The results of the analytics processing performed by a given one of the distributed data processing clusters 104 illustratively comprise results of local analytics processing using frameworks such as MapReduce, Spark and numerous others.

It should be understood that the above-noted analytics results are merely examples of what are more generally referred to herein as "processing results" of a given cluster. Such results can take different forms in different embodiments, as will be readily appreciated by those skilled in the art. For example, such processing results can comprise local analytics results that have been processed in a variety of different ways within a cluster before being provided to one of more of the WWH nodes 102 for additional processing. Numerous other types of processing results can be used in other embodiments.

The WWH nodes 102 are each coupled to one or more clients 112. By way of example, the set of clients 112 may include one or more desktop computers, laptop computers, tablet computers, mobile telephones or other types of communication devices or other processing devices in any combination. The clients are individually denoted in the figure as clients 112-1, 112-2, 112-3, . . . 112-$k$, . . . 112-K. The clients 112 may comprise, for example, respective end users or associated hardware entities, software entities or other equipment entities. For example, a "client" as the term is broadly used herein can comprise a software-implemented entity running on a user device or other processing device within the system 100.

The variables N, M and K denote arbitrary values, as embodiments of the invention can be configured using any desired number of WWH nodes 102, distributed data processing clusters 104 and clients 112. For example, some embodiments may include multiple distributed data processing clusters 104 and multiple clients 112 but only a single WWH node 102, or multiple WWH nodes 102 corresponding to respective ones of the distributed data processing clusters 104. Numerous alternative arrangements are possible, including embodiments in which a single system element combines functionality of at least a portion of a WWH node and functionality of at least a portion of a distributed data processing cluster. Thus, alternative embodiments in which the functions of a WWH node and a distributed data processing cluster are at least partially combined into a common processing entity are possible.

The WWH nodes 102 in some embodiments are implemented at least in part as respective analysis nodes. The analysis nodes may comprise respective computers in a cluster of computers associated with a supercomputer or other high performance computing (HPC) system. The term "processing node" as used herein is intended to be broadly construed, and such nodes in some embodiments may comprise respective compute nodes in addition to or in place of providing analysis node functionality.

The system 100 may include additional nodes that are not explicitly shown in the figure. For example, the system 100 may comprise one or more name nodes. Such name nodes may comprise respective name nodes of a Hadoop Distributed File System (HDFS), although other types of name nodes can be used in other embodiments. Particular objects or other stored data of a storage platform can be made accessible to one or more of the WWH nodes 102 via a corresponding name node. For example, such name nodes can be utilized to allow the WWH nodes 102 to address multiple HDFS namespaces within the system 100.

Each of the WWH nodes 102 and distributed data processing clusters 104 is assumed to comprise one or more databases for storing analytics processing results and possibly additional or alternative types of data.

Databases associated with the WWH nodes 102 or the distributed data processing clusters 104 and possibly other elements of the system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage arrays such as VNX® and Symmetrix VMAX® storage arrays, both commercially available from Dell EMC of Hopkinton, Mass. Other types of storage products that can be used in implementing a given storage platform in an illustrative embodiment include software-defined storage products such as ScaleIO™ and ViPR®, server-based flash storage devices such as DSSD™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage platform in an illustrative embodiment.

Additionally or alternatively, a given storage platform can implement multiple storage tiers. For example, a storage platform can comprise a 2 TIERS™ storage system, also from Dell EMC.

These and other storage platforms can be part of what is more generally referred to herein as a processing platform comprising one or more processing devices each comprising a processor coupled to a memory.

A given processing device may be implemented at least in part utilizing one or more virtual machines or other types of virtualization infrastructure such as Docker containers or other types of Linux containers (LXCs). The WWH nodes 102 and distributed data processing clusters 104, as well as other system components, may be implemented at least in part using processing devices of such processing platforms.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that the particular arrangement of system elements shown in FIG. 1 is for purposes of illustration only, and that other arrangements of additional or alternative elements can be used in other embodiments. For example, numerous alternative system configurations can be used to implement multi-cluster distributed data processing functionality as disclosed herein. Accordingly, the particular arrangements of layers, nodes and clusters shown in the FIG. 1 embodiment and other embodiments herein are presented by way of example only, and should not be construed as limiting in any way.

Additional details regarding example processing functionality that may be incorporated in at least a subset of the WWH nodes in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

The WWH platform in the FIG. 1 embodiment and one or more other embodiments disclosed herein illustratively adheres to local processing within each cluster using data locally accessible to that cluster. This is achieved without the need for implementing a distributed file system over the multiple clusters. Also, movement of data resources between clusters is avoided. Instead, data resources are processed locally within their respective clusters.

This orchestration of distributed applications over multiple clusters is facilitated in illustrative embodiments through the use of what is referred to herein as a WWH catalog. The WWH catalog is a catalog of data resources, and is an example of what is more generally referred to herein as a "distributed catalog service."

In some embodiments, each cluster that is part of the WWH platform has access to or otherwise comprises an instance of the WWH catalog implemented for that cluster. The WWH catalog instance implemented for a given cluster illustratively contains detailed information regarding local data resources of that cluster, such as, for example, file names and metadata about the files and their content, and references to one or more other clusters in the case of a non-local resource. This creates a hierarchical structure to execution of a WWH application within the WWH platform.

It should be noted that each cluster need not include its own instance of the WWH catalog. For example, in some embodiments, only a subset of the clusters of a multi-cluster distributed data processing platform implement respective instances of a distributed WWH catalog. In such an arrangement, clusters that do not include respective WWH catalog instances can nonetheless participate in performance of computations associated with a distributed WWH application.

A WWH application identifies data files and other input data items from among the various data resources characterized by the WWH catalog. A given such input data item can more particularly comprise, for example, a text file, an XML file, a result relation of a database query or a result of an application programming interface (API) query.

Data resources characterized by the WWH catalog can be considered global in the sense that clients are oblivious to the particular location of the resource. For example, a given resource can be comprised of several other resources, each residing in a different data zone. A meta-resource is a piece of data that describes a corresponding data resource. It generally includes the location of the resource and information about how to access the resource.

The WWH catalog is distributed over the clusters of the WWH platform with each of the clusters having visibility of only its corresponding instance of the WWH catalog. In some embodiments, the distributed instances of the WWH catalog are implemented as respective YARN applications running on respective ones of the clusters of the WWH platform.

A given instance of the WWH catalog on a corresponding one of the clusters typically comprises a plurality of entries with each such entry comprising a meta-resource including information characterizing location and accessibility of a corresponding one of the data resources. By way of example, the meta-resource for a given local data resource may comprise a file path to a storage location of that local data resource in the corresponding cluster. Also by way of example, the meta-resource for a given remote data resource may comprise information identifying another cluster for which that data resource is a local data resource.

A given meta-resource of the WWH catalog may additionally or alternatively comprise one or more other types of information, such as, for example, information regarding transformation of the data resource into one or more designated formats, access control information, policy rules, etc.

The WWH catalog therefore illustratively provides a catalog of entries, each comprising a meta-resource. Each meta-resource describes the respective resource and may contain the code or an API required to transform the resource to the format required by the application. End users or other types of clients may browse the WWH catalog via a browsing API or other type of browsing interface in order to obtain information about meta-resources, and WWH applications may query it for information about how to access the data. As noted above, the WWH catalog is assumed to be distributed across multiple data zones and their respective clusters. Such a distributed arrangement helps to provide security and privacy for the underlying data resources.

Although distributed implementations of the WWH catalog are advantageous in some embodiments, it is possible in other embodiments for the WWH catalog to be implemented in only a single cluster of a WWH platform. Other alternative implementations may include distributed implementations in which the WWH catalog is distributed over only a subset of the clusters of a WWH platform, rather than over all of the clusters of the WWH platform.

The WWH platform and its associated WWH catalog in illustrative embodiments implement a recursiveness property that allows a given distributed application initiated on one of the clusters to initiate additional applications on respective additional ones of the clusters. Those additional applications can similarly initiate more applications on other ones of the clusters different than the clusters on which the additional applications were initiated. In this manner, a distributed application can be executed utilizing local data resources of multiple clusters while preserving the privacy of each of the clusters in its local data resources.

In some embodiments, security measures are deployed that prevent the data zones from being accessible to the outside world. For example, firewalls, routers and gateways may prevent public access to a cluster of a given data zone, allowing access to the cluster only from within a certain access point. The WWH platform in illustrative embodiments is configured to allow such "hidden" data zones to take part in both sharing data and computation.

A WWH platform configured to run applications across multiple clusters associated with respective distinct data zones is advantageous in terms of both privacy and performance. Privacy is provided in that an application submitted to an initial cluster corresponding to a specific data zone accesses the data local to that data zone. The results of the application execution in the initial cluster may be transferred to other clusters corresponding to respective other data zones, but such processing results are typically aggregated and therefore need not include any private information. Furthermore, the recursiveness property mentioned above can in some embodiments be configured so as to hide even the knowledge of which of the clusters participate in the application execution. For similar reasons, performance is greatly improved. Usually raw data stays in its original location and only the results which are of much smaller size may be transferred between clusters. This contributes to improved performance both because of the inherent parallelism and the reduced data transfer between clusters.

As is apparent from the above, the overall privacy and efficiency of the WWH platform is maintained in some embodiments by adhering to local processing within clusters and their associated data zones. In order to keep the processing local, the WWH catalog includes meta-resources that direct the computation to the cluster where the data is stored, such that the computation moves and the data does not.

The WWH platform in illustrative embodiments provides significant advantages relative to conventional systems. For example, the WWH platform in some embodiments is oblivious to the particular local file systems utilized in the respective clusters. Moreover, the WWH platform keeps local raw data private within each of the clusters, does not need a centralized controller or scheduler, and is not limited to use with only the MapReduce framework but is more generally suitable for use with any of a wide variety of frameworks that are supported by YARN, as well as additional or alternative frameworks in non-YARN embodiments.

The WWH platform in some embodiments utilizes a distributed WWH catalog having instances accessible to respective ones of the clusters, and is thus agnostic to where exactly the data resides, and its exact format, and does not require a global file system.

The WWH platform in some embodiments is strongly privacy aware. It supports and encourages local processing of local data and provides simple ways for sending intermediate processing results which do not contain private information between clusters.

The WWH platform can provide similar advantages for other aspects of Governance, Risk and Compliance (GRC). For example, by pushing processing closer to where the data is located, the WWH platform facilitates enforcement of policies relating to governance, management of risk, and compliance with regulatory requirements, all at the local level.

The WWH platform supports multiple data zones. A data zone is illustratively a distinct data processing cluster with its own local data. Such a data zone may execute a YARN application such as a MapReduce application on its local data. The WWH platform provides a framework which spans across multiple data zones, and enables the combination of processing results based on local data resources of the respective data zones in a global manner. Thus, the WWH platform provides and encourages cooperation between different data zones. However, the WWH platform does not encourage moving raw data between data zones, for both performance and privacy reasons, as well as for other related reasons such as the above-noted facilitation of GRC at the local level.

The WWH platform in some embodiments has an open architecture in the sense that any data processing cluster can join the WWH platform, and therefore the WWH platform in such an embodiment does not require any single centralized controller. Every participating cluster is in control of the data it wishes to share with the outside world. An authorized external client can connect to any data zone supported by the WWH platform and there is no single entry point.

The WWH platform can be illustratively implemented utilizing YARN applications. For example, when a client wishes to run a WWH application it contacts a first one of the clusters, and runs a YARN application on that cluster. When other clusters need to be contacted, one or more containers of the first cluster act like respective clients for the other clusters, and run YARN applications on those other clusters. Thus in each individual cluster the distributed WWH application is seen as an individual YARN application and YARN itself is not aware of the multiple data zone aspects of the WWH application or the WWH platform.

Like YARN itself, the WWH platform in some embodiments is functionally separated into a platform layer and a framework layer. The WWH framework layer can be configured to support WWH frameworks for executing WWH applications that utilize any of a wide variety of underlying YARN frameworks. A developer can write WWH frameworks, and clients will be able to use those WWH frameworks, in a manner similar to how YARN frameworks such as MapReduce or Spark are utilized on single clusters. For example, some embodiments of WWH platforms described herein are provided with a WWH framework for running MapReduce applications in different data zones associated with respective multiple YARN clusters and using a global reducer in a particular YARN cluster to compute the final results. Alternatively, the global reducer can be implemented at least in part outside of the YARN clusters, such as within a given one of the WWH nodes.

As indicated above, however, WWH platforms are not limited to use with YARN clusters, and can more generally comprise other types of distributed data processing clusters in addition to or in place of YARN clusters.

Additional details regarding WWH platforms that can be used in the FIG. 1 embodiment and other embodiments of the present invention are disclosed in U.S. patent application Ser. No. 14/982,341, filed Dec. 29, 2015 and entitled "Multi-Cluster Distributed Data Processing Platform," now U.S. Pat. No. 10,015,106, and U.S. patent application Ser. No. 14/982,351, filed Dec. 29, 2015 and entitled "Distributed Catalog Service for Multi-Cluster Data Processing Platform," each incorporated by reference herein in its entirety. These U.S. patent applications each claim priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and also incorporated by reference herein in their entirety.

Illustrative embodiments disclosed in the above-cited patent applications provide information processing systems that are configured to execute distributed applications over multiple distributed data processing node clusters associated with respective distinct data zones. Each data zone in a given embodiment illustratively comprises a Hadoop YARN cluster or other type of cluster configured to support one or more distributed data processing frameworks, such as MapReduce and Spark. These and other similar arrangements can be advantageously configured to provide analytics functionality in a decentralized and privacy-preserving manner, so as to overcome the above-noted drawbacks of conventional systems. This is achieved in some embodiments by orchestrating execution of distributed applications across the multiple YARN clusters. Computations associated with data available locally within a given YARN cluster are performed within that cluster. Accordingly, instead of moving data from local sites to a centralized site, computations are performed within the local sites where the needed data is available. This provides significant advantages in terms of both performance and privacy. Additional advantages are provided in terms of security, governance, risk and compliance.

For example, some embodiments provide WWH platforms that are faster and more efficient than conventional analytics systems. Moreover, multi-cluster distributed data processing platforms in some embodiments are implemented in a decentralized and privacy-preserving manner. These and other multi-cluster distributed data processing platforms advantageously overcome disadvantages of conventional practice, which as indicated previously often rely on copying of local data to a centralized site for analysis, leading to privacy and performance concerns.

In some embodiments, a multi-cluster distributed data processing platform is configured to leverage Big Data profiles and associated Big Data analytics in processing local and remote data resources across multiple geographic regions or other types of data zones.

Additional details regarding Big Data profiles and associated Big Data analytics that can be implemented in illustrative embodiments of the present invention are described in U.S. Pat. No. 9,031,992, entitled "Analyzing Big Data," which is commonly assigned herewith and incorporated by reference herein.

A multi-cluster distributed data processing platform in an illustrative embodiment can utilize the data scattered across multiple regional data centers located worldwide, while preserving data privacy and adjusting for differences in data formats and other factors between the various data centers.

A WWH platform in some embodiments leverages one or more frameworks supported by Hadoop YARN, such as MapReduce, Spark, Hive, MPI and numerous others, to support distributed computations while also minimizing data movement, adhering to bandwidth constraints in terms of speed, capacity and cost, and satisfying security policies as well as policies relating to governance, risk management and compliance.

As is apparent from the foregoing, illustrative embodiments include information processing systems that are configured to distribute analytics workloads and other types of workloads over multiple distributed data processing node clusters. Such embodiments may comprise WWH platforms of the type described above.

Additional illustrative embodiments implementing scalable distributed in-memory computation functionality will now be described with reference to FIGS. 2 through 9. In some embodiments, the distributed in-memory computations comprise Spark Core batch computations, but it is to be appreciated that the disclosed techniques are applicable to other types of computations associated with other types of distributed in-memory processing.

Figure 2:
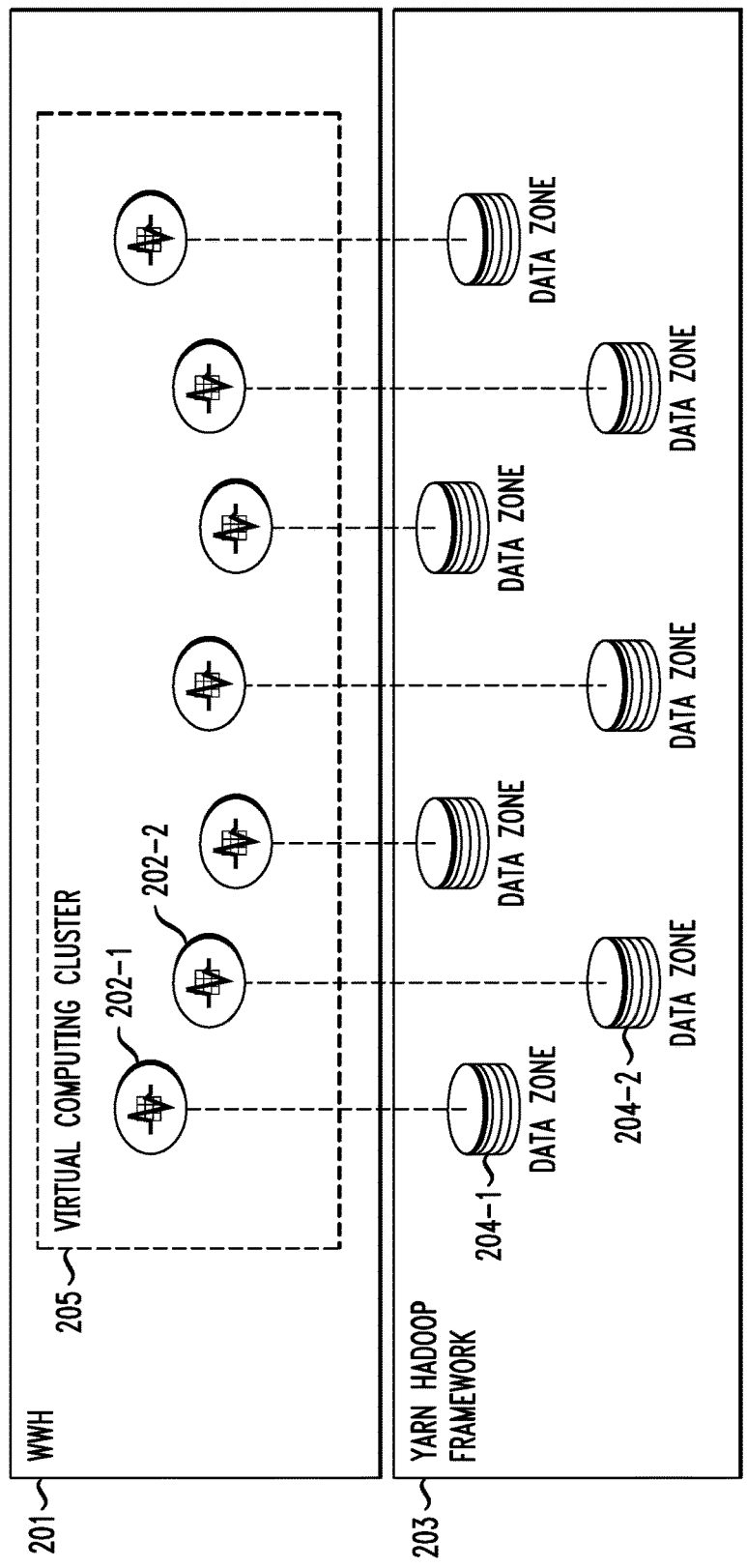
FIG. 2 shows an information processing system comprising a virtual computing cluster in another illustrative embodiment.

Referring now to FIG. 2, an information processing system 200 comprises a multi-cluster distributed data processing platform in an illustrative embodiment. The distributed data processing platform in this embodiment may be viewed as an example of what is also referred to herein as a WWH platform. The system 200 comprises a WWH node layer 201 that includes multiple WWH nodes 202 such as WWH nodes 202-1 and 202-2. The WWH platform further comprises a YARN cluster layer 203 that includes multiple YARN clusters 204 such as YARN cluster 204-1 and YARN cluster 204-2. The WWH nodes 202 are associated with respective ones of the YARN clusters 204.

The YARN clusters 204 in the FIG. 2 embodiment are examples of what are more generally referred to herein as "distributed processing node clusters." Thus, like the distributed data processing clusters 104 of the FIG. 1 embodiment, each of the YARN clusters 204 is assumed to include a cluster of multiple computers or other processing devices. Other types of distributed processing node clusters can be used in other embodiments. The use of Hadoop YARN in the FIG. 2 embodiment is by way of example only, and other embodiments need not utilize Hadoop YARN.

Also, although single layers 201 and 203 of respective sets of WWH nodes 202 and YARN clusters 204 are shown in this figure, other embodiments can include multiple layers of WWH nodes, multiple layers of YARN clusters, or both multiple layers of WWH nodes and multiple layers of YARN clusters.

In the information processing system 200, there is a one-to-one correspondence between the WWH nodes 202 and the respective YARN clusters 204, although this is also by way of illustrative example only. In other embodiments, a given WWH node may be associated with multiple YARN clusters. Additionally or alternatively, a given YARN cluster can be associated with multiple WWH nodes.

It is also possible that one or more of the WWH nodes 202 may each comprise a data processing node of the corresponding YARN cluster 204. Thus, in some embodiments, the separate layers 201 and 203 of the FIG. 2 embodiment are merged into a single layer of YARN clusters one or more of which each include one or more WWH nodes. Such an arrangement is considered yet another illustrative example of a WWH platform, or more generally a multi-cluster distributed data processing platform, as those terms are broadly utilized herein.

The YARN clusters 204 in the FIG. 2 embodiment are assumed to be associated with respective distinct data zones. Each of the YARN clusters 204 is configured to perform processing operations utilizing local data resources locally accessible within its corresponding data zone. The YARN clusters as illustrated in the figure illustratively comprise respective processing platforms including various arrangements of multi-node clouds, virtual infrastructure components such as virtual machines (VMs) and virtual networks, Isilon® platform nodes, and other example arrangements of distributed processing nodes.

By way of example, at least a subset of the YARN clusters 204 may comprise respective geographically-distributed regional data centers each configured to perform analytics processing utilizing the locally accessible data resources of its corresponding data zone. Additional or alternative types of boundaries may be used to separate the system 200 into multiple data zones. Accordingly, geographical distribution of the data zones and their respective clusters is not required.

In some embodiments, the data required for execution of analytics applications and other types of applications in system 200 is scattered across many sites or clouds, potentially scattered around the world, where each location only has visibility to its own datasets. These sites or clouds are examples of data zones.

It may be assumed in some implementations of system 200 that the datasets each site or cloud collects are locked into the corresponding data zone, meaning that a given dataset cannot move outside of the boundaries of the associated site or cloud. There may be a variety of factors preventing the data from moving, including a data size that imposes severe bandwidth delays or transmission costs, privacy issues that prohibit the data from being shared outside the data zone, or GRC regulatory requirements mandating that the data remain within the data zone.

The WWH platform in this embodiment provides a mechanism to orchestrate the distribution and parallel execution of computations across data zones, allowing for all the data residing across these data zones to be analyzed without requiring that all the data be moved to a single cluster.

More particularly, the WWH nodes 202 of the WWH node layer 201 collectively provide a virtual computing cluster 205 within the system 200. Each of the separate data zones of the YARN cluster layer 203 in this embodiment is by way of illustrative example associated with a single corresponding one of the WWH nodes 202. These WWH nodes 202 comprise respective virtual nodes of the virtual computing cluster 205. The WWH platform in this embodiment therefore provides an abstraction in which the data zones of the YARN cluster layer 203 correspond to respective virtual nodes within the virtual computing cluster 205.

The WWH platform in the FIG. 2 embodiment is illustratively configured to allow a given analytics application or other type of application to treat multiple, distributed YARN clusters as a single, virtual computing cluster. The WWH platform in these and other embodiments handles the details of distributing the required computations to subsidiary, potentially geographically or otherwise separated clusters as required.

The WWH nodes 202 illustratively utilize processing results from one or more of the YARN clusters 204 in orchestrating distributed applications over multiple YARN clusters in the system 200. This is achieved in a manner that preserves the privacy of those clusters in their respective local data resources. For example, processing results from a given one of the clusters may be permitted to be transmitted to another one of the clusters while the local data resources of the given cluster that are utilized to obtain the processing results are not permitted to be transmitted to another one of the clusters.

The WWH layer 201 in some implementations of the system 200 may be viewed as comprising an "analytics layer" of the system. The YARN clusters 204 can be interconnected in different ways at that analytics layer through use of different connections between the WWH nodes 202. For example, each of the WWH nodes 202 of the WWH layer 201 may be interconnected with one or more other ones of the WWH nodes 202.

It is to be appreciated that, in the FIG. 2 embodiment, any of the WWH nodes 202 can initiate a distributed application on its corresponding one of the YARN clusters 204 and that distributed application can subsequently initiate multiple additional applications involving respective additional ones of the clusters.

In one example of an operating mode of the system 200, a computation is initiated in one of the virtual nodes of the virtual computing cluster 205, and at least portions of this computation are propagated to one or more other virtual nodes within the virtual computing cluster 205 that should participate in the computation. Local computations are performed within corresponding ones of the data zones of the YARN cluster layer 203. Upon completion of their respective local computations, the data zones send their results back to the initiating node, where a global computation is performed. The results may be defined in the form of key-value pairs or in numerous other formats.

It should be noted that, in some embodiments, a given local computation in a particular one of the YARN clusters 204 may itself be distributed across multiple nodes in respective other ones of the YARN clusters 204, with the results being aggregated and returned to the particular YARN cluster.

Again, the particular arrangements of layers, nodes and clusters shown in FIG. 2 are presented by way of example only, and should not be construed as limiting in any way.

The WWH platform in the FIG. 2 embodiment and one or more other embodiments disclosed herein illustratively adheres to local processing within each cluster using data locally accessible to that cluster. This is achieved without the need for implementing a distributed file system over the multiple clusters. Also, movement of data resources between clusters is avoided. Instead, data resources are processed locally within their respective YARN clusters. This orchestration of distributed applications over multiple YARN clusters is facilitated in illustrative embodiments through the use of the above-noted WWH catalog or other types of distributed catalog services.

Figure 3:
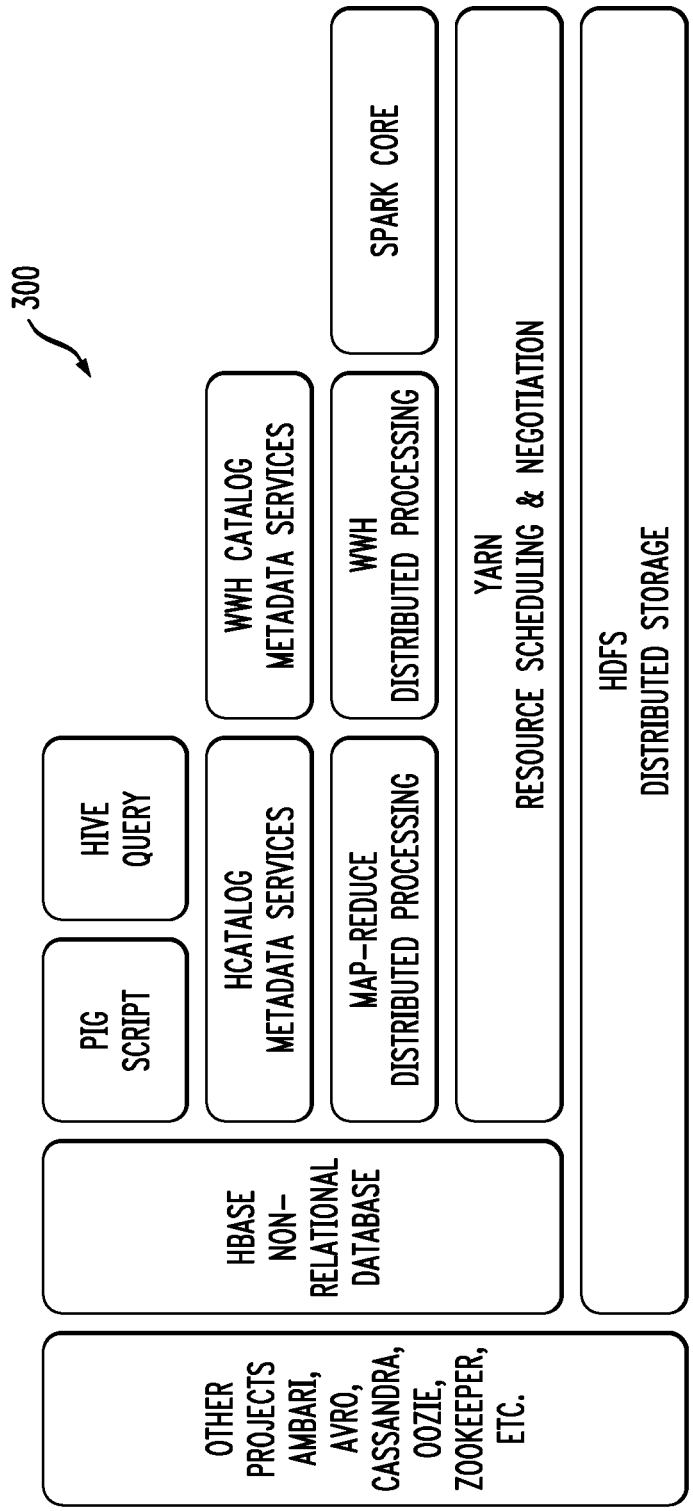
FIG. 3 is a stack diagram showing relationships between components of an information processing system with scalable distributed in-memory computation functionality in an illustrative embodiment.

FIG. 3 is a stack diagram showing relationships between components of an information processing system 300 with scalable distributed in-memory computation functionality in an illustrative embodiment. This diagram illustrates an example stack architecture in which a WWH distributed processing component interacts with a Spark Core component in distributing in-memory Spark Core batch computations across underlying YARN clusters of a YARN resource scheduling and negotiation component. Associated with the WWH distributed processing component is a WWH catalog metadata services component of the type described previously herein. The WWH distributed processing component also supports MapReduce distributed processing using the underlying YARN clusters of the YARN resource scheduling and negotiation component. Also included in the system 300 are components associated with HDFS distributed storage, HBase non-relational databases, HCatalog metadata services, Pig scripts, and Hive queries, as well as additional or alternative components associated other projects that can utilize the WWH framework of the system 300, including by way of example Ambari, Avro, Cassandra, Oozie and Zookeeper.

The layered architecture of the system 300 provides extension of the WWH framework to support Spark applications. Spark performs in-memory computations utilizing resilient distributed datasets (RDDs). Spark generally provides a distributed data processing engine that can operate in multiple modes, such as batch, interactive and streaming modes, and that implements additional functionality such as SQL query processing, graph processing and machine learning. Although some illustrative embodiments described herein focus on Spark processing in the batch mode of operation, it is to be appreciated that the WWH framework can also be extended to support other types of Spark applications running in other operating modes, such as interactive and streaming modes.

In the FIG. 3 embodiment, the WWH distributed processing component of system 300 is configured to interact with the Spark Core component. Such an arrangement illustratively involves distributing Spark computations across multiple clusters, allowing the computations to benefit from the principle of data locality. For example, a given computation may be performed as close as possible to the needed data, thereby minimizing data movement and preserving privacy, as only the results of the given computation are shared beyond the corresponding data zone, and not the original data itself.

Figure 4:
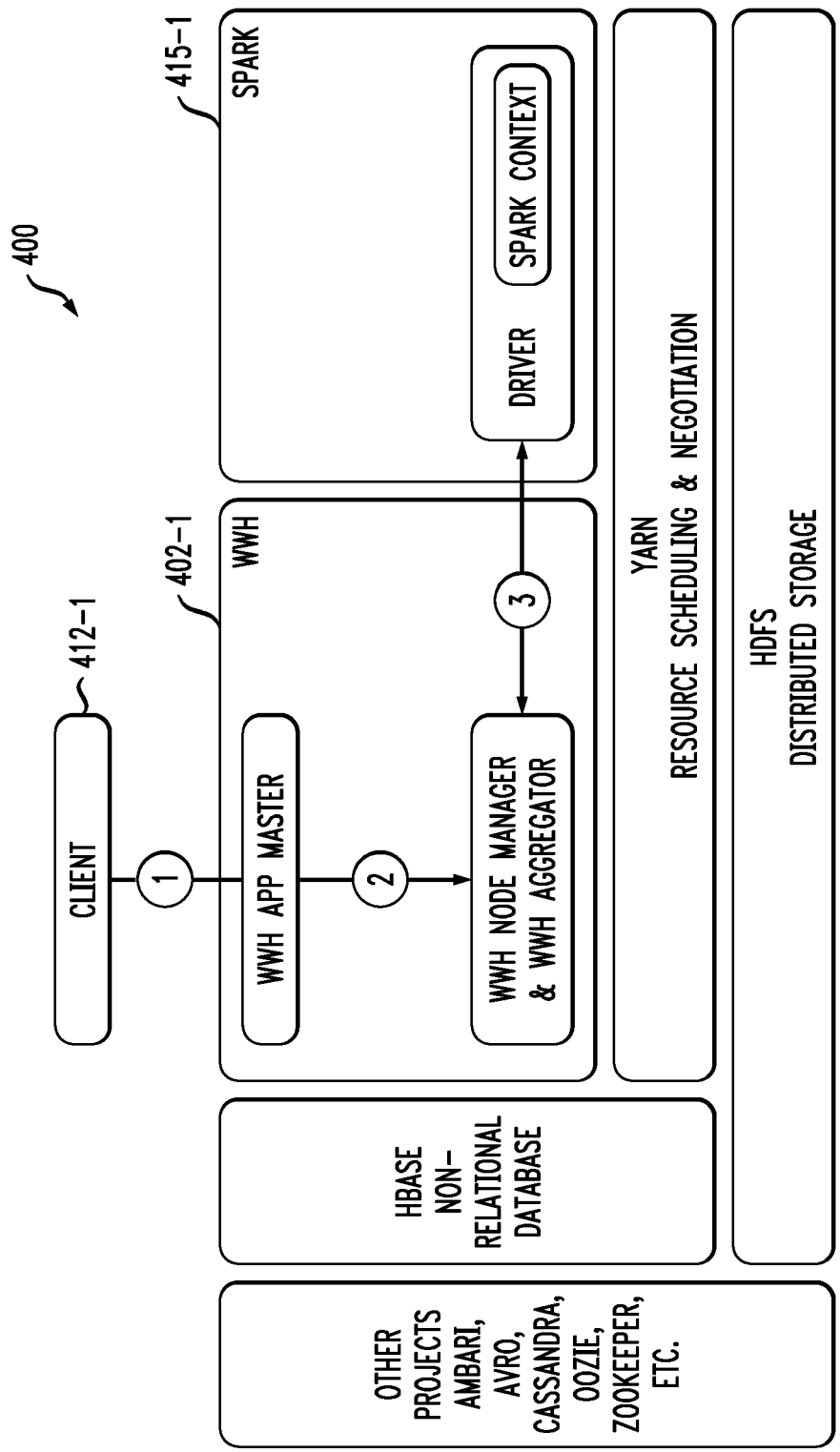
FIG. 4 shows example interactions between WWH and Spark components in an illustrative embodiment.

FIG. 4 illustrates another embodiment of an information processing system 400 with scalable distributed in-memory computation functionality. The system 400 includes a WWH component 402-1, a client 412-1 and a Spark component 415-1.

The WWH component 402-1 may comprise at least a portion of one or more WWH nodes of a WWH platform of the type previously described. Additionally or alternatively, it may comprise at least portions of one or more distributed data processing clusters. The WWH component 402-1 includes a WWH application master, as well as a WWH node manager and a WWH aggregator. The WWH application master is an example of what is more generally referred to herein as a "distributed processing application master."

The WWH component 402-1 communicates with the client 412-1 over one or more networks. For example, the client 412-1 can be implemented on a client device that is separate from the node or nodes that implement at least portions of the WWH component 402-1. It is also possible that the client 412-1 can be implemented at least in part on the same processing device or set of processing devices that implements at least a portion of the WWH component 402-1.

The WWH component 402-1 is configured to interact with the Spark component 415-1. The Spark component 415-1 comprises a Spark Core driver program providing Spark context support. The Spark Core driver program is an example of what is more generally referred to herein as an "in-memory processing driver."

The diagram of FIG. 4 also illustrates a number of processing operations performed within the system 400. The operations are labeled 1 through 3 in the figure, and more specifically include the following:

1. Client 412-1 initiates a Spark application involving distributed in-memory computations by communicating with WWH application master of WWH component 402-1.

2. Within the WWH component 402-1, the WWH application master communicates with the WWH node manager and WWH aggregator.

3. The WWH node manager and WWH aggregator of WWH component 402-1 interacts with the Spark Core driver of the Spark component 415-1.

These particular operations and others referred to herein are presented by way of illustrative example only and can be varied in other embodiments.

Figure 5:
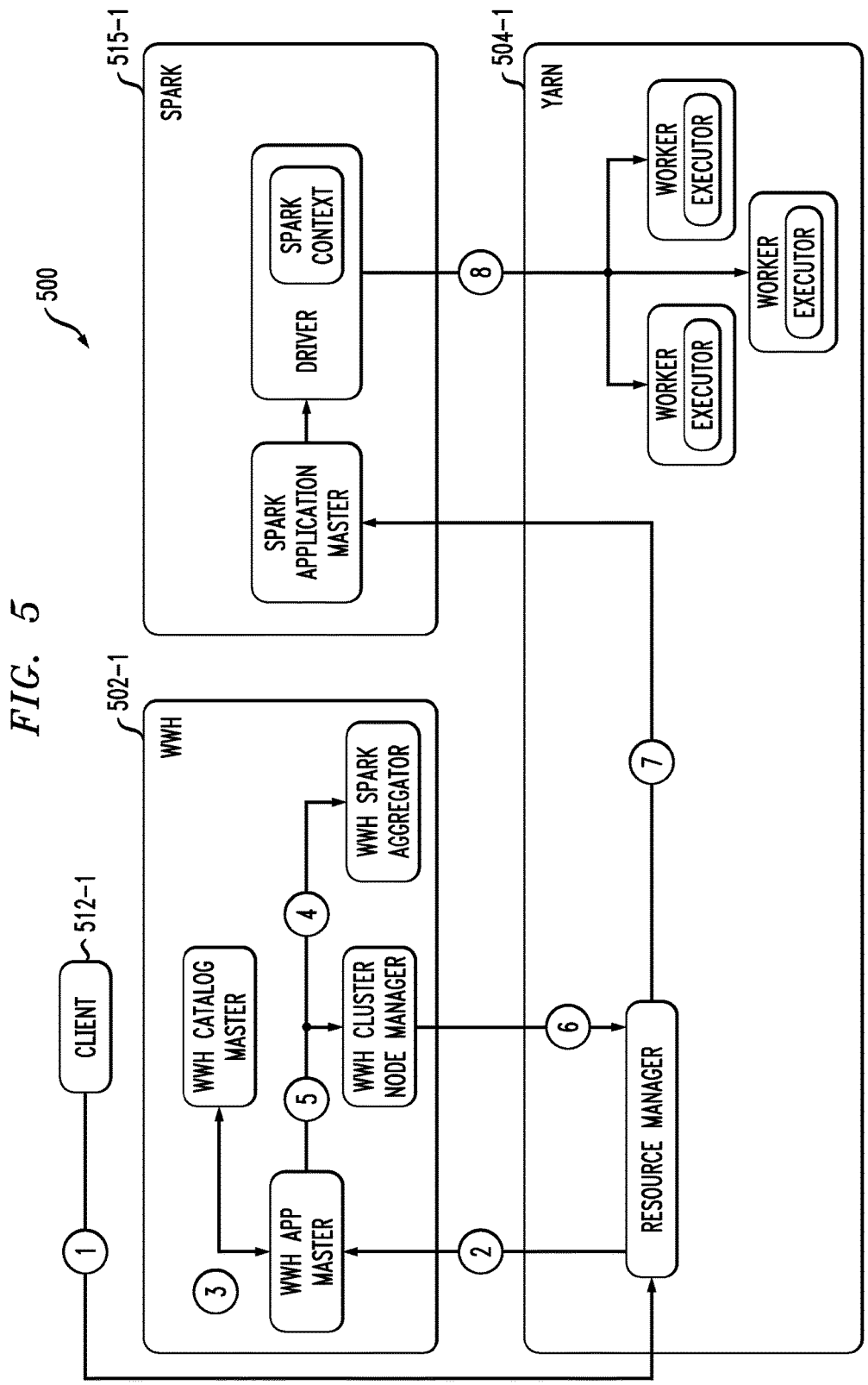
FIG. 5 shows a more detailed view of interactions between WWH, Spark and YARN components in a single cluster of a multi-cluster distributed data processing platform in an illustrative embodiment.

FIG. 5 shows a more detailed view of interactions between WWH, Spark and YARN components in a single cluster of a multi-cluster distributed data processing platform in an illustrative embodiment. In this embodiment, information processing system 500 comprises WWH component 502-1, YARN component 504-1, client 512-1 and Spark component 515-1. It is assumed that the WWH component 502-1, YARN component 504-1 and Spark component 515-1 are part of or otherwise associated with only a single cluster of a plurality of clusters of a WWH platform.

The WWH component 502-1 in this embodiment comprises a WWH application master, a WWH catalog master, a WWH cluster node manager and a WWH Spark aggregator.

The YARN component 504-1 comprises a resource manager and multiple worker components each having an associated executor.

The Spark component 515-1 comprises a Spark application master and a Spark Core driver supporting Spark context.

The resource manager of the YARN component 504-1 is coupled to the Spark Core driver via the Spark application master. The resource manager is also coupled to the WWH application master and the WWH cluster node manager of the WWH component 502-1.

The WWH application master of the WWH component 502-1 and the Spark Core driver of the Spark component 515-1 are therefore configured to communicate with one another via the resource manager of the YARN component 504-1.

The diagram of FIG. 5 also illustrates a number of processing operations performed within the system 500. The operations are labeled 1 through 8 in the figure, and more specifically include the following:

1. Client 512-1 initiates a Spark application involving distributed in-memory computations by communicating with the resource manager of the YARN component 504-1.

2. The resource manager of the YARN component 504-1 communicates with the WWH application master of the WWH component 502-1.

3. Within the WWH component 502-1, the WWH application master communicates with the WWH catalog master.

4. The WWH application master communicates with the WWH Spark aggregator.

5. The WWH application master communicates with the WWH cluster node manager.

6. The WWH cluster node manager communicates with the resource manager of the YARN component 504-1.

7. The resource manager communicates with the Spark Core driver of the Spark component 515-1 via the Spark application master.

8. The Spark Core driver interacts with multiple worker components of the YARN component 504-1 in order to execute in-memory computations within the single cluster of the system 500.

As in the previous embodiment, these particular operations are presented by way of illustrative example only and can be varied in other embodiments.

Figure 6:
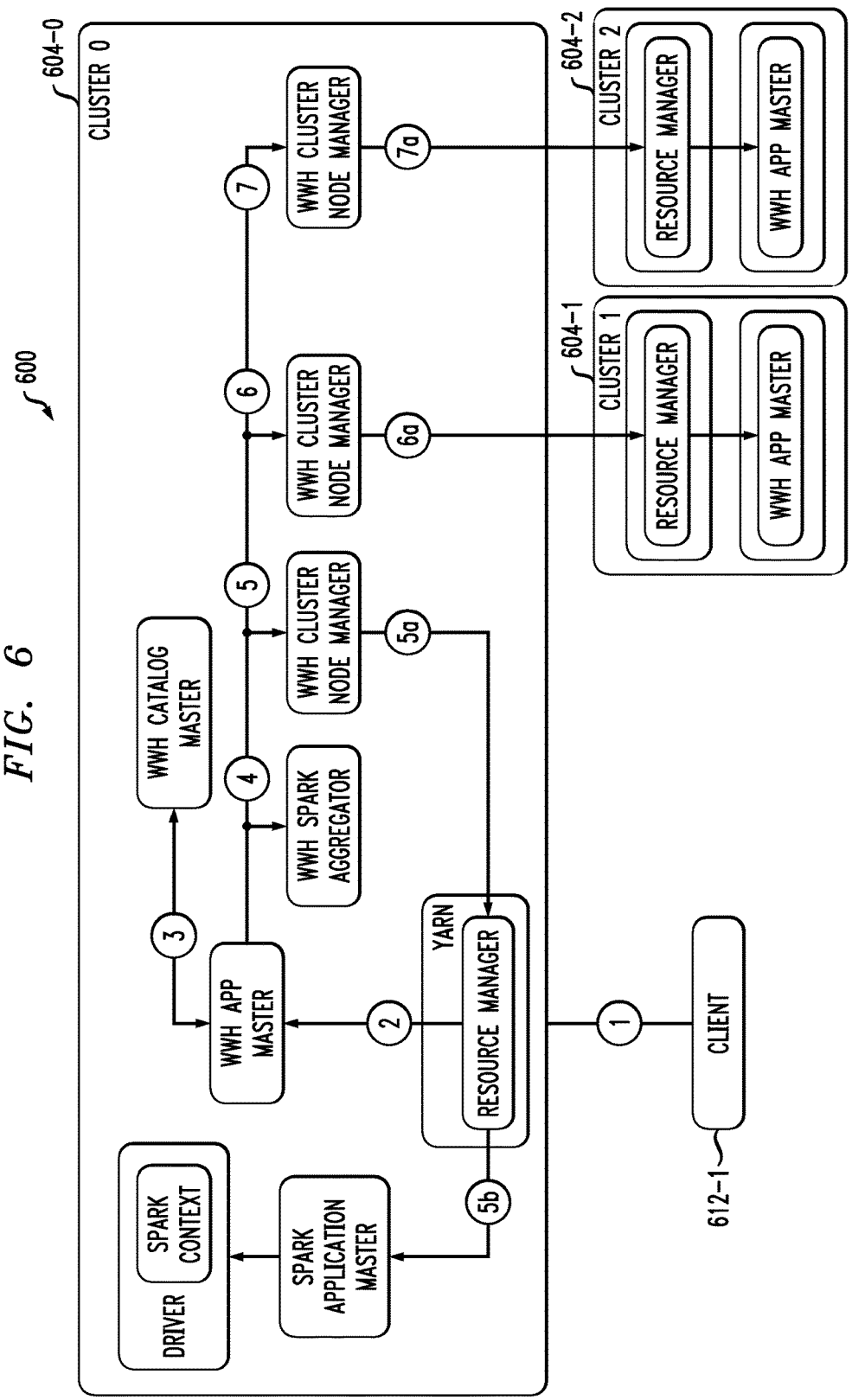
FIG. 6 shows a more detailed view of interactions between WWH, Spark and YARN components in multiple clusters of a multi-cluster distributed data processing platform in an illustrative embodiment.

FIG. 6 shows a more detailed view of interactions between WWH, Spark and YARN components in multiple clusters of a multi-cluster distributed data processing platform in an illustrative embodiment. In this embodiment, information processing system 600 comprises a plurality of distributed data processing clusters 604-0, 604-1 and 604-2, also denoted as Cluster 0, Cluster 1 and Cluster 2, respectively. The system 600 further comprises a client 612-1 that is in communication with the cluster 604-0. The client 612-1 may be implemented on a separate processing device that is coupled to the cluster 604-0 via one or more networks that are not explicitly shown. Alternatively, the client 612-1 can be implemented at least in part on one of the nodes of the cluster 604-0.

The cluster 604-0 is designated as a "local" cluster relative to the client 612-1 in this embodiment and the other clusters 604-1 and 604-2 are therefore referred to as respective "remote" clusters.

The cluster 604-0 includes WWH, YARN and Spark components similar to those previously described in conjunction with the embodiment of FIG. 5. More particularly, cluster 604-0 comprises a WWH component including a WWH application master, a WWH catalog master, local and remote WWH cluster node managers and a WWH Spark aggregator. The cluster 604-0 further comprises a YARN component that includes a resource manager, and a Spark component that includes a Spark application master and a Spark Core driver supporting Spark context.

The resource manager of the YARN component of cluster 604-0 is coupled to the Spark Core driver via the Spark application master. The resource manager is also coupled to the WWH application master and the local WWH cluster node manager. The WWH application master and the Spark Core driver within cluster 604-0 are therefore configured to communicate with one another via the resource manager of the YARN component of that cluster. The remote WWH cluster node managers of cluster 604-0 are coupled to respective resource managers in the remote clusters 604-1 and 604-2. Those resource managers communicate with WWH application masters of their respective clusters 604-1 and 604-2. Each of the remote clusters 604-1 and 604-2 in this embodiment is assumed to be configured in substantially the same manner as illustrated in the figure for local cluster 604-0.

The WWH application master of cluster 604-0 is configured to interact with the WWH application masters of respective clusters 604-1 and 604-2 in order to distribute Spark computations for execution. These interactions between the WWH application masters of the local and remote clusters 604-0, 604-1 and 604-2 occur via their respective YARN resource managers as illustrated in the figure.

The diagram of FIG. 6 also illustrates a number of processing operations performed within the system 600. The operations are labeled 1 through 7 in the figure, and more specifically include the following:

1. Client 612-1 initiates a Spark application involving distributed in-memory computations by communicating with the resource manager of the YARN component of cluster 604-0.

2. The resource manager of the YARN component communicates with the WWH application master of cluster 604-0.

3. The WWH application master communicates with the WWH catalog master.

4. The WWH application master communicates with the WWH Spark aggregator.

5. The WWH application master communicates with the WWH cluster node manager for local cluster 604-0.

5a. The WWH cluster node manager for local cluster 604-0 communicates with the resource manager of that cluster.

5b. The resource manager of cluster 604-0 communicates with the Spark application master of that cluster.

6. The WWH application master communicates with the WWH cluster node manager for remote cluster 604-1.

6a. The WWH cluster node manager of local cluster 604-0 communicates with the resource manager of remote cluster 604-1.

7. The WWH application master communicates with the WWH cluster node manager for remote cluster 604-2.

7a. The WWH cluster node manager of local cluster 604-0 communicates with the resource manager of remote cluster 604-2.

As in the previous embodiment, these particular operations are presented by way of illustrative example only and can be varied in other embodiments.

The FIG. 6 embodiment is an example of an arrangement in which the data resources required by an application submitted by a client include remote data resources in respective additional YARN clusters 604-1 and 604-2 other than the YARN cluster 604-0 that initiates the application.

Assume by way of further example that the client 612-1 submits an application in cluster 604-0 and the needed data resources reside in clusters 604-1 and 604-2. More particularly, the client submits an application to the resource manager residing in cluster 604-0, which creates an instance of the WWH application master, which then connects with the WWH catalog master through a data resource resolving API. The WWH catalog master returns a list of resources containing resources that reside in cluster 604-1 and resources that reside in cluster 604-2. The WWH application master then creates an instance of the WWH Spark aggregator and then instances of the WWH cluster node manager for communicating with the respective remote clusters 604-1 and 604-2.

It should be noted that only a single WWH cluster node manager will typically be needed for communications between the local cluster 604-0 and a given one of the remote clusters 604-1 or 604-2. Accordingly, in the event another application is started in cluster 604-0 that also needs data resources residing in cluster 604-1, the cluster 604-0 will not create another instance of the WWH cluster node manager but will instead utilize the existing instance of the WWH cluster node manager previously created to communicate with cluster 604-1 in the context of the other application.

The WWH cluster node managers of cluster 604-0 initiate applications in the respective remote clusters 604-1 and 604-2 via the resource managers of those clusters. This causes the resource managers of clusters 604-1 and 604-2 to start respective WWH application masters in their respective clusters in order to execute the applications using the data resources local to those clusters.

Additional levels of recursion can be implemented in a similar manner by the WWH application masters in the respective clusters 604-1 and 604-2.

The particular number of clusters involved in performing distributed in-memory computations can be dynamically varied over time within a given information processing system. Accordingly, such a system exhibits a high level of scalability to accommodate varying computational needs. For example, additional clusters can be added as needed via recursion or otherwise in order to allow the system to easily handle an increase in the volume of in-memory computations to be performed.

Figure 7:
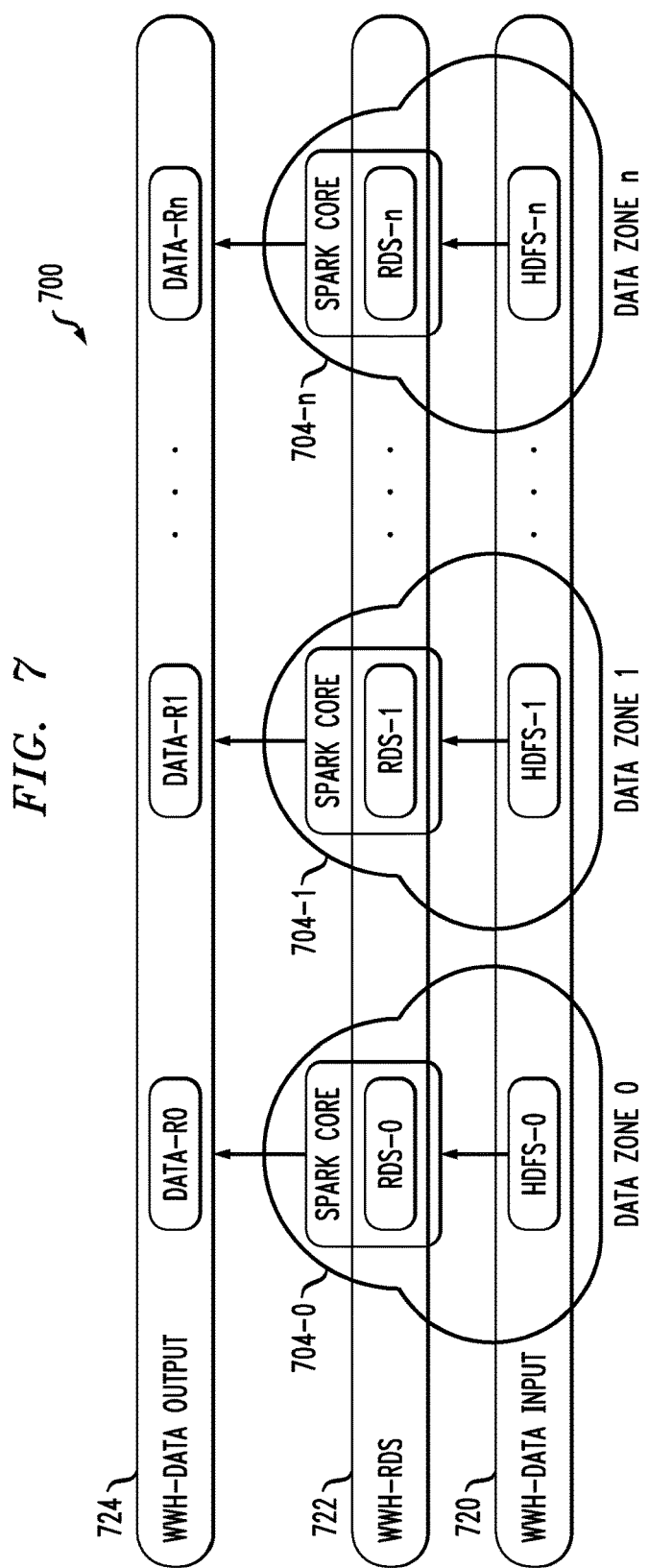
FIGS. 7-9 show additional illustrative embodiments of multi-cluster distributed data processing platforms configured to implement scalable distributed in-memory computation functionality.
Figure 8:
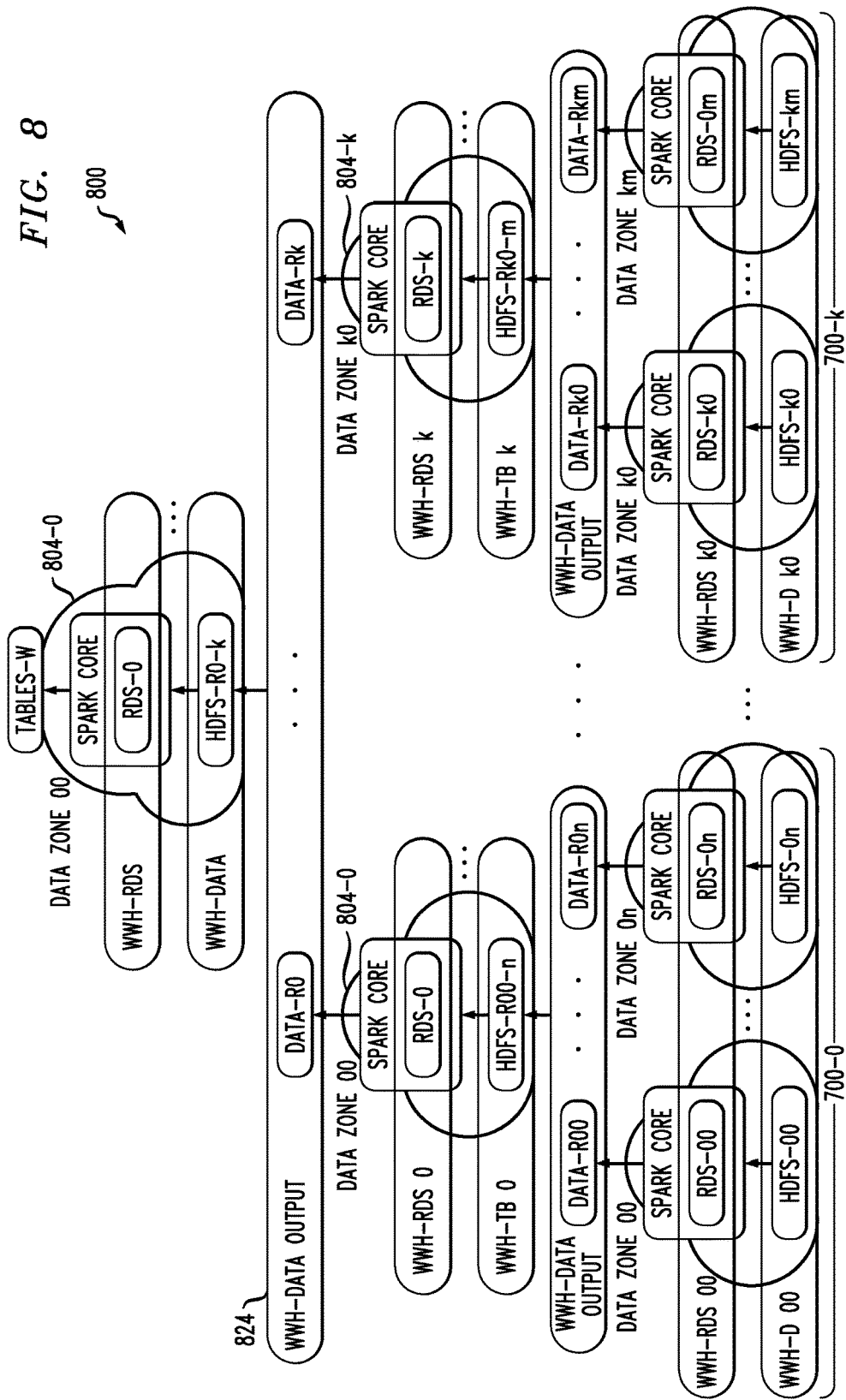
Figure 9:
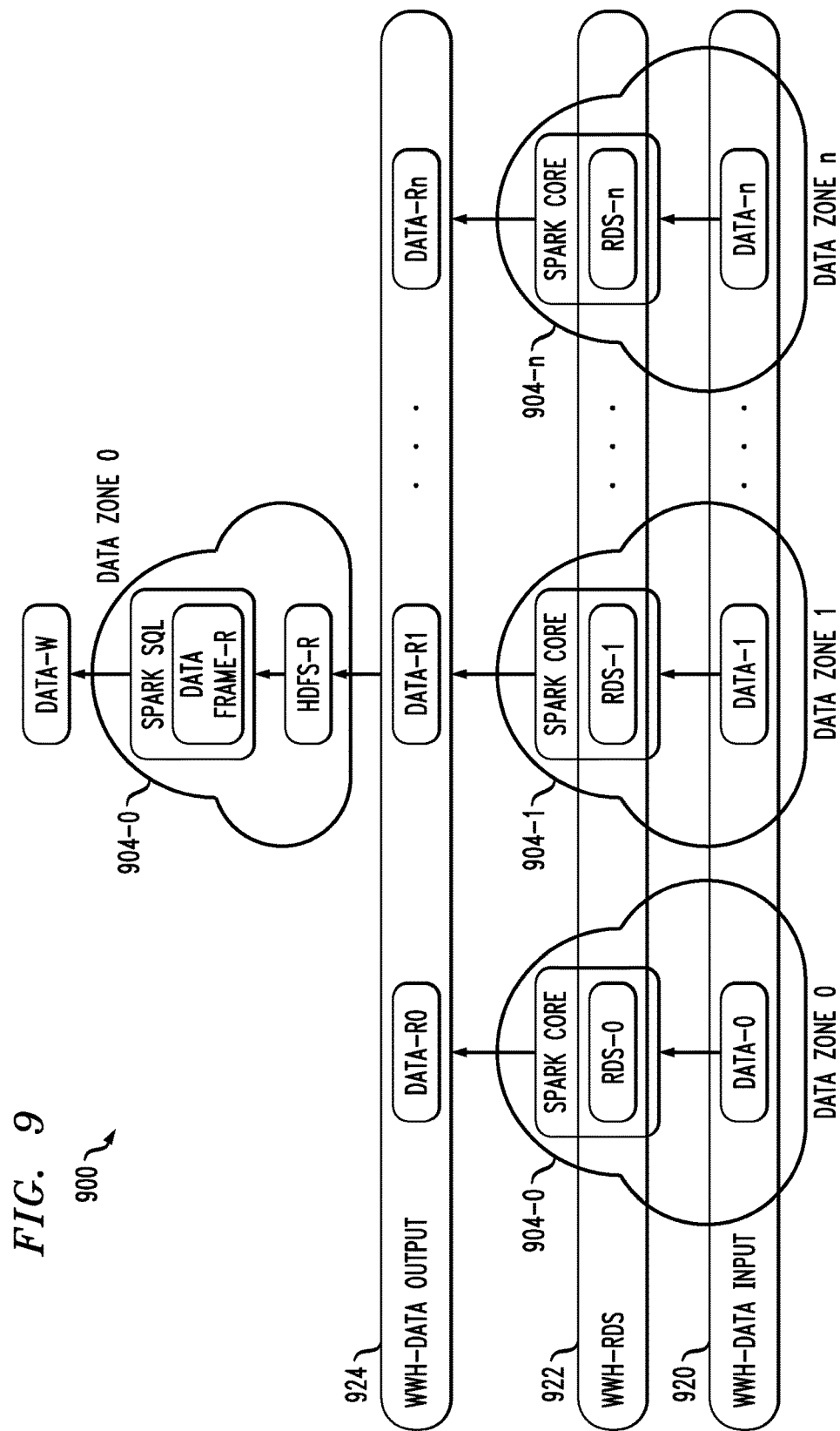

FIGS. 7-9 show other examples of illustrative embodiments of multi-cluster distributed data processing platforms configured to implement scalable distributed in-memory computation functionality. Each of these embodiments includes multiple clusters in the form of respective multiple distinct clouds of potentially different types. For example, the multiple clouds may include at least one hybrid cloud that comprises one or more private clouds together with one or more public clouds among which workloads can be migrated, with all clouds of the hybrid cloud sharing a common virtualization management layer. As another example, the multiple clouds may comprise a multi-cloud arrangement comprising a collection of private and/or public clouds associated with a given enterprise.

These and other cloud-based embodiments disclosed herein provide a high degree of flexibility and scalability for implementing Spark batch computations and other types of distributed in-memory computations.

FIG. 7 illustrates one example of a multi-cloud arrangement for distributed in-memory computation. In this particular embodiment, scalable distributed in-memory computation functionality is implemented in an information processing system 700 using multiple distinct clusters corresponding to respective clouds 704-0, 704-1, . . . 704-n of respective different data zones denoted Data Zone 0, Data Zone 1, . . . Data Zone n. The clouds 704 may be of the same type or of different types. For example, some embodiments may include a mixture of multiple distinct clouds 704 of different types, such as an Amazon Web Services cloud, a Microsoft Azure cloud and an on-premises cloud that illustratively comprises a virtual machine based cloud. One or more of the clouds 704 may be implemented using a corresponding Cloud Foundry platform and local Big Data cluster, although numerous other arrangements are possible.

Each of the clouds 704 in this embodiment is assumed to comprise a corresponding YARN cluster that includes a Spark Core component as illustrated. The Spark Core components manage respective resilient datasets denoted RDS-0, RDS-1, . . . RDS-n within their respective YARN clusters. These datasets utilize underlying HDFS storage distributed storage components denoted HDFS-0, HDFS-1, . . . HDFS-n. Results of computations performed in the respective clusters are provided as data results denoted Data-R0, Data-R, . . . Data-Rn.

The datasets in a given embodiment may comprise any of a wide variety of different types of structured and unstructured data, including relational database tables, text documentation, pictures, video, device data, log files, genomic sequences, weather readings, social data feeds and many others.

The information processing system 700 provides an illustrative implementation of an exemplary distributed in-memory computation that is referred to herein as World Wide RDD ("WW-RDD"). Such an arrangement provides an extension to the Spark RDD framework in order to allow Spark computations to be performed in a distributed manner across multiple clusters associated with different data zones.

The WW-RDD framework as illustrated in FIG. 7 is arranged in multiple levels including a data input level 720, a Spark computation level 722, and a data output level 724. The distributed in-memory computations in this embodiment are performed as close as possible to their respective data sources in the corresponding HDFS components of the input data level 720 of the respective clouds 704. Results of the computations from the Spark computation level 722 are surfaced to the data output level 724 while the corresponding data remains within the respective data zones of the clouds 704.

FIG. 8 illustrates an information processing system 800 in which multiple WW-RDD frameworks of the type shown in FIG. 7 are combined in order to support recursiveness in distributed in-memory computations. The system 800 comprises multiple instances of the system 700, denoted as systems 700-0 through 700-k. The data output level of each of the systems 700-0 through 700-k is associated with a different one of a plurality of additional clouds 804-0 through 804-k. Each of these additional clouds 804 is assumed to comprise an additional YARN cluster of the system 800. Distributed in-memory computation results from the additional clouds 804 are surfaced through a data output level 824.

In this embodiment, it is assumed that an initiating application is originated in the cloud 804-0 and utilizes local data resources of that local cloud and its underlying instance of the system 700 as well as remote data resources of other ones of the clouds 804 and their respective underlying instances of the system 700. The cloud 804-0 aggregates computation results from the data output level 824 into a set of tables ("Tables-W") that are made available to the requesting client. The data resources utilized in generating those results remain protected within the data zones of their respective clouds.

Numerous other implementations of recursion in distributed in-memory computations can be implemented utilizing WW-RDD frameworks of the type described in conjunction with the embodiments of FIGS. 7 and 8.

Each RDD utilized in a given WW-RDD framework instance can be created from different data sources, can be analyzed independently of other RDDs and can be analyzed in parallel with other RDDs.

Another example of an information processing system 900 configured with a WW-RDD framework is shown in FIG. 9. In this embodiment, system 900 comprises multiple clouds 904-0, 904-1, . . . 904-n, each assumed to correspond to a separate YARN cluster. Cloud 904-0 includes a Spark Core component as well as a Spark SQL component. An application initiated on cloud 904-0 utilizes the Spark SQL component of that cloud and associated distributed in-memory computations are performed using data resources locally accessible to respective clouds 904-0 through 904-n at a data input level 920. The system 900 includes a Spark computation level 922, and a data output level 924. Results of the distributed in-memory computations performed using the data resources of the data input level 920 are surfaced via the data output level 924 back to the Spark SQL component of the initiating cloud 904-0. These results are further processed in the Spark SQL component in order to provide an appropriate output ("Data-W") back to the requesting client.

The illustrative embodiments of FIGS. 7-9 are particularly configured for distribution of Spark computations in batch mode, but can be adapted to perform other types of distributed in-memory computation. The distribution of in-memory computations can be across any geographic territory, from clusters located in the same data center to clusters distributed across the world. The distribution can be done across physical domains, such as different physical hardware clusters, or across logical or virtual entities, such as two micro-segments defined by a virtual network framework.

These illustrative embodiments execute portions of Spark batch computations on each of the RDDs in a given WW-RDD framework instance, and aggregate the results from the individual RDDs into a global computation result. As noted above, the WW-RDD framework allows for the independent and parallel execution of Spark computations on each of the RDDs in the same or different clusters. Such arrangements ensure that the distributed in-memory computations are performed as close as possible to the corresponding data resources without violating data access or movement restrictions of any data zone.

The WW-RDD framework in the embodiments of FIGS. 7-9 is highly flexible and allows computation code to be written in any language that supports the Spark Core API, including JAVA, R, Python and Scala.

The WW-RDD framework in some embodiments is configured to leverage a WWH catalog service to determine the particular clusters to be involved in a given set of distributed in-memory computations. This also involves locating the needed data sources for each of the associated RDDs.

The WW-RDD framework in some embodiments is configured to manage the distribution of in-memory computations across disparate data processing clusters of a WWH platform, including choosing the appropriate data processing clusters and managing the various data processing requirements and data governance involved when aggregating computation results derived from separate, dispersed datasets.

The WW-RDD framework in some embodiments allows computations to be distributed in a recursive fashion that is transparent to an originating client or other user.

In these and other embodiments, the distributed in-memory computations may be performed utilizing multiple instances of local code running on respective nodes within respective ones of the data processing clusters and at least one instance of global code running on an initiating node within or otherwise associated with a particular one of the data processing clusters. The global code receives respective results from the multiple instances of the local code running on the respective nodes within the respective ones of the data processing clusters and aggregates those results. An application running on a client device or on a given cluster node may provide one or more of the local code, the global code and a list of data resources to a distributed processing application master of a WWH component. The list of data resources illustratively identifies particular data resources against which one or more of the local code and the global code are to be executed.

As an example of one possible implementation of the WW-RDD framework described above, consider a business or other enterprise that has employee data scattered across many geographically-distributed sites. Assume that the enterprise as part of an analytics job wants to calculate the average salary of all employees that are women, of a certain age and occupying a certain range in the organizational structure.

An application developer in this example writes code for performing Spark batch mode computations to obtain the desired result. The code includes local code to run in each cluster in which needed data resides, as well as global code to aggregate the computation results from the clusters.

A given instance of the local code processes all of the entries in a local dataset within a corresponding cluster to determine those entries that meet the original constraints of being about women, of a certain age and a certain ranking within the organization structure of the enterprise, and then adds the salaries of all such entries and counts the number of salaries that were added. This calculation illustratively returns a computation result in the form of a value pair <SumOfSalaries, NumberOfSalariesSummed>.

The global code runs on an initiating node, and receives all of the value pairs returned by the respective clusters participating in the distributed in-memory computations, and then calculates the global average. More particularly, the global code will first calculate TotalOfSalaries=sum of all SumOfSalaries, and then calculate TotalNumberOfEntries=sum of NumberOfSalariesSummed, and finally calculate the global average by simply dividing TotalOfSalaries by TotalNumberOfEntries.

As noted above, an application user can pass local code, global code and lists of data resources to be analyzed to an initiating node. The WW-RDD framework as described previously in conjunction with FIGS. 7-9 will then distribute the local code to clusters in respective data zones in which computations should be performed, collect the corresponding results and execute the global code on those results to provide a global computation result. Recursion can be used as needed in order to allow a given cluster in one data zone to enlist the involvement one or more other clusters in other data zones.

It was mentioned previously that some embodiments are implemented in a hybrid cloud or a multi-cloud configuration, where enterprises have datasets scattered across these clouds. For example, an enterprise may have their customer data residing in a Sales Force public cloud, its Enterprise Resource Planning (ERP) data in a Virtustream cloud, and the rest of its data in its own private cloud, which may contain several clusters, each storing a percentage of the data. Each of these clouds or clusters may correspond to a different data zone.

Accordingly, some embodiments are configured for cloud, hybrid cloud and multi-cloud applications in which enterprises have data scattered across several locations and are unable to actually bring this data to single location for analysis. For example, illustrative embodiments can accommodate arrangements in which data is distributed across different data centers or in different clouds, such as an Amazon Web Services cloud, a Microsoft Azure cloud and an on-premises private cloud, while avoiding concerns associated with data transfer.

A given information processing system with scalable distributed in-memory computation functionality as disclosed herein can be configured to include different cloud architectures, handling the distribution of data tasks without requiring the corresponding data to be combined in a single location or cluster. Accordingly, data can be processed in place even if parts of the data are stored across a multi-cloud environment.

It is to be understood, however, that the WW-RDD framework is not limited to such cloud-based arrangements. For example, some embodiments may involve IoT applications in which data is collected at the edge of a given IoT system in large volumes and needs to be analyzed and aggregated as close as possible to the point of collection. For example, such situations can arise if an IoT gateway has difficulties connecting to a central location or cloud.

Additional illustrative embodiments extend the above-described WW-RDD framework to support example Spark batch mode extensions including Spark SQL, Spark Machine Learning library (MLlib) and Spark GraphX. These illustrative embodiments will now be described with reference to FIGS. 10 through 15.

Figure 10:
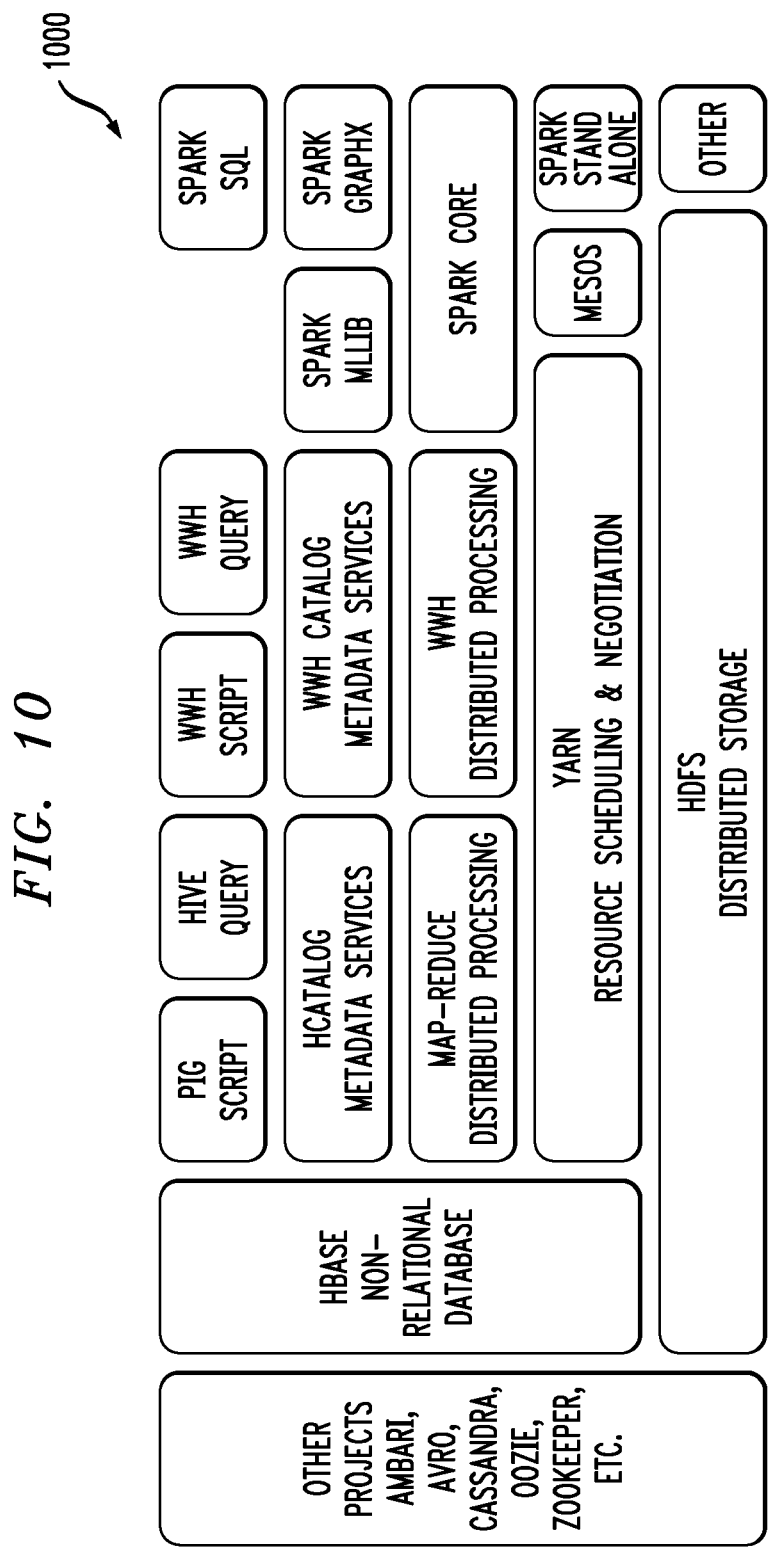
FIG. 10 is a stack diagram showing relationships between components of an information processing system with scalable distributed in-memory computation functionality using batch mode extensions in an illustrative embodiment.

FIG. 10 is a stack diagram showing relationships between components of an information processing system 1000 with scalable distributed in-memory computation functionality using batch mode extensions in an illustrative embodiment. This diagram is similar to the stack architecture of FIG. 3, but the Spark Core component now includes support for batch mode extensions Spark SQL, Spark MLlib and Spark GraphX. Other distinctions relative to the FIG. 3 embodiment include support for WWH scripts and WWH queries utilizing the underlying WWH catalog metadata services component. Also, the Spark Core component can run on additional platforms such as Mesos as well as in stand-alone Spark instantiations. Other types of Spark instantiations can also be included, possibly utilizing additional or alternative storage arrangements other than HDFS distributed storage.

The layered architecture of the system 1000 provides extension of the WWH framework to support the Spark batch mode extensions Spark SQL, Spark MLlib and Spark GraphX. These are examples of Spark batch modes. As described previously, Spark performs in-memory computations utilizing RDDs. Spark generally provides a distributed data processing engine that can operate in multiple modes, such as batch, interactive and streaming modes. The Spark batch mode extensions Spark SQL, Spark MLlib and Spark GraphX implement additional functionality including SQL query processing, graph processing and machine learning, respectively. Although some illustrative embodiments described herein focus on Spark processing in the batch mode of operation, it is to be appreciated that the WWH framework can also be extended to support other types of Spark applications running in other operating modes, such as interactive and streaming modes.

In the FIG. 10 embodiment, the WWH distributed processing component of system 1000 is configured to interact with the Spark Core component. Such an arrangement illustratively involves distributing Spark computations across multiple clusters, allowing the computations to benefit from the principle of data locality. For example, a given computation may be performed as close as possible to the needed data, thereby minimizing data movement and preserving privacy, as only the results of the given computation are shared beyond the corresponding data zone, and not the original data itself.

Figure 11:
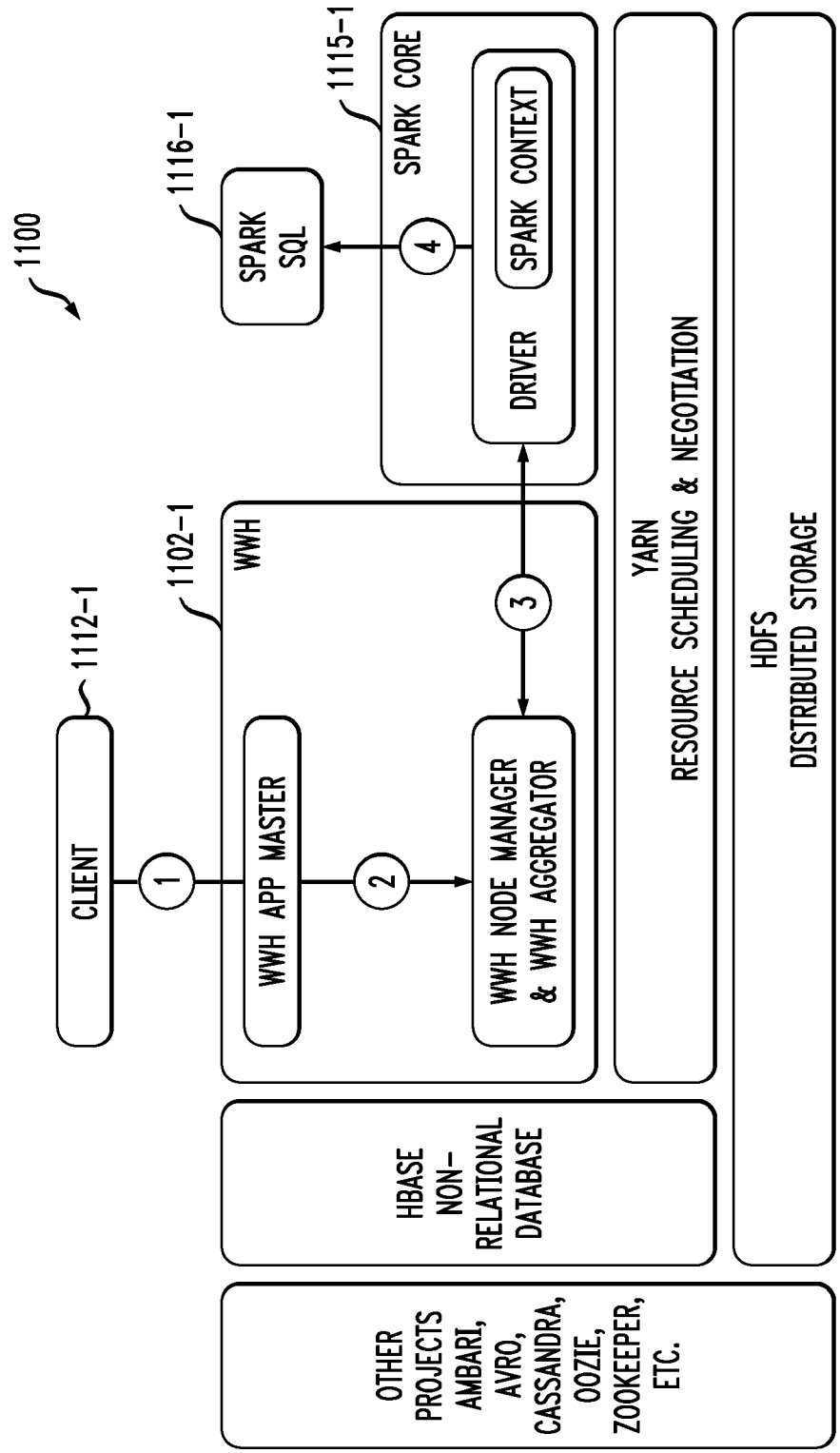
FIGS. 11, 12 and 13 show example interactions between WWH and respective Spark SQL, MLlib and GraphX components in an illustrative embodiment.

FIG. 11 illustrates another embodiment of an information processing system 1100 with scalable distributed in-memory computation functionality. The system 1100 includes a WWH component 1102-1, a client 1112-1 and a Spark component 1115-1. The Spark component 1115-1 interacts with a Spark SQL component 1116-1 as shown.

The WWH component 1102-1 may comprise at least a portion of one or more WWH nodes of a WWH platform of the type previously described. Additionally or alternatively, it may comprise at least portions of one or more distributed data processing clusters. The WWH component 1102-1 includes a WWH application master, as well as a WWH node manager and a WWH aggregator. The WWH application master is an example of what is more generally referred to herein as a "distributed processing application master."

The WWH component 1102-1 communicates with the client 1112-1 over one or more networks. For example, the client 1112-1 can be implemented on a client device that is separate from the node or nodes that implement at least portions of the WWH component 1102-1. It is also possible that the client 1112-1 can be implemented at least in part on the same processing device or set of processing devices that implements at least a portion of the WWH component 1102-1.

The WWH component 1102-1 is configured to interact with the Spark component 1115-1. The Spark component 1115-1 comprises a Spark Core driver program providing Spark context support. The Spark Core driver program is an example of what is more generally referred to herein as an "in-memory processing driver."

The diagram of FIG. 11 also illustrates a number of processing operations performed within the system 1100. The operations are labeled 1 through 4 in the figure, and more specifically include the following:

1. Client 1112-1 initiates a Spark application involving distributed in-memory computations by communicating with WWH application master of WWH component 1102-1.

2. Within the WWH component 1102-1, the WWH application master communicates with the WWH node manager and WWH aggregator.

3. The WWH node manager and WWH aggregator of WWH component 1102-1 interacts with the Spark Core driver of the Spark component 1115-1.

4. The Spark component 1115-1 interacts with the Spark SQL component 1116-1.

These particular operations and others referred to herein are presented by way of illustrative example only and can be varied in other embodiments.

Figure 12:
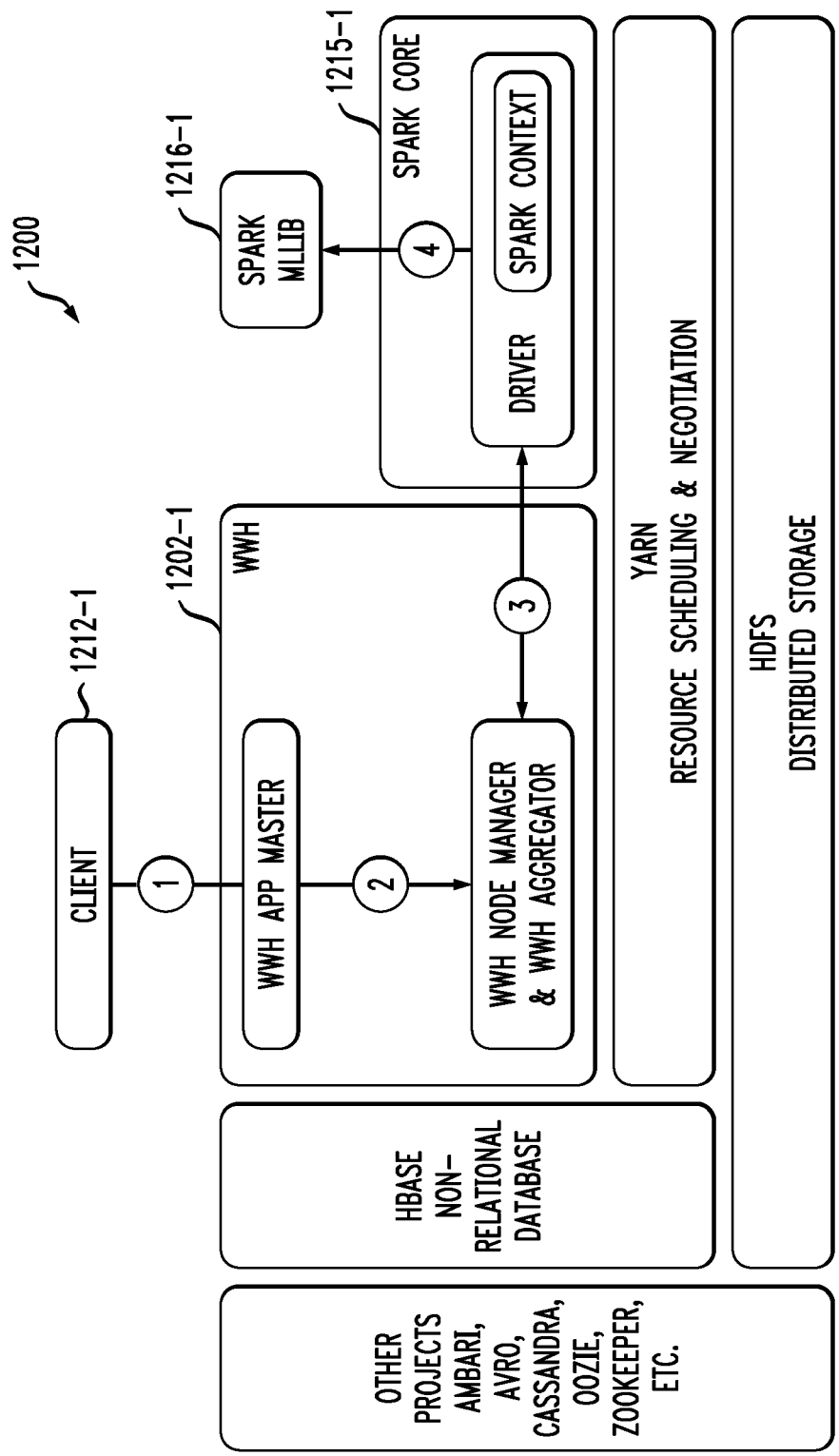
Figure 13:
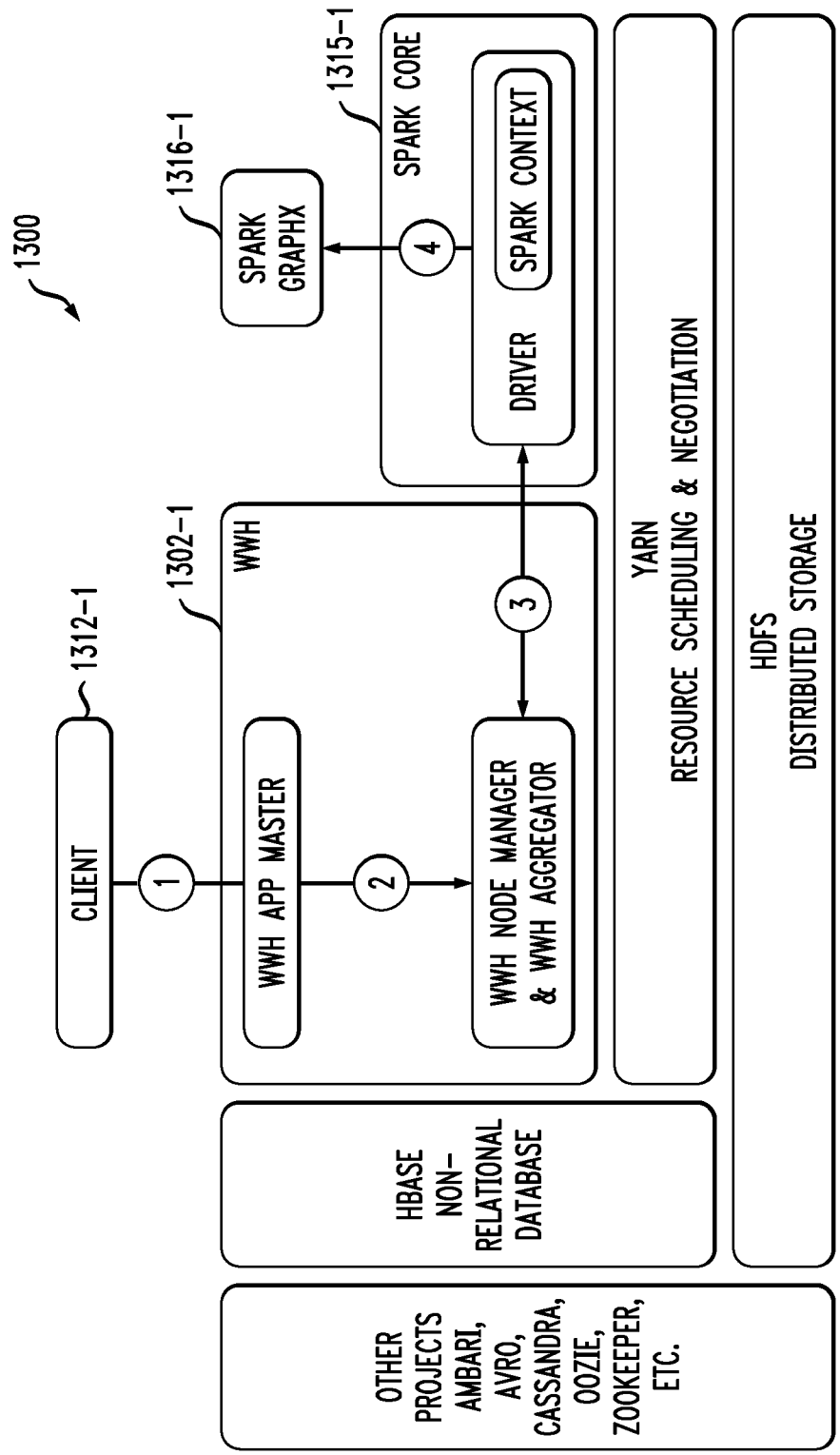

FIGS. 12 and 13 correspond generally to FIG. 11, but relate to respective Spark batch mode extensions Spark MLlib and Spark GraphX.

With regard to FIG. 12, an embodiment of an information processing system 1200 with scalable distributed in-memory computation functionality is shown. The system 1200 includes a WWH component 1202-1, a client 1212-1 and a Spark component 1215-1. The Spark component 1215-1 interacts with a Spark MLlib component 1216-1 as shown. Its operation is otherwise similar to that of the FIG. 11 embodiment.

With regard to FIG. 13, an embodiment of an information processing system 1300 with scalable distributed in-memory computation functionality is shown. The system 1300 includes a WWH component 1302-1, a client 1312-1 and a Spark component 1315-1. The Spark component 1315-1 interacts with a Spark GraphX component 1316-1 as shown. Its operation is otherwise similar to that of the FIG. 11 embodiment.

Figure 14:
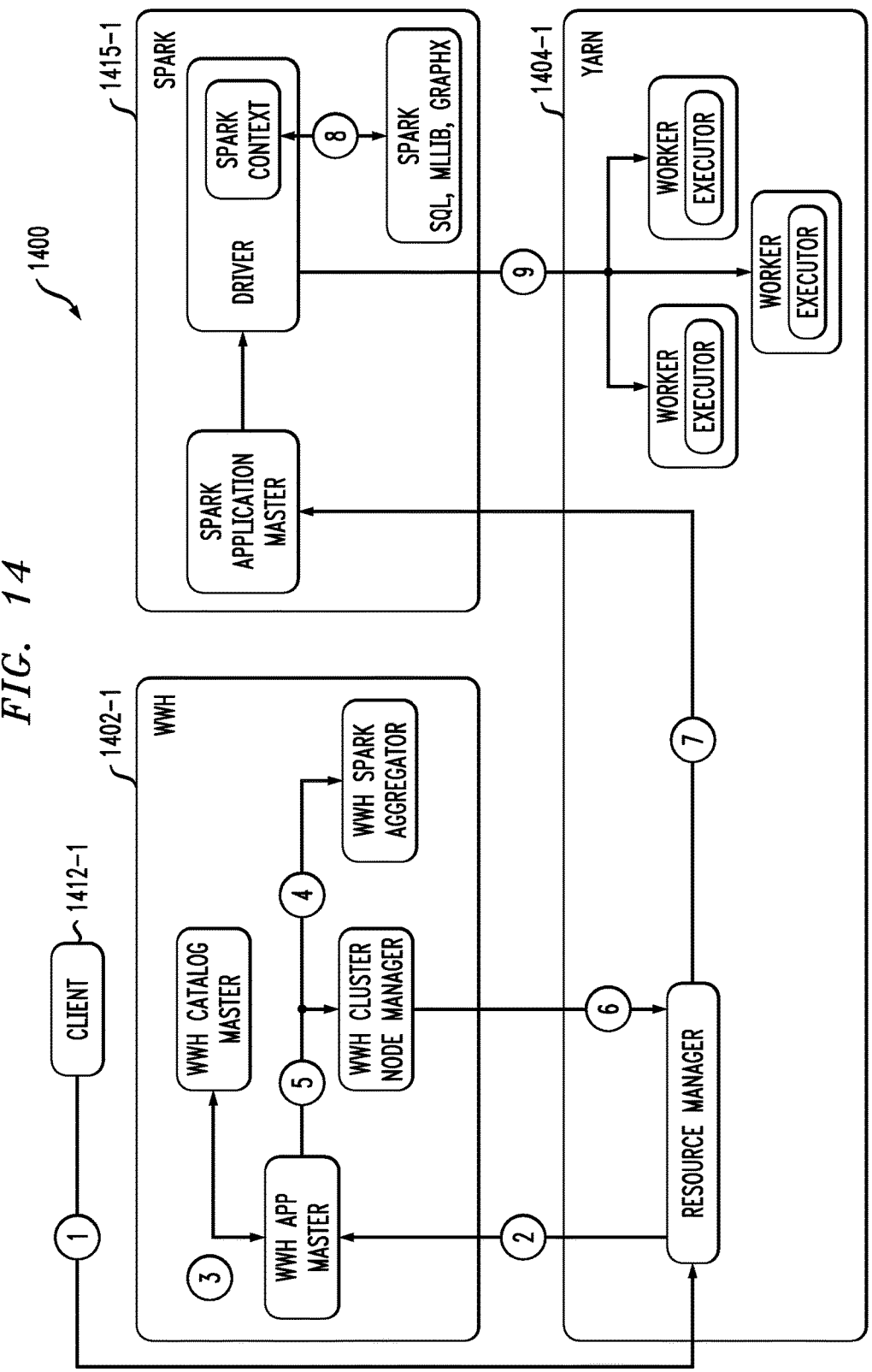
FIG. 14 shows a more detailed view of interactions between WWH, Spark and YARN components in a single cluster of a multi-cluster distributed data processing platform in an illustrative embodiment.

FIG. 14 shows a more detailed view of interactions between WWH, Spark and YARN components in a single cluster of a multi-cluster distributed data processing platform in an illustrative embodiment. In this embodiment, information processing system 1400 comprises WWH component 1402-1, YARN component 1404-1, client 1412-1 and Spark component 1415-1. It is assumed that the WWH component 1402-1, YARN component 1404-1 and Spark component 1415-1 are part of or otherwise associated with only a single cluster of a plurality of clusters of a WWH platform.

The WWH component 1402-1 in this embodiment comprises a WWH application master, a WWH catalog master, a WWH cluster node manager and a WWH Spark aggregator.

The YARN component 1404-1 comprises a resource manager and multiple worker components each having an associated executor.

The Spark component 1415-1 comprises a Spark application master and a Spark Core driver supporting Spark context. The Spark component 1415-1 further comprises a Spark batch extension component implementing Spark SQL, Spark MLlib and Spark GraphX batch mode extensions.

The resource manager of the YARN component 1404-1 is coupled to the Spark Core driver via the Spark application master. The resource manager is also coupled to the WWH application master and the WWH cluster node manager of the WWH component 1402-1.

The WWH application master of the WWH component 1402-1 and the Spark Core driver of the Spark component 1415-1 are therefore configured to communicate with one another via the resource manager of the YARN component 1404-1.

The diagram of FIG. 14 also illustrates a number of processing operations performed within the system 1400. The operations are labeled 1 through 9 in the figure, and more specifically include the following:

1. Client 1412-1 initiates a Spark application involving distributed in-memory computations by communicating with the resource manager of the YARN component 1404-1.

2. The resource manager of the YARN component 1404-1 communicates with the WWH application master of the WWH component 1402-1.

3. Within the WWH component 1402-1, the WWH application master communicates with the WWH catalog master.

4. The WWH application master communicates with the WWH Spark aggregator.

5. The WWH application master communicates with the WWH cluster node manager.

6. The WWH cluster node manager communicates with the resource manager of the YARN component 1404-1.

7. The resource manager communicates with the Spark Core driver of the Spark component 1415-1 via the Spark application master.

8. The Spark Core driver interacts with one or more of the Spark SQL, Spark MLlib and Spark GraphX batch mode extensions of the Spark batch extension component.

9. The Spark Core driver interacts with multiple worker components of the YARN component 1404-1 in order to execute in-memory computations within the single cluster of the system 1400.

As in the previous embodiment, these particular operations are presented by way of illustrative example only and can be varied in other embodiments.

Figure 15:
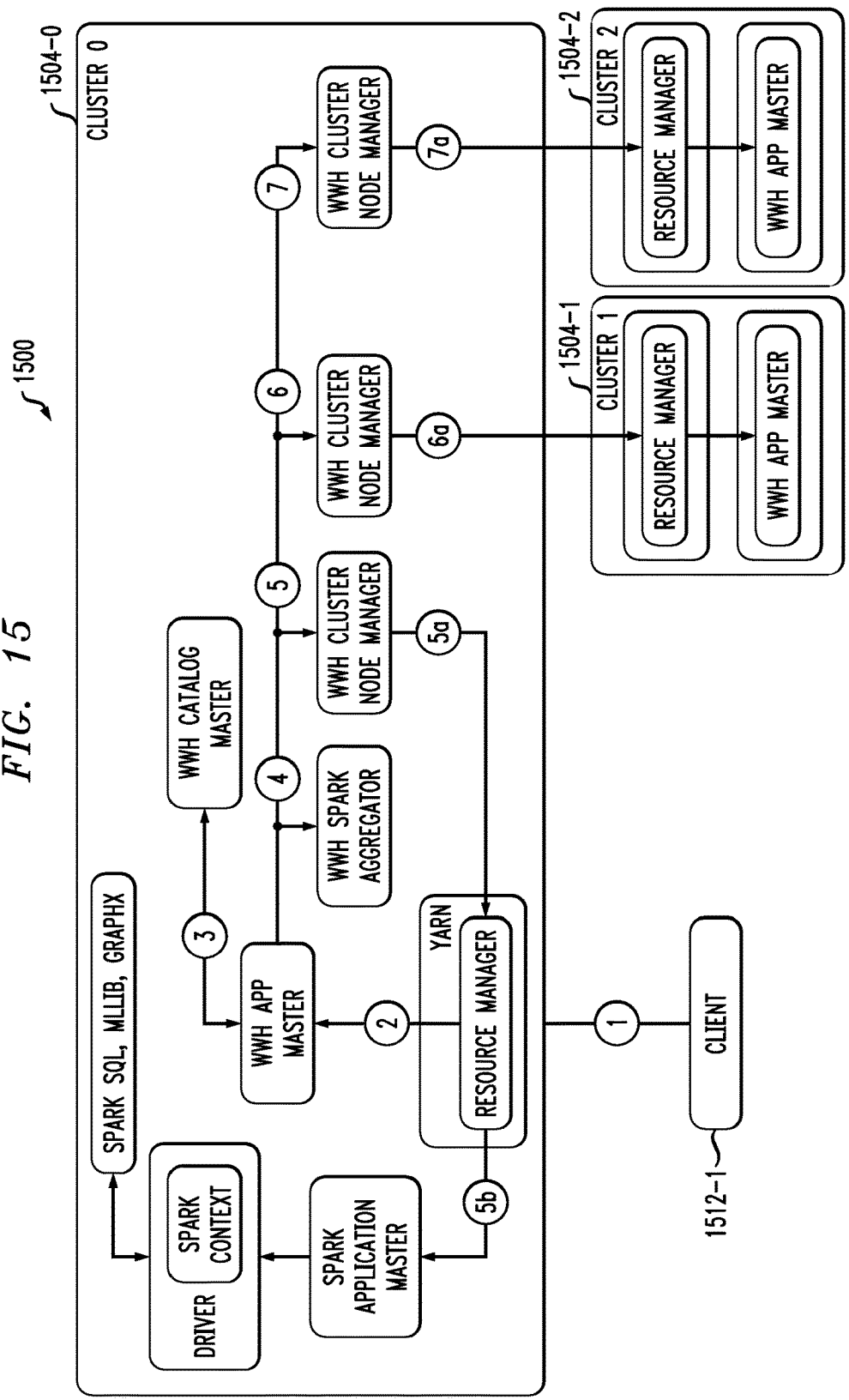
FIG. 15 shows a more detailed view of interactions between WWH, Spark and YARN components in multiple clusters of a multi-cluster distributed data processing platform in an illustrative embodiment.

FIG. 15 shows a more detailed view of interactions between WWH, Spark and YARN components in multiple clusters of a multi-cluster distributed data processing platform in an illustrative embodiment. In this embodiment, information processing system 1500 comprises a plurality of distributed data processing clusters 1504-0, 1504-1 and 1504-2, also denoted as Cluster 0, Cluster 1 and Cluster 2, respectively. The system 1500 further comprises a client 1512-1 that is in communication with the cluster 1504-0. The client 1512-1 may be implemented on a separate processing device that is coupled to the cluster 1504-0 via one or more networks that are not explicitly shown. Alternatively, the client 1512-1 can be implemented at least in part on one of the nodes of the cluster 1504-0.

The cluster 1504-0 is designated as a "local" cluster relative to the client 1512-1 in this embodiment and the other clusters 1504-1 and 1504-2 are therefore referred to as respective "remote" clusters.

The cluster 1504-0 includes WWH, YARN and Spark components similar to those previously described in conjunction with the embodiment of FIG. 14. More particularly, cluster 1504-0 comprises a WWH component including a WWH application master, a WWH catalog master, local and remote WWH cluster node managers and a WWH Spark aggregator. The cluster 1504-0 further comprises a YARN component that includes a resource manager, and a Spark component that includes a Spark application master and a Spark Core driver supporting Spark context. The Spark component in this embodiment further comprises a Spark batch extension component illustratively implementing Spark SQL, Spark MLlib and Spark GraphX batch mode extensions.

The resource manager of the YARN component of cluster 1504-0 is coupled to the Spark Core driver via the Spark application master. The resource manager is also coupled to the WWH application master and the local WWH cluster node manager. The WWH application master and the Spark Core driver within cluster 1504-0 are therefore configured to communicate with one another via the resource manager of the YARN component of that cluster. The remote WWH cluster node managers of cluster 1504-0 are coupled to respective resource managers in the remote clusters 1504-1 and 1504-2. Those resource managers communicate with WWH application masters of their respective clusters 1504-1 and 1504-2. Each of the remote clusters 1504-1 and 1504-2 in this embodiment is assumed to be configured in substantially the same manner as illustrated in the figure for local cluster 1504-0.

The WWH application master of cluster 1504-0 is configured to interact with the WWH application masters of respective clusters 1504-1 and 1504-2 in order to distribute Spark computations for execution. These interactions between the WWH application masters of the local and remote clusters 1504-0, 1504-1 and 1504-2 occur via their respective YARN resource managers as illustrated in the figure.

The diagram of FIG. 15 also illustrates a number of processing operations performed within the system 1500. The operations are labeled 1 through 7 in the figure, and are performed in a manner similar to that previously described in conjunction with the illustrative embodiment of FIG. 6. Again, these particular operations are presented by way of illustrative example only and can be varied in other embodiments.

The FIG. 15 embodiment is an example of an arrangement in which the data resources required by an application submitted by a client include remote data resources in respective additional YARN clusters 1504-1 and 1504-2 other than the YARN cluster 1504-0 that initiates the application.

Assume by way of further example that the client 1512-1 submits an application in cluster 1504-0 and the needed data resources reside in clusters 1504-1 and 1504-2. More particularly, the client submits an application to the resource manager residing in cluster 1504-0, which creates an instance of the WWH application master, which then connects with the WWH catalog master through a data resource resolving API. The WWH catalog master returns a list of resources containing resources that reside in cluster 1504-1 and resources that reside in cluster 1504-2. The WWH application master then creates an instance of the WWH Spark aggregator and then instances of the WWH cluster node manager for communicating with the respective remote clusters 1504-1 and 1504-2.

It should be noted that only a single WWH cluster node manager will typically be needed for communications between the local cluster 1504-0 and a given one of the remote clusters 1504-1 or 1504-2. Accordingly, in the event another application is started in cluster 1504-0 that also needs data resources residing in cluster 1504-1, the cluster 1504-0 will not create another instance of the WWH cluster node manager but will instead utilize the existing instance of the WWH cluster node manager previously created to communicate with cluster 1504-1 in the context of the other application.

The WWH cluster node managers of cluster 1504-0 initiate applications in the respective remote clusters 1504-1 and 1504-2 via the resource managers of those clusters. This causes the resource managers of clusters 1504-1 and 1504-2 to start respective WWH application masters in their respective clusters in order to execute the applications using the data resources local to those clusters.

Additional levels of recursion can be implemented in a similar manner by the WWH application masters in the respective clusters 1504-1 and 1504-2.

The particular number of clusters involved in performing distributed in-memory computations can be dynamically varied over time within a given information processing system. Accordingly, such a system exhibits a high level of scalability to accommodate varying computational needs. For example, additional clusters can be added as needed via recursion or otherwise in order to allow the system to easily handle an increase in the volume of in-memory computations to be performed.

Some illustrative embodiments include multiple clusters in the form of respective multiple distinct clouds of potentially different types. For example, an embodiment implemented using multiple clouds may include at least one hybrid cloud that comprises one or more private clouds together with one or more public clouds among which workloads can be migrated, with all clouds of the hybrid cloud sharing a common virtualization management layer. As another example, the multiple clouds may comprise a multi-cloud arrangement comprising a collection of private and/or public clouds associated with a given enterprise.

Additional examples of multi-cluster distributed data processing platforms configured to implement scalable distributed in-memory computation utilizing batch mode extensions can be found in U.S. patent application Ser. No. 15/582,743, filed Apr. 30, 2017 and entitled "Scalable Distributed In-Memory Computation Utilizing Batch Mode Extensions," which is incorporated by reference herein in its entirety.

FIGS. 16-40 show illustrative embodiments of multi-cluster distributed data processing platforms configured to implement scalable distributed Spark streaming computations, in some cases utilizing Spark iterative and interactive modes. Numerous other types of distributed data streaming computations may be utilized in other embodiments. Accordingly, it is to be appreciated that the illustrative embodiments are not limited to use with distributed Spark streaming computations. For example, other embodiments can be configured in which the distributed computations are not in-memory computations and do not utilize Spark computational frameworks.

Figure 16:
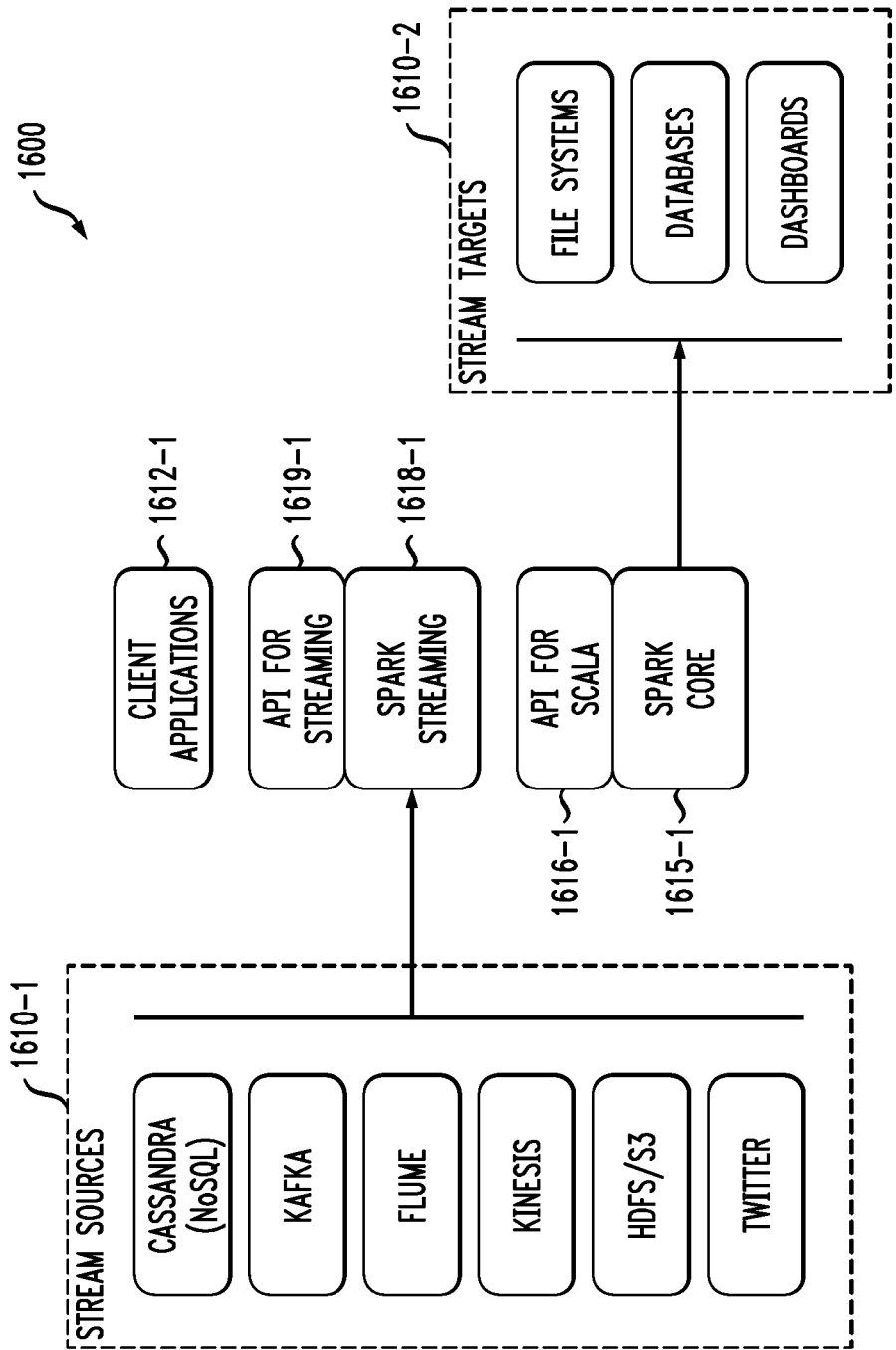
FIGS. 16-40 show illustrative embodiments of multi-cluster distributed data processing platforms configured to implement scalable distributed Spark streaming computations.

FIG. 16 shows a portion 1600 of a multi-cluster distributed data processing platform comprising a plurality of data stream sources 1610-1 and a plurality of data stream targets 1610-2. The distributed data processing platform in this embodiment is assumed to comprise a plurality of data processing clusters associated with respective data zones, as in other embodiments previously described herein.

One or more client applications 1612-1 initiate distributed data streaming computations that utilize a Spark Core component 1615-1 having an associated Spark Core API 1616-1 illustratively configured for the Scala programming language. A Spark streaming component 1618-1 interacts with the data stream sources 1610-1 and has an associated streaming API 1619-1 accessible to the client applications 1612-1.

Each of the Spark Core component 1615-1 and the Spark streaming component 1618-1 and their associated APIs 1616-1 and 1619-1 is assumed to be implemented in a distributed manner so as to comprise multiple instances thereof in respective ones of the data processing clusters of the distributed data processing platform.

The data stream sources 1610-1 illustratively comprise sources such as Cassandra (NoSQL), Kafka, Flume, Kinesis, HDFS/S3 and Twitter, although a wide variety of other data sources can be used in other embodiments.

The data stream targets 1610-2 illustratively comprise targets such as file systems, databases and dashboards, although again numerous other types of data targets can be used in other embodiments.

As will be described in more detail below, distributed data streaming computations are initiated across multiple data processing clusters. In each of the data processing clusters, a data stream provided by a data source of the corresponding data zone is separated into a plurality of data batches and the data batches are processed to generate respective result batches. Multiple ones of the data batches across the data processing clusters are associated with a global data batch data structure. Also, multiple ones of the result batches across the data processing clusters are associated with a global result batch data structure based at least in part on the global data batch data structure. The result batches are processed in accordance with the global result batch data structure to generate one or more global result streams providing global results of the distributed data streaming computations.

The FIG. 16 embodiment illustrates that distributed Spark streaming component 1618-1 and its associated distributed Spark Core component 1615-1 can process input data streams from multiple ones of the data stream sources 1610-1 in the data processing clusters of the respective distinct data zones and provide global processing results to multiple designated ones of the data stream targets 1610-2.

Figure 17:
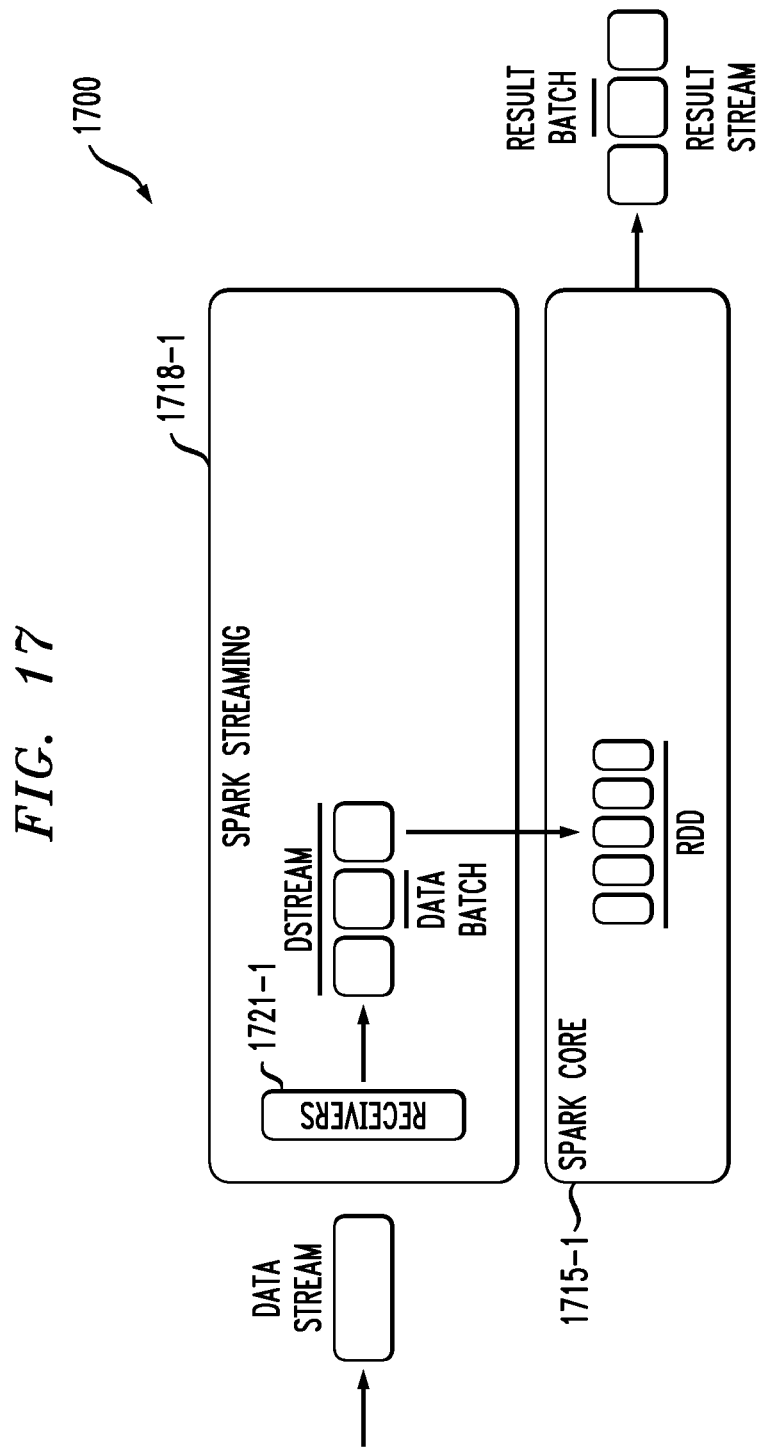

Referring now to FIG. 17, a portion 1700 of a distributed data processing platform comprises a Spark Core component 1715-1 and an associated Spark streaming component 1718-1. Again, each of the Spark Core component 1715-1 and the Spark streaming component 1718-1 is assumed to be implemented in a distributed manner so as to comprise multiple instances thereof in respective ones of the multiple data processing clusters of the corresponding distributed data processing platform.

The Spark streaming component 1718-1 illustratively comprises a set of receivers 1721-1. A given one of the receivers 1721-1 is configured to separate a data stream provided by a data source of a corresponding data zone into a plurality of data batches. Each of the data batches illustratively comprises one or more Spark RDDs that are processed in the Spark Core component 1715-1 to generate a corresponding one of a plurality of result batches of a result stream as shown in the figure.

In the FIG. 17 embodiment, the given one of the receivers 1721-1 is responsible for receiving a data stream and splitting it into data batches. Once a data batch is formed, it then becomes the unit of data for execution of a Spark computation, where that data batch is actually transformed into an RDD. A Spark computation performed on a data batch that has been converted into an RDD produces a result batch. The sequence of result batches produced by Spark form, in turn, the result stream.

A data stream in Spark may be referred to as a "DStream" or discretized stream, comprising a sequence of data batches or RDDs. The term "data batch" as used herein is intended to be broadly construed so as to encompass one or more RDDs or other data arrangements that may be converted into RDDs for performance of Spark computations. The data batches in Spark are created in respective time intervals, also referred to as batch intervals, with a minimum interval of 500 milliseconds. When the time intervals are very small or otherwise close to the minimum interval, the data batches are also referred to as "microbatches." When no data from the data stream has arrived during a specific time interval, a given one of the receivers 1721-1 illustratively generates an empty batch.

Illustrative embodiments implement local and global data structures for distributed Spark data streams, data batches and result batches. Such arrangements allow for performance of distributed stream computations on distributed but federated data streams. For example, data streams that are generated across very disparate geographical locations but are part of a common analytical process can be analyzed within the same context.

It should be noted that data streams referred to herein can be comprised of data chunks that do not necessarily correspond to data batches. For example, a data chunk may comprise a logical portion of a single data stream. A data chunk can be a data batch but it can alternatively comprise another portion of a data stream. A data batch can comprise one or more data chunks or a portion of a data chunk. A wide variety of different formats can be used for data streams and other types of data referred to herein.

Figure 18:
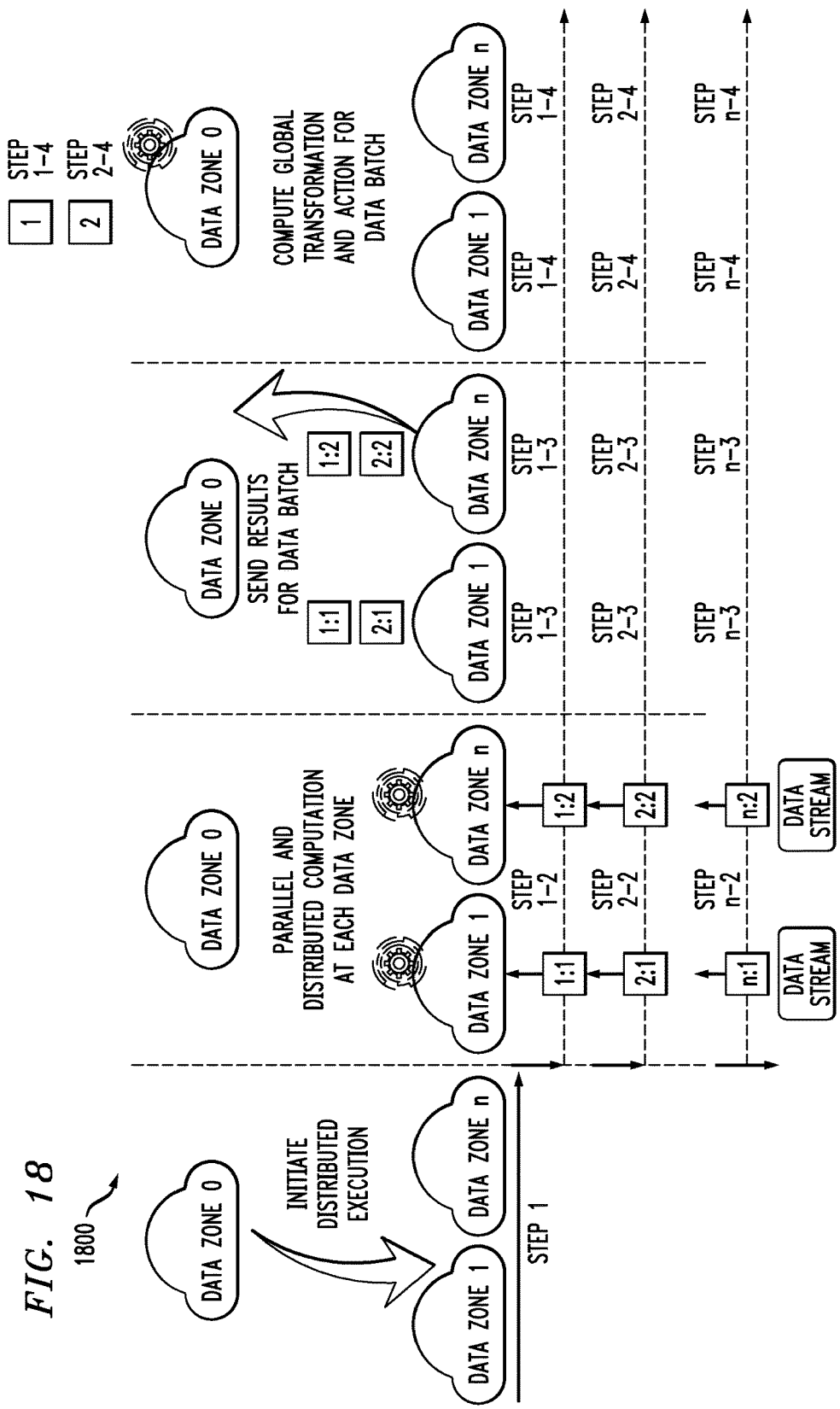

FIG. 18 shows another illustrative embodiment of an information processing system 1800 that performs distributed Spark streaming computations utilizing the above-noted local and global data structures.

In this embodiment, the distributed Spark streaming computation process performed by the system 1800 is initiated from a first data zone denoted Data Zone 0 and involves additional Data Zones denoted Data Zone 1 through Data Zone n. There are four phases in the process, including the initiation at Step 1 in a first phase. A second phase of the process includes parallel and distributed computation by Spark components at each data zone, followed by the sending of results generated by respective ones of the Spark components in a third phase, and global transformation and action in a fourth phase.

Figure 19:
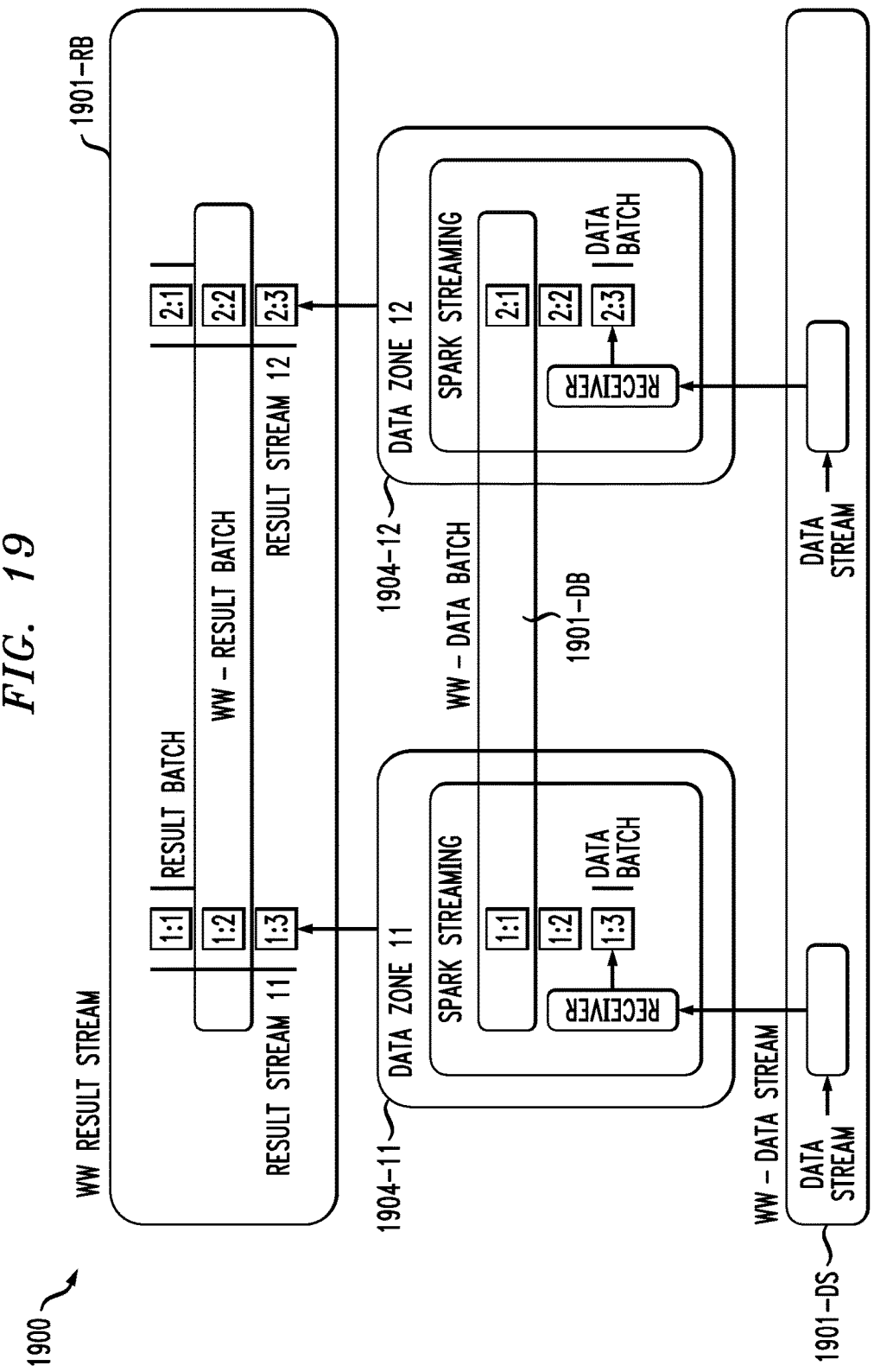

FIG. 19 shows a more detailed view of example distributed data streaming computations in an information processing system 1900 comprising two data processing clusters 1904-11 and 1904-12 in respective data zones denoted Data Zone 11 and Data Zone 12, respectively. This embodiment utilizes data abstractions that transcend the boundaries of a data processing cluster or data zone.

Although only two data processing clusters and their respective data zones are illustrated in the figure, the disclosed techniques can be extended to any desired number of data processing clusters and respective data zones. Also, it may be assumed for purposes of the present embodiment and other embodiments herein that local data is restricted to its corresponding data zone such that computations involving that data must be performed within that data zone by the associated data processing cluster.

In the system 1900, data streams processed by the respective data processing clusters 1904 are associated with a global data stream data structure 1901-DS more particularly denoted as a World Wide Data Stream ("WW-DataStream"). A WW-DataStream comprises a set of data streams, where each data stream is associated with a different data zone. It is assumed that the various data streams within a given WW-DataStream share the same semantic context and meaning. The WW-DataStream thus provides a collective representation of the multiple data sets that facilitates the analysis of those data sets in a common context.

The data batches generated by receivers of the data processing clusters 1904 are associated with a global data batch data structure 1901-DB more particularly denoted as a World Wide Data Batch ("WW-DataBatch"). A WW-DataBatch comprises a set of data batches in different data zones, where each data batch can be considered an input for a Spark streaming computation in its corresponding data zone, and each individual data batch may be generated and analyzed independently and in parallel within its corresponding data zone. The individual data batches in the same WW-DataBatch are approximately synchronized with one another in a manner to be described in more detail below.

The result batches generated by the data processing clusters 1904 are associated with a global result batch data structure 1901-RB more particularly denoted as a World Wide Result Batch ("WW-ResultBatch"). A WW-ResultBatch comprises a set of result batches that are approximately synchronized with one another and that are generated by performing computations in respective data zones on corresponding data batches of a WW-DataBatch. Each result batch in the WW-ResultBatch therefore comprises the output of a computation done on a data batch in the WW-DataBatch.

Multiple instances of WW-ResultBatch collectively comprise a World Wide Result Stream ("WW-ResultStream"). For example, a given WW-ResultStream can comprise a stream of approximately synchronized WW-ResultBatch instances.

Other types of global data structures that may be utilized in the system 1900 and other embodiments herein include a World Wide Cache ("WW-Cache") which comprises a set of caches associated with respective ones of the data processing clusters 1904.

These and other global data structures utilized herein in conjunction with implementation of distributed streaming computations across multiple data processing clusters in respective data zones collectively provide what is also referred to a "WW-DataStream framework." Spark streaming applications utilizing a WW-DataStream framework are also referred to herein as "WW-Spark" streaming applications.

Global data structures such as WW-DataBatch introduced above in some embodiments have properties similar to a WW-RDD global data structure of the type previously described herein. For example, a WW-DataBatch in one or more embodiments can exhibit at least a subset of the following properties:

1. Resilient. Missing or damaged portions of a WW-RDD or a WW-DataBatch due to failures inside a cluster or across clusters can be re-computed. For example, within a given cluster, RDD lineage information can be leveraged for this purpose. Across multiple clusters, a global computation graph can be used to facilitate recovery from failures.

2. Distributed. Data of a WW-RDD or a WW-DataBatch resides in multiple clusters associated with respective data zones, which can be in physical proximity in the same data center, or in different data centers in the same geographical region, or scattered across the world.

3. Dataset-based. Data of a WW-RDD or a WW-DataBatch comprises a collection of partitioned data inside a cluster as well as across multiple clusters, with primitive values or values of values, such as tuples and records.

4. In-memory. Data of a WW-RDD or a WW-DataBatch is stored in memory to the extent possible, with individual RDDs residing in memory within individual clusters, while the corresponding WW-RDD or WW-DataBatch abstraction collectively resides in memory across multiple clusters.

5. Immutable or read-only. A WW-RDD or WW-DataBatch may be configured such that it does not change once created and can only be transformed using transformations to create new WW-RDDs or new WW-DataBatches.

6. Lazy evaluated. Data of a WW-RDD or a WW-DataBatch is not available or transformed until an action is executed that triggers the execution. In the case of an RDD, an action causes execution of only the RDD itself. In the case of a WW-RDD or a WW-DataBatch, an action on a WW-RDD itself may trigger an action on the individual RDDs that are part of it and on any other WW-RDDs or WW-DataBatches that may be part of the original WW-RDD, since WW-RDDs and WW-DataBatches can be configured in a recursive manner. For example, an action on a WW-RDD can trigger actions on all clusters where the member RDDs of the WW-RDD need to be created or reside, in a recursive manner, creating a ripple effect of actions that may reach world wide scale.

7. Cacheable. Data of a WW-RDD or a WW-DataBatch can be cached in persistent storage or other type of memory of its corresponding cluster. For example, data may be stored locally at each cluster where the RDD was created, preserving data locality at each cluster, while the collection of data that represents the entire WW-RDD or WW-DataBatch is distributed geographically across multiple clusters at world wide scale. The above-noted WW-Cache can be used to facilitate such storage across multiple clusters. For example, creation, update and eventual deletion or release of individual cluster caches of the WW-Cache are orchestrated in a distributed manner, such that the WW-Cache is distributed across multiple clusters that are potentially geographically dispersed.

8. Parallel. Data is processed in parallel across multiple clusters.

9. Typed. Values in a WW-RDD or a WW-DataBatch have types, such as RDD [Long] or RDD [(Int, String)]. All members of WW-RDDs are either a set of other WW-RDDs or an RDD in of itself.

10. Partitioned. In a WW-RDD or WW-DataBatch, data is partitioned across multiple clusters. Examples of operations that can be performed on a WW-RDD or WW-DataBatch include transformations, which illustratively comprise lazy operations that return another WW-RDD or another WW-DataBatch, and actions, which illustratively comprise operations that trigger computation and return values.

The above-described properties are presented by way of illustrative example only, and additional or alternative properties can characterize WW-RDDs and WW-DataBatches as well as other global data structures in other embodiments.

It should be noted that a WW-RDD and a WW-DataBatch as disclosed herein can be configured to allow the re-use of intermediate in-memory results across multiple data intensive workloads with no need for copying large amounts of data between clusters over a network, on a world wide scale.

As a result, the implementation and support of WW-RDDs or WW-DataBatches as native components of Spark embodiments allows for the efficient handling of computing frameworks, distributed across clusters, potentially geographically distributed at world wide scale, of multiple types of operations, while preserving the principles of data locality and while not requiring the movement of all the data to a single cluster. Examples of supported operations illustratively include iterative algorithms in machine learning and graph computations, and interactive data mining tools as ad-hoc queries on the same dataset.

Other global data structures such as WW-ResultBatch are illustratively configured to exhibit properties similar to those described above for WW-RDD and WW-DataBatch.

Data batches of a WW-DataBatch and result batches of a WW-ResultBatch can be identified uniquely or at least deterministically. For example, two data batches that share the same properties can be given the same identification.

Global data structures such as WW-DataBatch and WW-ResultBatch are approximately synchronous and eventually synchronous.

For example, data batches of a WW-DataBatch in some embodiments are approximately synchronized with one another as belonging to a common iteration of a WW-DataStream based at least in part on at least one of a time interval during which the data batch was generated, a sequence number associated with generation of the data batch and a time-stamp associated with generation of the data batch.

Similarly, result batches of a WW-ResultBatch in some embodiments are approximately synchronized with one another as belonging to a common iteration of a WW-DataStream based at least in part on at least one of a time interval during which the result batch was generated, a sequence number associated with generation of the result batch and a time-stamp associated with generation of the result batch.

Each of the data processing clusters 1904 generates its corresponding data batches and result batches independently of and at least partially in parallel with the other data processing clusters.

Also, each of the data processing clusters 1904 generates its data batches and result batches asynchronously with respect to the other data processing clusters but the data batches and results batches of the data processing clusters are eventually synchronized across the data processing clusters in conjunction with generation of the one or more global result streams through utilization of the global data batch data structure and the global result batch data structure.

Global data structures such as WW-DataBatch and WW-ResultBatch each comprise a plurality of local data batch data structures or result batch data structures of respective ones of the data processing clusters.

At least a subset of the local data batch data structures have respective different formats so as to support local data batch heterogeneity across the data processing clusters.

In addition, recursive implementations are supported in that at least one of the local data batch data structures may itself comprise a global data batch data structure having a plurality of additional local data batch data structures of respective additional data processing clusters associated therewith. Similarly, at least a subset of the local result batch data structures have respective different formats so as to support local result batch heterogeneity across the data processing clusters, and recursive implementations are supported in that at least one of the local result batch data structures may itself comprise a global result batch data structure having a plurality of additional local result batch data structures of respective additional data processing clusters associated therewith.

Global data structures such as WW-DataBatch and WW-ResultBatch allow respective data batches and result batches of different data processing clusters to be tracked in a common processing context on a global scale. For example, computing frameworks in illustrative embodiments disclosed herein can group data batches based on time intervals in which they were generated and/or other contextual factors. Similarly, result batches can be grouped based on time intervals in which they were generated and/or other contextual factors. These and other similar arrangements provide what is referred to herein as "approximate synchronization" of the data batches or the result batches. The approximate synchronization can in some embodiments be configured to exhibit tolerance to differences and discrepancies in the boundaries of the data batches and result batches.

Accordingly, the approximate synchronization may be configured such that there is not a hard-defined boundary for association of data batches of a WW-DataBatch or result batches of a WW-ResultBatch, but the data batches of the WW-DataBatch or result batches of the WW-ResultBatch are nonetheless associated with one another in an approximate synchronization arrangement. For example, certain data batches of the WW-DataBatch or result batches of the WW-ResultBatch are related as being "contemporary" in that they are aligned in the same order or sequence in the corresponding individual local streams.

Global data structures such as WW-DataBatch and WW-ResultBatch also support what is referred to herein as "eventual synchronization" in that their data batches or result batches are generated independently and in parallel within their corresponding data processing clusters, without any individual data processing cluster coordinating such generation or creation or delineation of synchronization boundaries with other data processing clusters, and yet those data batches or result batches that were generated in approximately the same time period are eventually grouped and analyzed in context.

Accordingly, the use of global data structures configured as disclosed herein allows the distributed and parallel computation of data batches and result batches in an asynchronous manner, where synchronization is approximate rather than exact.

Figure 20:
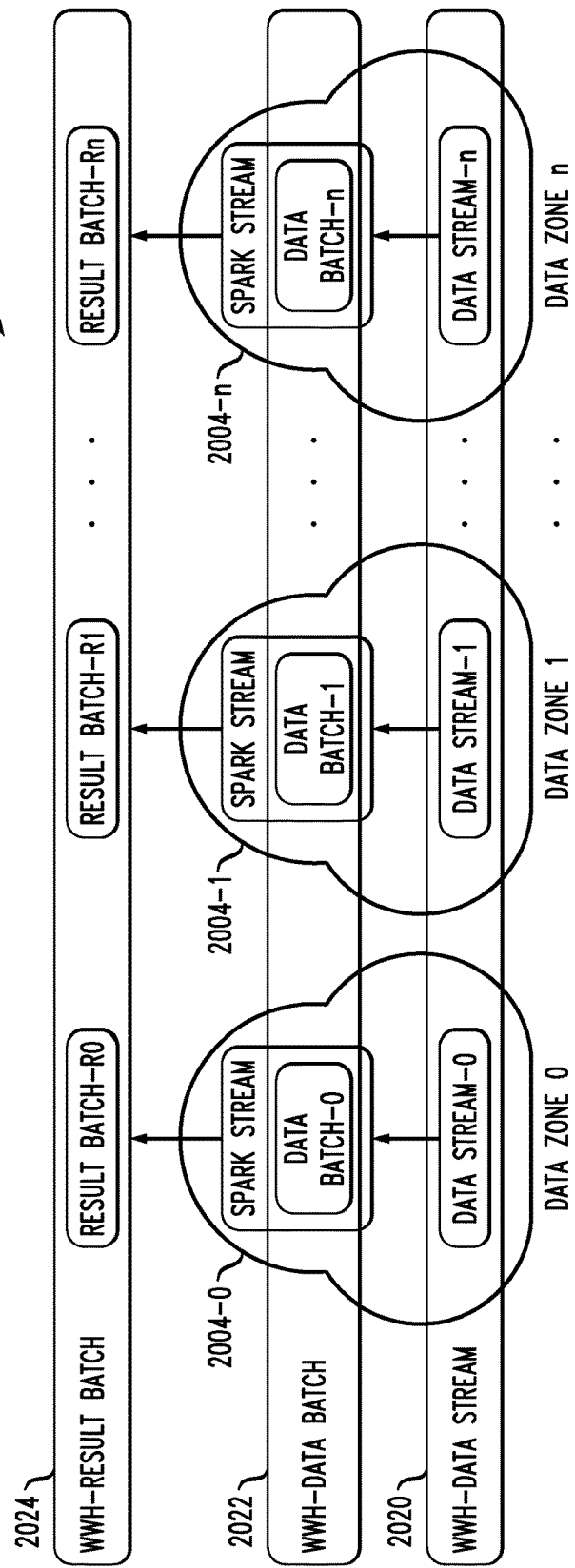

FIG. 20 illustrates one example of a multi-cloud arrangement for distributed Spark streaming computation. In this particular embodiment, distributed Spark streaming computation functionality is implemented in an information processing system 2000 using multiple distinct clusters corresponding to respective clouds 2004-0, 2004-1, . . . 2004-$n$ of respective different data zones denoted Data Zone 0, Data Zone 1, . . . Data Zone n.

The clouds 2004 may be of the same type or of different types. For example, some embodiments may include a mixture of multiple distinct clouds 2004 of different types, such as an Amazon Web Services cloud, a Microsoft Azure cloud and an on-premises cloud that illustratively comprises a virtual machine based cloud. One or more of the clouds 2004 may be implemented using a corresponding Cloud Foundry platform and local Big Data cluster, although numerous other arrangements are possible.

Each of the clouds 2004 in this embodiment is assumed to comprise a corresponding YARN cluster that includes a Spark streaming component as illustrated. The Spark streaming components manage respective data batches denoted Data Batch-0, Data Batch-1, . . . Data Batch-n within their respective YARN clusters. These data batches are associated with a common WW-DataBatch global data structure and generated from underlying distributed data streams denoted Data Stream-0, Data Stream-1, . . . Data Stream-n, each commonly associated with a WW-DataStream global data structure. Results of computations performed in the respective clusters are provided as result batches denoted Result Batch-R0, Result Batch-R1, . . . Result Batch-Rn within a WW-ResultBatch global data structure.

The data streams in a given embodiment may comprise any of a wide variety of different types of structured and unstructured data, including relational database tables, text documentation, pictures, video, device data, log files, genomic sequences, weather readings, social data feeds and many others.

The information processing system 2000 provides an illustrative implementation of an exemplary multi-level distributed Spark streaming computation framework. Such an arrangement provides an extension to the Spark RDD framework in order to allow Spark streaming computations to be performed in a distributed manner across multiple clusters associated with different data zones. The multi-level framework utilizes the above-noted global data structures including WW-DataStream, WW-DataBatch and WW-ResultBatch that are associated with respective input data level 2020, Spark streaming computation level 2022 and data output level 2024 in this embodiment.

The distributed streaming computations in this embodiment are performed as close as possible to their respective data stream sources in the corresponding portions of the input data level 2020 of the respective clouds 2004. Results of the computations from the Spark steaming computation level 2022 are surfaced to the data output level 2024 while the corresponding data remains within the respective data zones of the clouds 2004.

The individual member data streams of the WW-DataStream may be geographically distributed relative to one another. Each data stream and its associated stream computations can benefit from the advantages of data locality in that the data stream is created and analyzed as close as possible to its corresponding data stream source.

For example, the data stream sources can comprise respective sensors or other types of devices in an IoT environment, with different devices collecting different types of information such as temperature, pressure, vibrations, etc. Some of the data stream sources can be co-located within a single data zone, while different subsets of the other data stream sources are co-located within other data zones.

Each data stream can be analyzed within its data processing cluster independently of and in parallel with the other data streams.

The system 2000 illustratively exposes a data scientist or other user to an abstraction of a wwDataStream, also referred herein as a wwStream, comprising a set of streams stream and represented as wwhStream=$\{stream_1, stream_2, \ldots, stream_m\}$. The terms wwDataStream and wwStream are used interchangeably herein, and may be viewed as examples of the global data stream data structures also referred to herein as WW-DataStream or more simply as WW-Stream.

In the context of a wwDataStream, the streams do not need to exist in a single central location and can be scattered around several other locations.

Consider by way of example a set of data streams DataStreamSet, represented as DataStreamSet=$\{streamInSet_0, streamInSet_1, \ldots, streamInSet_n\}$. A wwDataStream is said to be derived from DataStreamSet, represented as wwDataStream=$\delta$(DataStreamSet), when each stream in the wwDataStream is a subset of a stream in one of the streams in DataStreamSet. More formally, $\forall stream_i \in wwDataStream$, where $1 \leq i \leq m$, $\exists streamInSet_j \in DataStreamSet$, such that $stream_i \subseteq streamInSet_j$. The elements of wwDataStream need not comprise a unique set and need not include all of the elements in DataStreamSet. Accordingly, the elements in wwDataStream need only be a subset of the elements in DataStreamSet.

In some embodiments, the same abstraction of a wwDataStream may be given both input and output data streams, illustratively using wwDataStream$^{Input}$ to refer to the input data streams and wwDataStream$^{Output}$ to refer to the output data streams.

Figure 21:
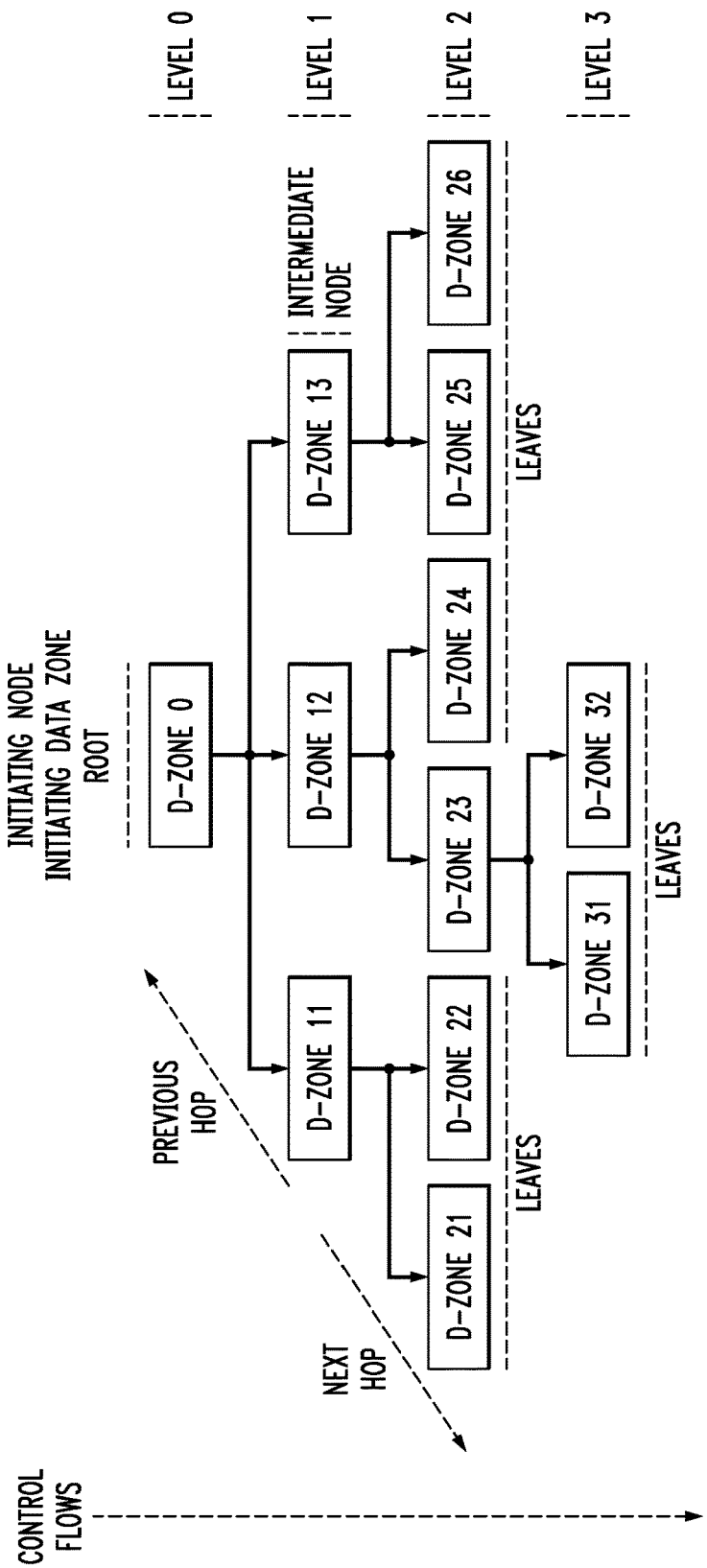

FIG. 21 shows an example of a global computation graph 2100 that is utilized in implementing distributed data streaming computations in some embodiments.

The multiple data processing clusters associated with respective data zones in a given such embodiment are organized in accordance with a global computation graph for performance of the distributed data streaming computations. The global computation graph comprises a plurality of nodes corresponding to respective ones of the data processing clusters, with the plurality of nodes are arranged in multiple levels each including at least one of the nodes. There are four levels of nodes in this embodiment, denoted as Level 0, Level 1, Level 2 and Level 3, although more or fewer levels may be used in other embodiments. Also, each of the nodes in this embodiment corresponds to a different data processing cluster and its associated data zone ("D-Zone"). In other embodiments, at least one of the distributed data processing clusters and its associated data zone may correspond to multiple nodes of the global computation graph.

The global computation graph 2100 is an example of a type of global data structure also referred to herein as a World Wide Stream Computation Graph ("WW-SCG"). It is utilized in conjunction with the previously-described global data structures WW-DataStream, WW-DataBatch and WW-ResultBatch in implementing distributed streaming computations across multiple data processing clusters.

The global computation graph 2100 illustratively represents a set of computations being performed on a WW-DataStream. The global computation graph 2100 in the present embodiment is implemented as a directed acyclic graph (DAG), although other types of graphs can be used in other embodiments. The nodes of the graph represent respective clusters in which streaming computations are performed, and the directed edges represent the direction of control flow, such that a node at which a directed edge starts requests a node at which the directed edge ends to perform a particular computation. The node level of a given node represents the distance in hops from that node to the root node of the graph.

A particular one of the data processing clusters corresponding to the root node of the global computation graph 2100 initiates the distributed data streaming computations in accordance with one or more control flows that propagate from the root node toward leaf nodes of the graph via one or more intermediate nodes of the graph. A given such control flow may include one or more messages from at least one node at a given level of the global computation graph 2100 directing one or more nodes at another one of the levels to perform designated portions of the distributed data streaming computations.

Figure 22:
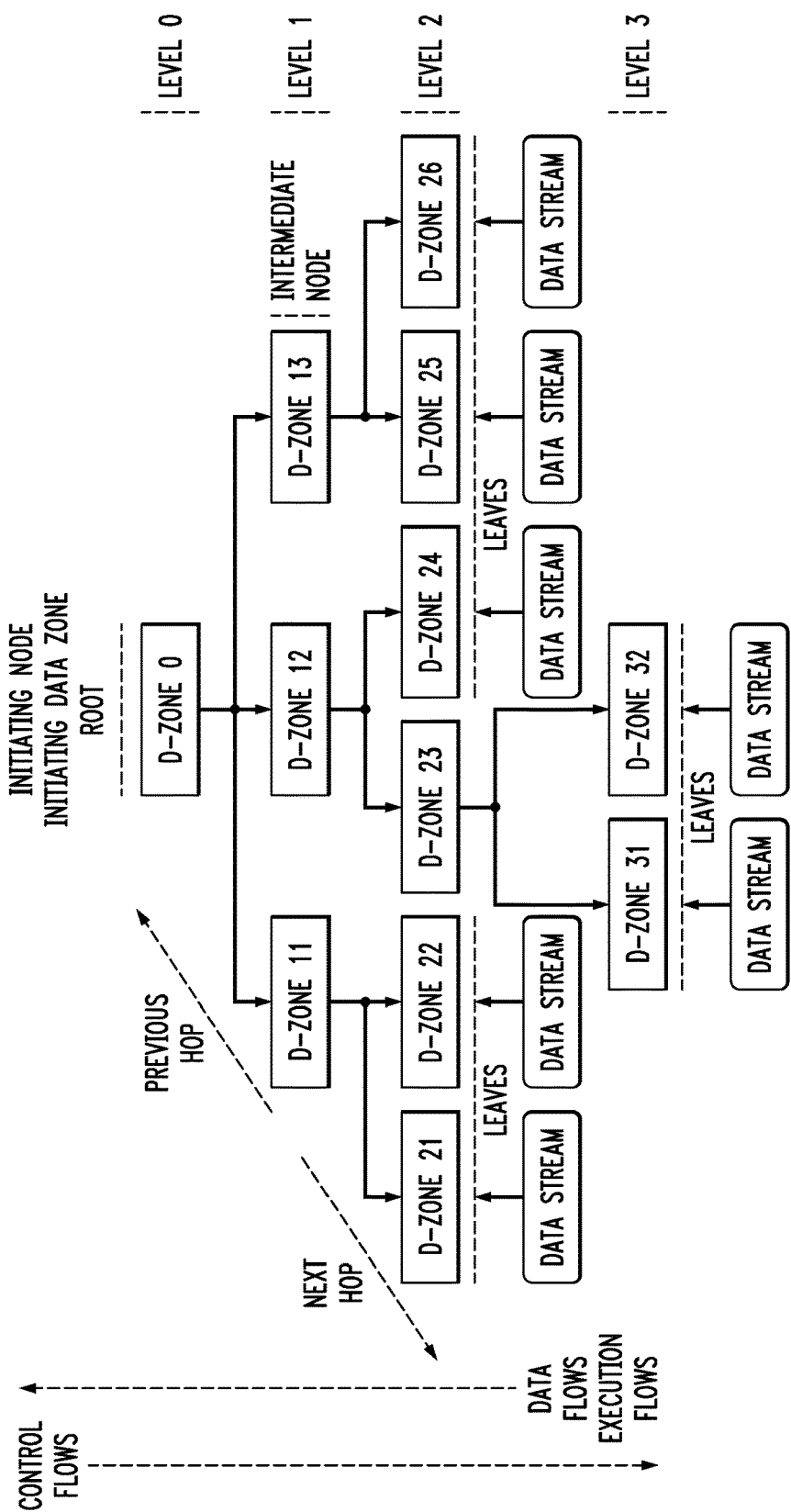

As illustrated in FIG. 22, local result streams from respective ones of the data processing clusters corresponding to respective ones of the nodes of the graph 2100 propagate back from those nodes toward the root node. More particularly, FIG. 22 illustrates that local results comprising data flows and execution flows performed on input data streams by respective ones of the leaf nodes in Levels 2 and 3 are propagated upward through the graph 2100 to the root node. Accordingly, the local results flow in a direction opposite that of the control flows. A node at which a directed edge ends sends the data resulting from the computation to a node at which the directed edge starts, which is the same node that requested the computation.

The root node of the graph 2100 initiates the overall distributed computation, and the input data streams are processed at respective ones of the leaf nodes. Nodes that are neither root nodes nor leaf nodes are referred to as intermediate nodes. The nodes of a given global computation graph illustratively exhibit the following properties:

1. Root nodes have no previous hop and leaf nodes have no next hop.

2. Nodes may have multiple previous hops, with different credentials and different meta-resource names, for a computation to arrive at the same node.

3. The root node is Level 0.

4. For intermediate nodes and leaf nodes, minimal level is defined as min(level of all previous hops)+1 and represents the first time a node was asked to execute a task for this computation and the last time data will pass through this node related to this computation, and maximal level is defined as max(level of all previous hops)+1 and represents the last time a node was asked to execute a task for this computation and the first time data will pass through this node related to this computation.

5. The height of the graph is given by max(maximum level of all leaf nodes).

6. A route within the graph comprises a path from a leaf node to the root node.

Figure 23:
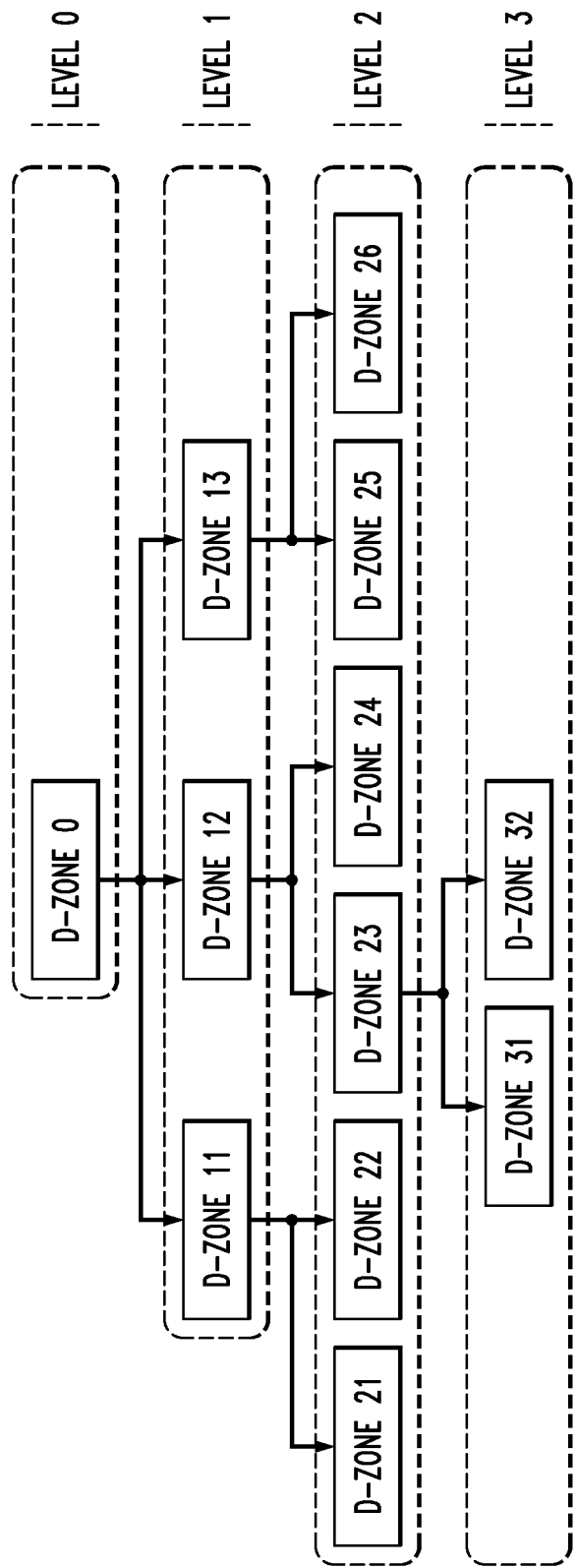

FIG. 23 more clearly illustrates the association of the various nodes of a global computation graph 2100 with respective ones of the levels denoted Level 0, Level 1, Level 2 and Level 3. As depicted in FIG. 23, all the data zones within the same level can be grouped as they share the same distance to the root node.

Like other global data structured disclosed herein, WW-SCG is configured to support recursive implementations in that one or more nodes of a given WW-SCG may each represent another WW-SCG. Also, as indicated previously, two or more nodes in a WW-SCG may represent the same cluster and its associated data zone. Each time such a cluster is represented in a graph, it represents a computation on a different subset of the data.

The levels of a WW-SCG are utilized in illustrative embodiments to facilitate approximate synchronization and eventual synchronization of a corresponding WW-DataBatch and a WW-ResultBatch.

For example, a WW-DataBatch can be organized in levels with different levels of the WW-DataBatch corresponding to respective ones of the levels of the WW-SCG. A given one of the levels of the WW-DataBatch comprises data batches generated by nodes of the corresponding level in the WW-SCG, with the data batches at the given level of the WW-DataBatch being approximately synchronized with one another as belonging to a common iteration of a WW-DataStream. The approximate synchronization is based at least in part on a time interval during which the data batch was generated, a sequence number associated with generation of the data batch, a time-stamp associated with generation of the data batch, or additional or alternative types of contextual information, as well as combinations of multiple instances of such contextual information.

Similarly, a WW-ResultBatch can be organized in levels with different levels of the WW-ResultBatch corresponding to respective ones of the levels of the WW-SCG. A given one of the levels of the WW-ResultBatch comprises result batches generated by nodes of the corresponding level in the WW-SCG, with the result batches at the given level of the WW-ResultBatch being approximately synchronized with one another as belonging to a common iteration of a WW-DataStream. The approximate synchronization is based at least in part on a time interval during which the result batch was generated, a sequence number associated with generation of the result batch, a time-stamp associated with generation of the result batch, or additional or alternative types of contextual information, as well as combinations of multiple instances of such contextual information.

A WW-SCG can therefore be viewed as illustratively interrelating with multiple other global data structures, including WW-DataStream, WW-DataBatch and WW-ResultBatch, in a given embodiment.

Figure 24:
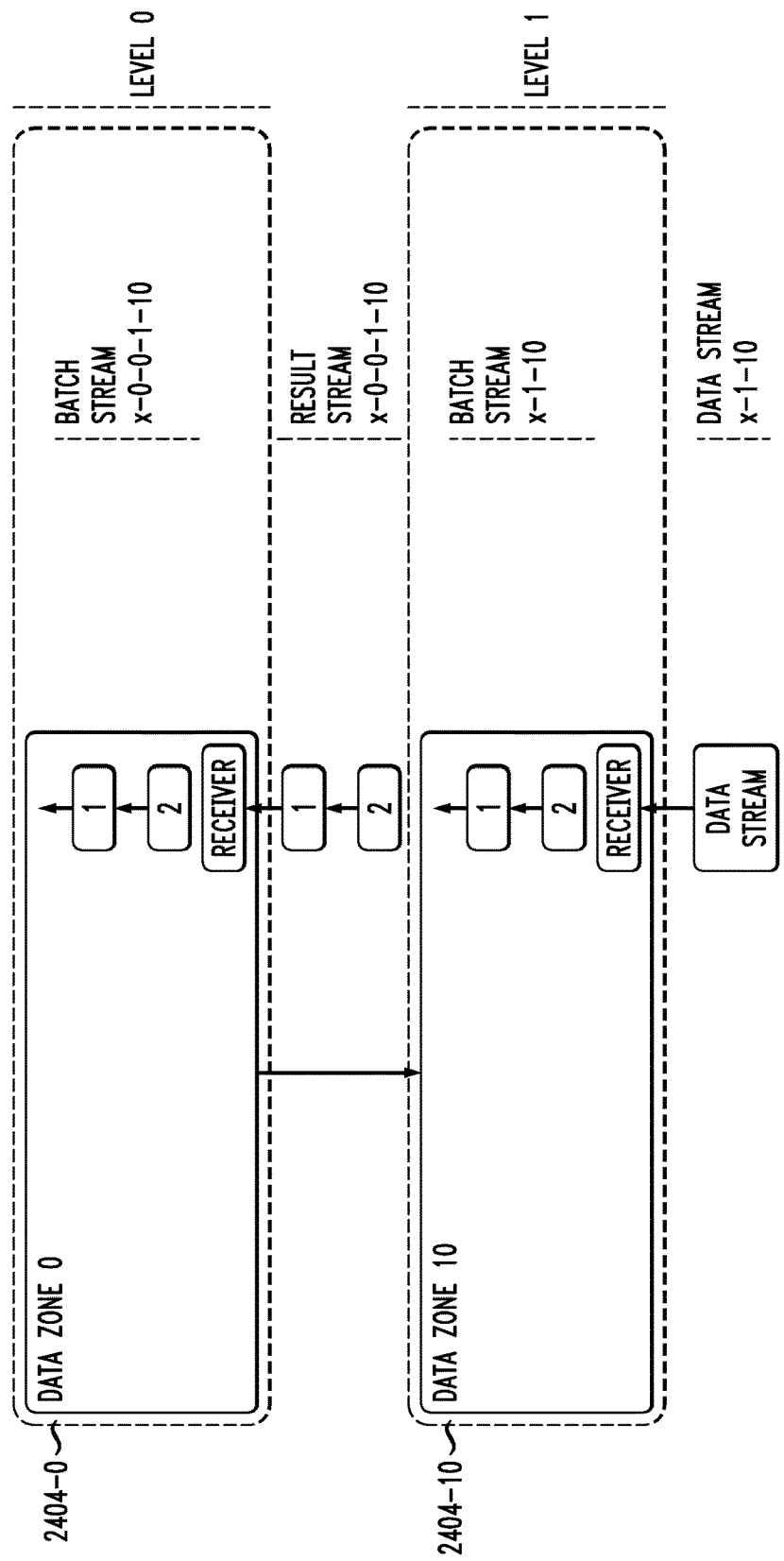

FIG. 24 shows an information processing system 2400 that includes multiple data processing clusters 2404-0 and 2404-10 associated with respective data zones denoted as Data Zone 0 and Data Zone 10.

In this embodiment, a given one of the local result streams from data processing cluster 2404-10 corresponding to one of the nodes at a given one of the levels of a WW-SCG provides at least a portion of an input data stream of data processing cluster 2404-0 corresponding to another one of the nodes at another one of the levels of the WW-SCG. Result batches of the given local result stream of the node at the given level are therefore mapped into respective data batches of the node at the other level.

More particularly, a result stream of a Spark computation in this embodiment becomes the data stream of another Spark computation, one level higher, where each individual result batch at one level is mapped on a one-to-one basis into a corresponding data batch at a higher level, and in the order in each it was generated. In this simplified example, there is only one data zone at a higher level, and there is a one-to-one mapping between the result batches at the lower level and the data batches at the higher level.

FIG. 24 also depicts aspects of a naming convention introduced herein to uniquely identify a data batch and a result batch. As data batches and result batches in illustrative embodiments are defined in conjunction with a WW-SCG, a unique identifier of the form <ww-scg-id> is used to identify a particular WW-SCG. A given <ww-scg-id> is generated at the root node of the corresponding WW-SCG. The previously-described control flow is used to ensure that the <ww-scg-id> is propagated through the WW-SCG from the root node to all of the leaf nodes that participate in the corresponding distributed streaming computation. The nodes utilize this identifier in conjunction with uniquely naming and identifying each individual data stream, data batch and result batch, and their respective corresponding global data structures WW-DataStream, WW-DataBatch and WW-ResultBatch.

A number of different techniques can be used to generate a unique <ww-scg-id> for a given WW-SCG. For example, the identifier can be generated by encrypting a concatenation of the following fields: current time, current date, randomly-generated number, and MAC address of a processing device on which the distributed stream computation is initiated. Additional or alternative information suitable for enhancing the uniqueness and security of the WW-SCG identifier can also be used. In the embodiment of FIG. 24, the notation <ww-scg-id>=x is utilized for simplicity.

A given data steam has an identifier <dataStreamName> that allows the data stream to be uniquely identified at a global scale. The following information can be utilized in uniquely identifying a data stream, based at least in part on the particular type of node associated with that data stream.

For example, an intermediate node that is the target or receiver of a data stream can be identified as <ww-scg-id>-<Target-Level>-<Data-Zone-Target>-<Origin-Level>-<Data-Zone-Origin>. Similarly, a leaf node can be identified as <ww-scg-id>-<Leaf-Level>-<Data-Zone-Leaf>. A root node can be identified as <ww-scg-id>-<0>-<Data-Zone-Root>.

In each case, the WW-SCG identifier <ww-scg-id> is appended to the beginning of each node identifier. The data stream can be an inbound data stream that is an input to a computation, an outbound data stream that is a result stream generated by a computation, or both as in the case of a result stream that is generated by a computation and that becomes an input to a another computation at another node.

A data stream that traverses a particular route within a WW-SCG can be identified as <ww-scg-id>->-<0>-<Data-Zone-Root>-<Leaf-Level>-<Data-Zone-Leaf>.

While a given <dataStreamName> uniquely identifies a particular data stream, which may be inbound, outbound or both, it does not identify individual data batches or result batches within that data stream.

Figure 25:
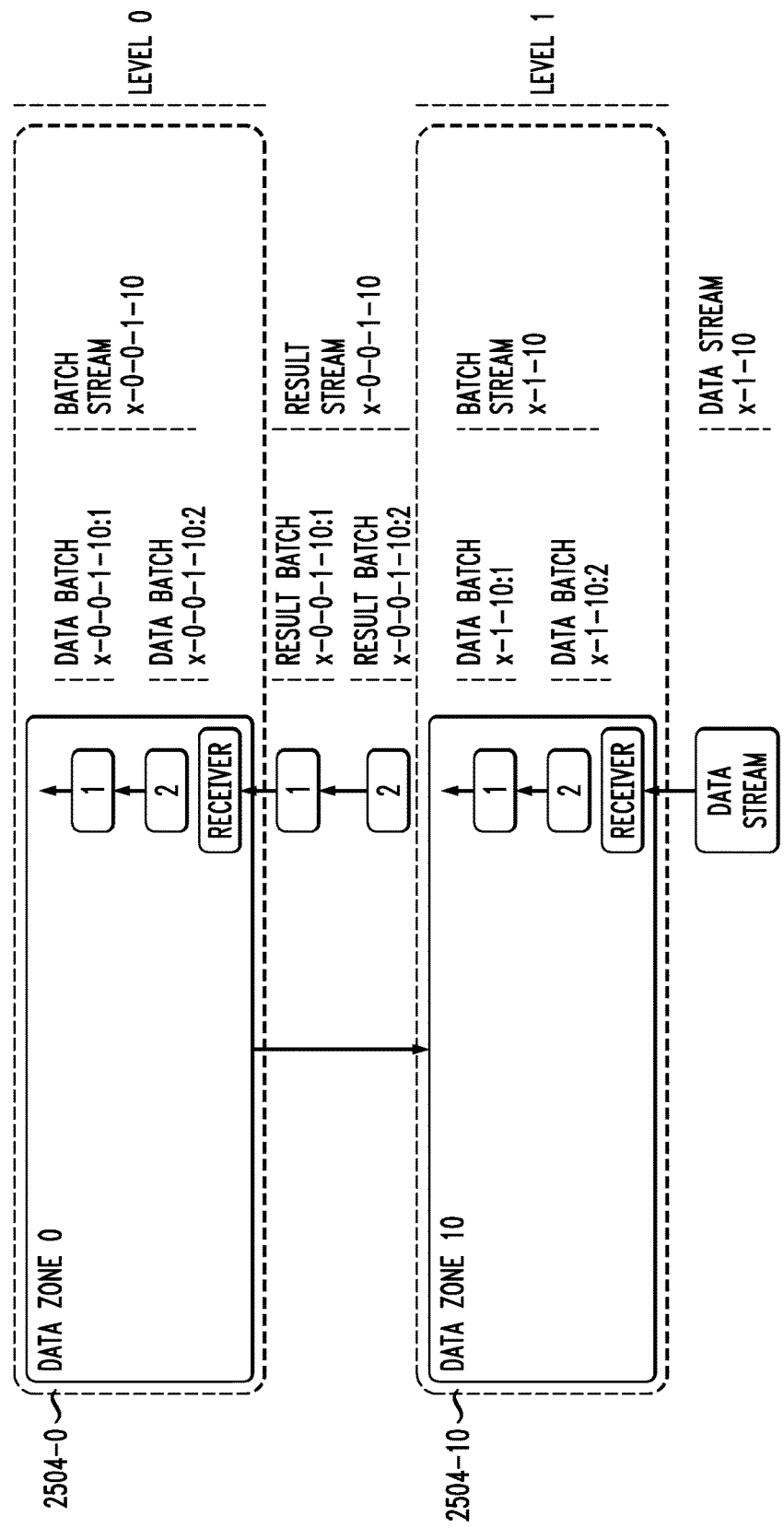

Accordingly, as illustrated in the context of information processing system 2500 of FIG. 25, which illustratively includes multiple data processing clusters 2504-0 and 2504-10 associated with respective data zones denoted Data Zone 0 and Data Zone 10, a batch identifier is appended to a given <dataStreamName> in order to identify a data batch or a result batch. More particularly, in the case of a data batch, a <dataBatchId> is appended, while in the case of a result batch, a <resultBatchId> is appended.

A data batch in a data stream is therefore identified as <dataBatch>=<dataStreamName>:<dataBatchId>. Similarly, a result batch in a data stream is identified as <resultBatch>=<dataStreamName>:<resultBatchId>.

In some embodiments, a <dataBatchId> or a <resultBatchId> can be a sequential number, controlled in different ways depending upon type of node.

For example, each leaf node of a WW-SCG can set a local counter to 1, assign it to the first data batch as its <dataBatchId> and then increment the counter. After a computation is completed, the leaf node assigns to the corresponding result batch the same identifier of the data batch that was used for the computation.

For intermediate nodes with one data stream, a given such intermediate node, referred to as the target node, receives data from another node, referred to as the source node, with the input data stream for the target node being the same data steam as the result stream generated by the source node. The mapping of a result batch at the source node into a data batch at the target node can be done in several different ways. For example, each result batch sent by the source node can simply become the corresponding data batch for the target node, preserving the same batch identifier. In a more complex scenario, the data batch for the target node may comprise the concatenation of several result batches generated by the source node. For example, for every five result batches generated by the source node, a single data batch may be produced for the target node, comprising the concatenation of the five result batches. In another more complex scenario, the target node divides the time dimension into time intervals. At each time interval, it concatenates all the result batches it has received from the source node during the last time interval and then considers that the data batch for its computation.

For intermediate nodes with more than one data stream, a given such intermediate node, referred to as the target node, receives multiple data streams from respective other nodes, referred to as respective source nodes. In this case, the data stream for the target node illustratively comprises a concatenation or fusion of the result streams generated by the source nodes, where each data batch at the target node will be a concatenation of several result batches coming from the different source nodes.

Figure 26:
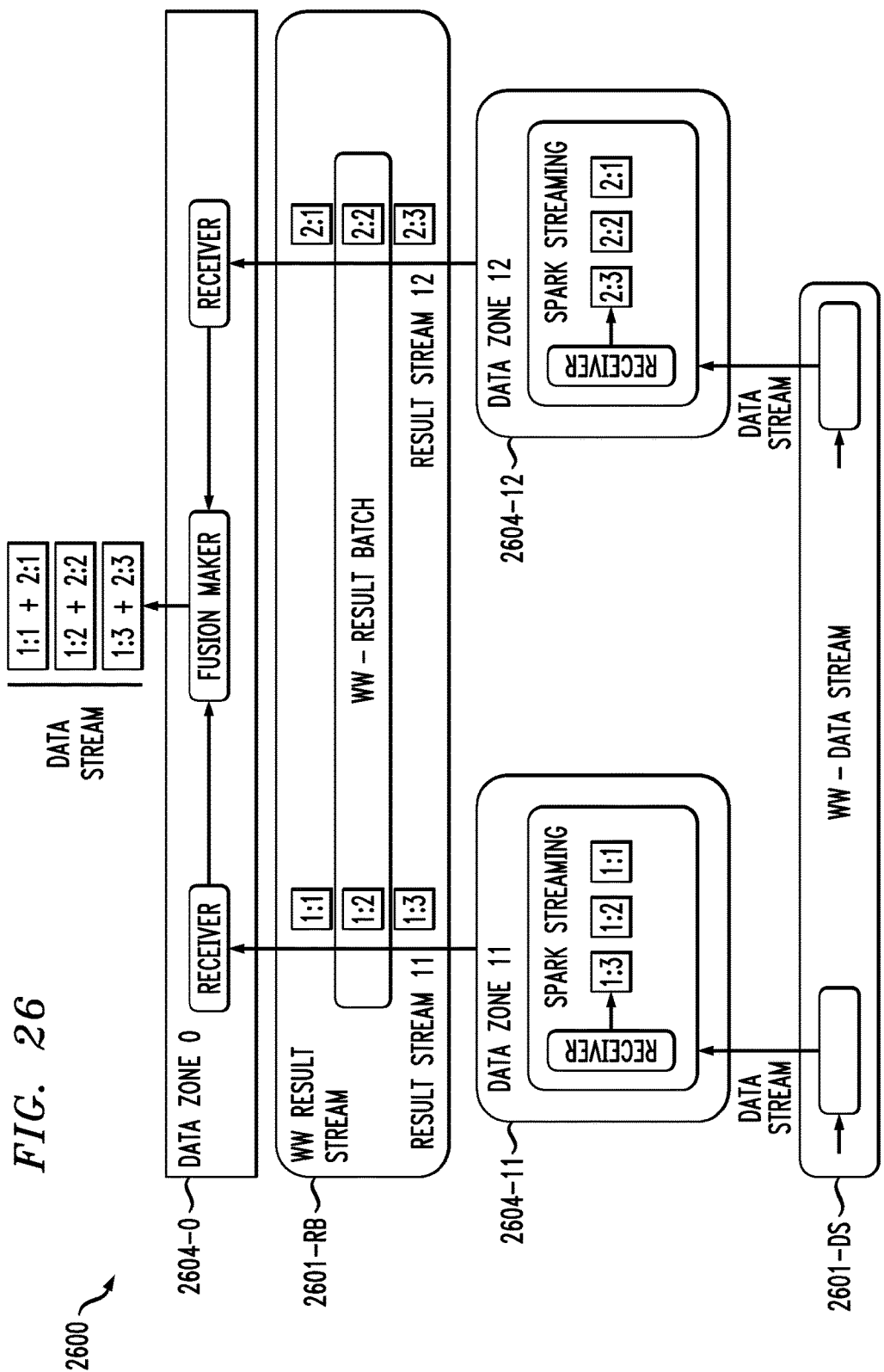

An example of such an arrangement is shown in information processing system 2600 of FIG. 26, which includes data processing clusters 2604-0, 2604-11 and 2604-12 associated with respective data zones denoted Data Zone 0, Data Zone 11 and Data Zone 12. The system 2600 performs distributed streaming computations in accordance with global data structures including a WW-DataStream 2601-DS and a WW-ResultBatch 2601-RB. Other global data structures utilized in this embodiment but not explicitly illustrated are assumed to include a WW-DataBatch and a WW-SCG.

As shown in the figure, a target node corresponding to cluster 2604-0 includes receivers that receive data streams from source nodes corresponding to respective clusters 2604-11 and 2604-12. A fusion maker module of cluster 2604-0 concatenates or otherwise combines several batches into one. The mapping of result batches from the source nodes into a data batch at the target node can be done in several different ways. For example, each result batch sent by the source nodes can become part of the data batch for the target node, preserving the same batch identifier. Only the result batches that have the same batch identifier can actually be fused into a data batch at the target node. In a more complex scenario, the data batch for the target node may comprise the concatenation of several result batches generated by the source nodes, as long as the identifiers of the result batches fall within a certain range. For example, for every five result batches generated by the source nodes, a single data batch is produced for the target node, comprising the concatenation of the five result batches from every source node. In another more complex scenario, the target node divides the time dimension into time intervals. At each time interval, it concatenates all the result batches it has received from all the source nodes during the last time interval and then considers that the data batch for its computation.

For a root node with one or more data streams, processing similar to that described above in conjunction with the intermediate nodes can be utilized.

Additional naming conventions are used in illustrative embodiments to refer to time intervals for performing tasks within the execution of a distributed streaming computation. These time intervals will be referred to generically as <timeIntervalName>, and are illustratively defined as follows:

1. Batching Time Interval for a Leaf: the average amount of time it takes to wait for data to arrive and to create a data batch at a given leaf node, denoted timeBatchingLeaf-<dataStreamName> or tb-<dataStreamName>.

2. Batching Time Interval for a Data Batch: the amount of time it takes to wait for data to arrive and to create a data batch, denoted timeBatchingBatch-<dataStreamName>:<dataBatchId> or tbb-<dataStreamName>:<dataBatchId>.

3. Computing Time Interval for a Node: the average amount of time it takes to perform the computation of a data batch at a given computing node, denoted timeComputingNode-<dataStreamName> or tc-<dataStreamName>.

4. Computing Time Interval for a Data Batch: the amount of time it takes to perform the computation of a data batch at a given computing node, denoted timeComputingBatch-<dataStreamName>:<dataBatchId> or tcb-<dataStreamName>:<dataBatchId>.

5. Transmitting Time Interval for a Link: the average amount of time it takes to send a result batch from a source node to a target node, denoted TimeTransmittingLink-<dataStreamName> or tt-<dataStreamName>.

6. Transmitting Time Interval for a Result Batch: the amount of time it takes to send a result batch from a source node to a target node, denoted TimeTransmittingBatch-<dataStreamName>:<resultBatchId> or ttb-<dataStreamName>:<resultBatchId>.

7. Computing Cycle Time Interval on Route: the average amount of time it takes for a data batch to go through an entire computing cycle along a route in an SCG, or more particularly the average time interval from the moment that a data batch starts to be generated at the leaf node of the route, to the moment that a result batch is actually computed at the root node, denoted TimeComputingCycle-<dataStreamName> or tcc-<dataStreamName>.

8. Computing Cycle Time Interval on Route for a Data Batch: the amount of time it takes for a data batch to go through an entire computing cycle along a route in an SCG, or more particularly, the time interval from the moment that the data batch starts to be generated at the leaf node of the route, to the moment that the corresponding result batch is actually computed at the root node, denoted TimeComputingCycleBatch-<dataStreamName>:<dataBatchId> or tccb-<dataStreamName>:<dataBatchId>. In this case, the <dataStreamName> is of the form <ww-scg-id>-<0>-<Data Zone-Root>-<Leaf-Level>-<Data-Zone-Leaf>.

Figure 27:
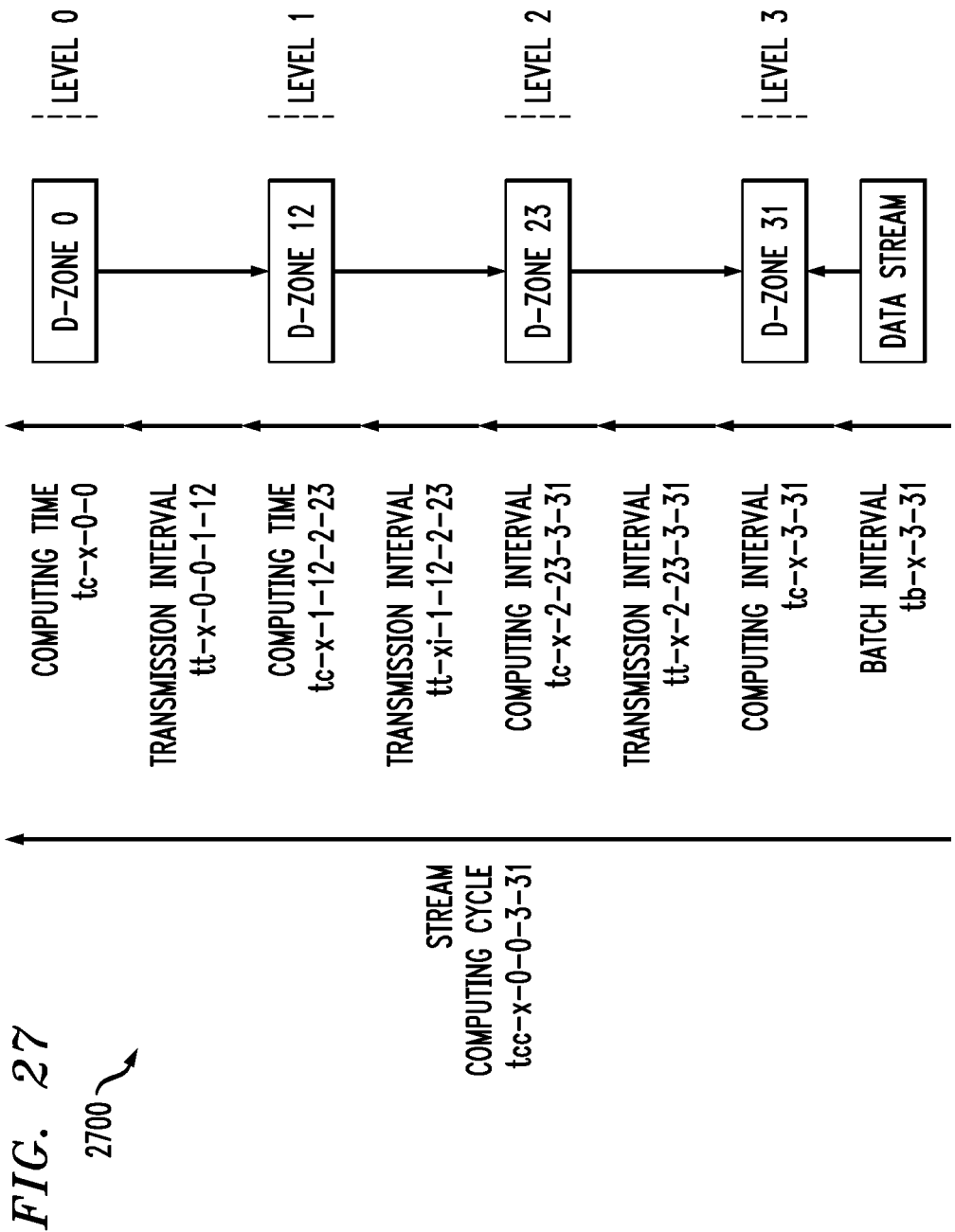

FIG. 27 illustrates a portion 2700 of the global computation graph 2100 previously described in conjunction with FIGS. 21-23 and shows examples of the above-described naming conventions for time intervals in that portion.

In a given embodiment, certain issues can arise in distributing streaming computations over multiple data processing clusters. For example, clusters in different data zones can have different levels of computational resources and different levels of availability. Other issues include failures resulting from data corruption or other factors, unavailability of certain runtime systems required for the computation, transmission delays and costs for sending data streams from source nodes to target nodes, and unpredictability of data sources in generating the data streams processed by the leaf nodes. These and other issues are alleviated through appropriate configuration of the global data structures and associated processing operations disclosed herein. For example, certain aspects of a distributed streaming computation framework as disclosed herein can be made configurable by system users to that the users can best adapt the system functionality to the particular needs of a given environment.

Additional timing issues associated with approximate synchronization will now be described with reference to FIGS. 28 through 31. It is assumed in these embodiments that there is a one-to-one mapping between a batch result from a source node into a corresponding data batch in a target node. Those skilled in the art will appreciate that the disclosed arrangements can be extended in a straightforward manner to more complex scenarios such as those involving multiple data streams arriving at a given target node.

Figure 28:
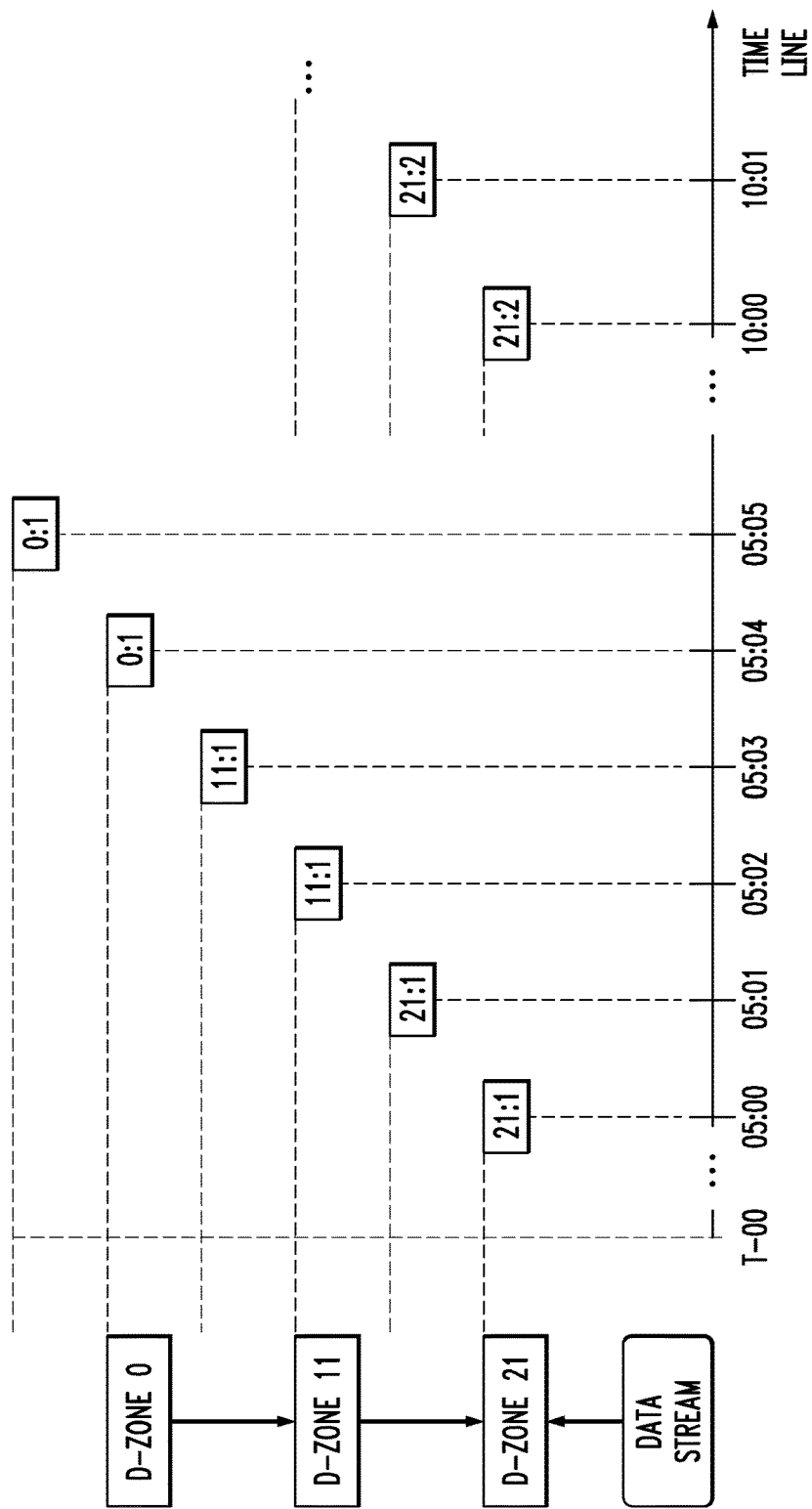

FIG. 28 shows an example of an ideal timing scenario using a timeline 2800 for a portion of the global computation graph 2100 previously described in conjunction with FIGS. 21-23. In this example, the batch time interval at the leaf node, the computation time at all nodes, and the transmission time intervals are all known, constant and predictable. Accordingly, the result stream generated at the root node is very well behaved, with a steady flow of result batches being generated at predictable time intervals.

Assuming ideal timing scenarios of the type illustrated in FIG. 28, the data streams can be readily synchronized across the different routes from the leaf nodes to the root node. This is shown in FIG. 29 by a set of routes 2900 which correspond to respective routes of the global computation graph 2100 previously described in conjunction with FIGS. 21-23.

Figure 29:
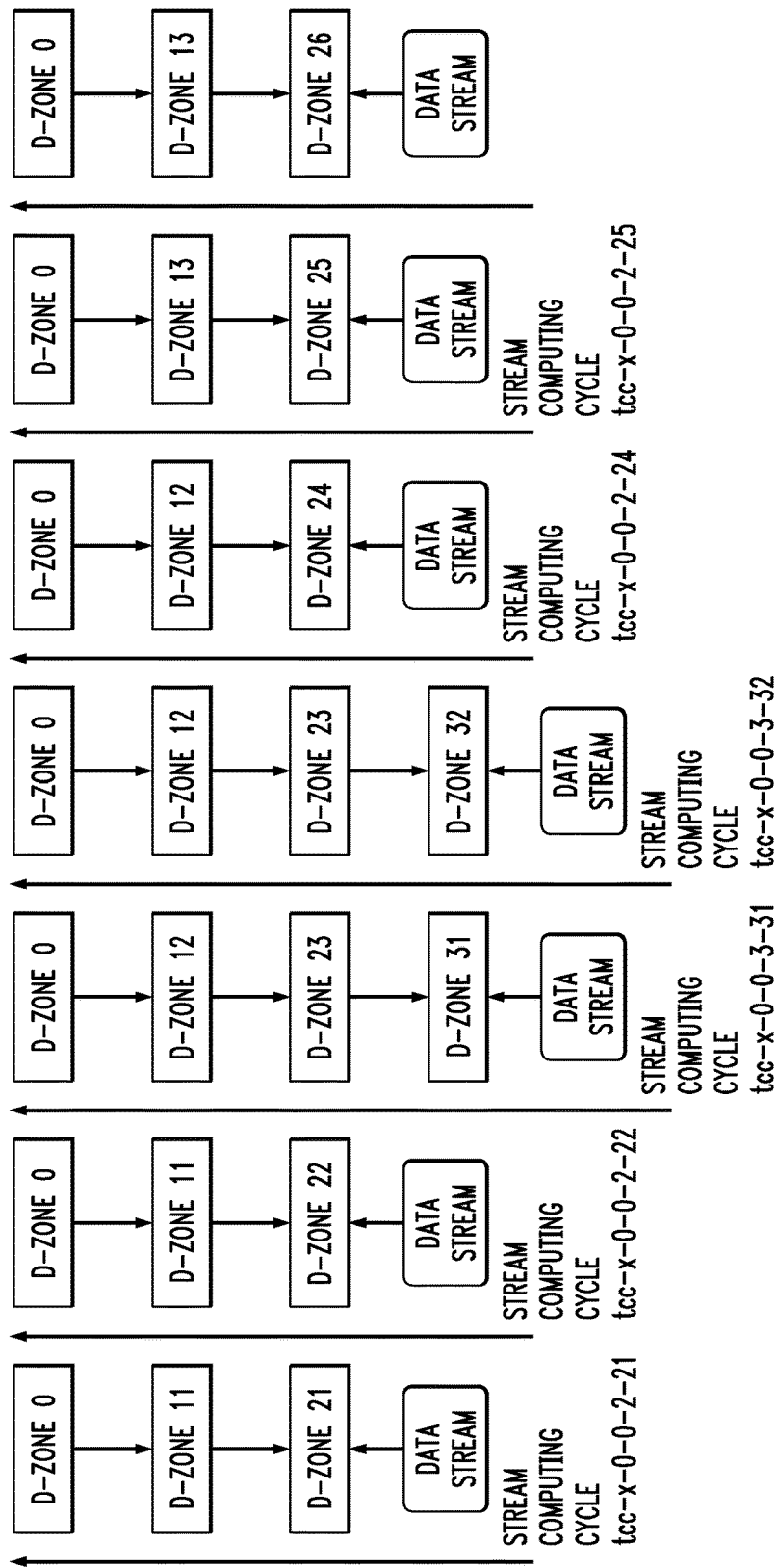

In the FIG. 29 embodiment, the first result batch can only be generated at the root node after a time interval equal to the longest stream computing cycle in the global computation graph 2100. Furthermore, once this first result batch is generated, other result batches will be generated at equal time intervals, equal to the duration of the batching time intervals. It is also assumed that the batching time intervals at all leaf nodes are approximately the same.

Aspects of such timing synchronization illustratively include accurate batch chaining, optimal total execution timing, and synchronization across all execution streams.

Figure 30:
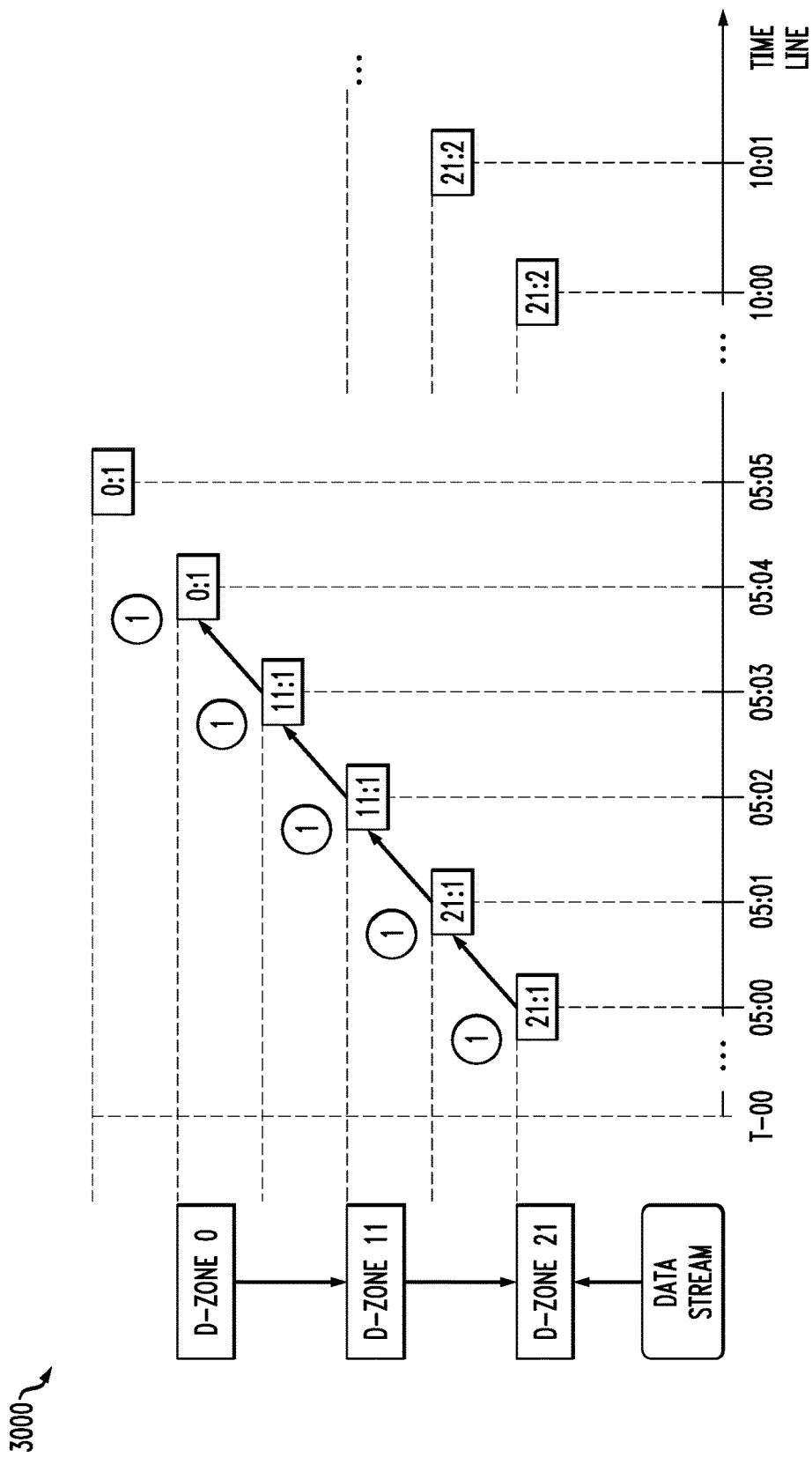

With regard to accurate batch chaining, FIG. 30 illustrates a timeline 3000 that corresponds generally to the timeline 2800 previously described in conjunction with FIG. 28. As depicted in the timeline 3000 of FIG. 30, there is a one-to-one mapping between the result batch of a source node and the corresponding data batch of a target node. No data is lost during transmission and all data arrives in the appropriate order. Furthermore, it is also expected in such an embodiment that all the data streams start generating data at the same time and all the batching time intervals are exactly the same.

With regard to optimal total execution time, the timeline 3000 of FIG. 30 also illustrates that the timing between the data batches being generated at the leaf nodes is steady and approximately the same, with a minimum delay introduced waiting for data arrival. The total execution time is assumed to be approximately the same for every route in the global computation graph 2100.

Figure 31:
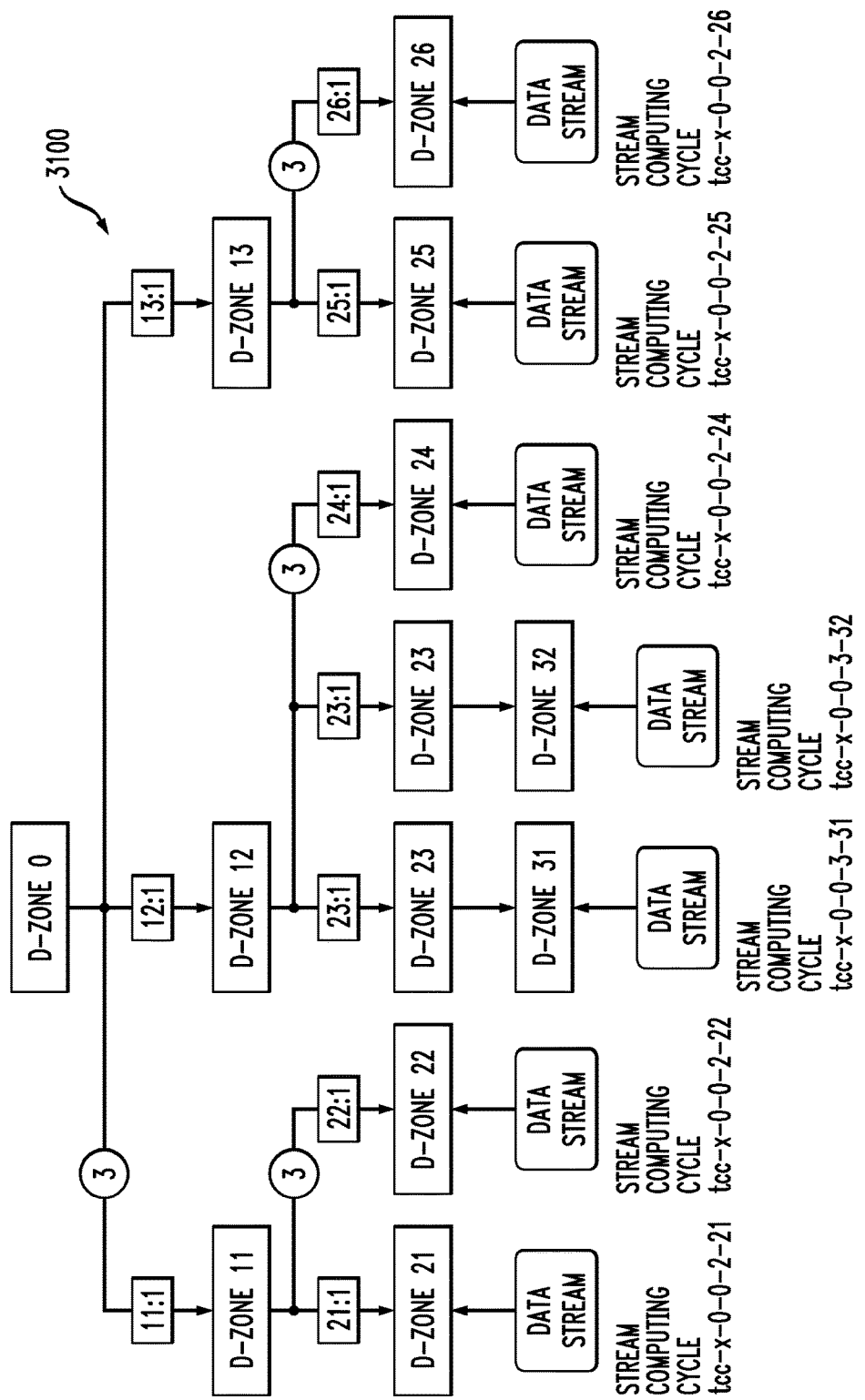

With regard to synchronization across all execution streams, FIG. 31 shows a diagram 3100 illustrating timing aspects of computations performed in accordance with the global computation graph 2100 previously described in conjunction with FIGS. 21-23. As depicted in the diagram 3100 of FIG. 31, there is approximate synchronization among all of the execution streams across all of the routes in the global computation graph 2100. There are no issues in this embodiment regarding concatenating or fusing data batches at each of the target nodes that receive data from several streams.

As mentioned previously, the embodiments of FIGS. 28-31 assume a one-to-one mapping between a given batch result from a source node into a corresponding data batch in a target node. Such an arrangement illustratively facilitates synchronization of data streams across all routes within a WW-SCG.

However, a number of factors that may be present in certain embodiments can create additional challenges for synchronization.

For example, data streams may start at different times, such that some data streams may have been generating data for some time prior to the start of the execution of the distributed streaming computation involving the data stream. A determination should then be made regarding how to delineate the start of the first data batch at each leaf node. This can be achieved in a number of different ways. In some embodiments, the control flow will provide a starting absolute time for all data batching at the leaf nodes, and the synchronization can be done entirely based on the identifier of the data batches and result batches. This assumes clock synchronization between the leaf nodes. Alternatively, the leaf nodes can generate time-stamps and attach the time-stamps to the data batches. Each intermediate node and the root node will then decide, based on the time-stamps, how to synchronize data batches that need to be fused. Another possible approach is for the root node to discard data batches until it receives a batch stream that is complete from all leaf nodes. In this case, the last route to send a first data batch to the root node defines and determines the first data batch for the root node.

Another synchronization issue is that batching may start at different times on different leaf nodes, such that some routes start execution before others, leading to issues similar to those described above.

Late data can present synchronization issues. For example, the result batch of a source node may arrive outside the batching time interval of the target node and therefore cannot be fused into the data batch of the target node. This can be addressed by the target node designating the data batch as null or empty since it is incomplete. Additionally or alternatively, the target node can fuse the data batches that arrive on time and discard the ones that arrive late.

Early data can also be problematic. For example, the result batch of a source node may arrive too early at the target node, before the time interval for its batching. In this case, the target node can be configured to identify and buffer or cache the result batch from the source node until its batching time interval occurs.

It is also possible that no data arrives at a leaf node during a batching cycle, in which case the data batch is empty and the corresponding result batch is also empty.

In the examples above, it can be challenging to associate a sequence number to a data batch and, consequently, to a result batch. For example, such associations can be based solely on time arrival or generation time of the data batch, on absolute, sequential indexes, assuming one result batch per data batch, on time-stamps, or on various combinations of these and other types of contextual information.

In a given streaming computation, it can be difficult for an intermediate node to decide how long it should wait for a result batch to arrive from a source node. For example, it could wait for a specific batching time interval, or it could exhibit additional flexibility by waiting that time interval plus an additional amount of time, possibly in order to accommodate expected transmission delays. In the latter case, it could compensate for transmission delays by defining shorter batching time intervals for data that has arrived.

Certain assumptions may be made in illustrative embodiments in order to address these and other synchronization issues. For example, one or more of the following non-limiting assumptions may be made in a given embodiment:

1. All clocks on all data zones are synchronized.
2. The batching cycles on all data zones are the same.
3. All batches can eventually be time-stamped, enabling the system to self-monitor and adjust synchronization parameters for data batches and result batches.
4. The computation time on all data zones will be approximately the same, which may more particularly involve assuming that all data zones have the same processing and memory capacity, all data zones have the same connectivity bandwidth, the amount of data to be processed at each data zone is approximately the same, the data stream flow that arrives at each leaf node is approximately the same, and the result batch flow that arrives at each intermediate node is approximately the same.

Some embodiments are configured to implement an iterative approach for synchronization in which the system is configured to learn and automatically converge towards an approximately synchronized scenario. These embodiments can be configured to determine appropriate adjustments of the previously-described time intervals.

For example, at a given leaf node, the cycle time interval is equal to its batching interval, or cycle time=batch-interval. At the intermediate nodes and at the root node, the cycle time will be adjusted by adding an adjust time to the cycle time, or cycle time=tcc+adjust-time. The stream-compute-cycle is calculated as the maximum between an absolute value provided by the user, and a percentage of the batch-interval defined by the system (e.g., 10%), where this value can be adjusted dynamically as the system learns more about the properties of the computational environment and the individual computations. The adjust-time may be an absolute time interval defined by the system to account for variations in the computing and transmission intervals along the stream. The system can be configured to monitor the time-stamps along the various routes through the WW-SCG and to implement an analytics-based approach to better estimate the stream computing cycle.

Examples of techniques that can be used to adjust parameters in illustrative embodiments include the use of user-defined parameters such as batch cycle time and stream cycle time, system parameters such as total stream cycle time as a function of the adjust time and the calculated stream cycle time. The actual start time can be delayed at one or more of the intermediate nodes and the root node. Combinations of these and other parameter adjustment techniques can also be used to accommodate synchronization issues.

Other examples of techniques for parameter adjustment include overestimating the total stream cycle time and adjusting it dynamically based on the flow of time-stamps from leaf nodes to the root node. Such an approach may experience a significant delay to first results during an initial learning phase. Batch cycle times may be adjusted through user-defined batch cycle times at the leaf nodes and delay of the start time of the first batch cycle at the intermediate nodes and at the root node. In such an arrangement, it is only the leaf nodes that are started in accordance with the user-defined batch-cycle times.

In some embodiments, adjustments of the type described above are organized into multiple phases. For example, one possible phased arrangement includes the following distinct phases, although more or fewer phases could be used in other embodiments.

A first phase denoted Phase 0 assumes that perfect timing will occur. Application semantics can be configured to make provision for handling late and/or early data (e.g., dropping some samples). It is assumed in this phase that there is one input data stream for each intermediate node and the fusion logic is applied on a per data stream basis.

A second phase denoted Phase 1 performs minimal tuning through adjustment of system parameters. For example, this phase can estimate total stream cycle time and calculate adjusted time intervals across all nodes, with minimal tuning of start times for all data zones.

A third phase denoted Phase 2 performs buffering of result batches. This illustratively includes recording and monitoring of time-stamps as well as buffering any early result batches until the next cycle.

A fourth phase denoted Phase 3 performs dynamic calculation of an adjusted time interval. This phase can be configured to respond to bad estimations and to variations in performance and network traffic.

A fifth and final phase denoted Phase 4 implements machine learning processes for long-lasting streams. For example, machine learning can be used to better predict how long to wait for data to arrive during batching time intervals.

The particular phases and their associated processing operations as described above are presented by way of example only and should not be construed as limiting in any way.

Illustrative embodiments provide fine tuning and eventual synchronization of data streams. For example, some embodiments are configured to provide an accurate binding between the result batches received in data streams from one or more source nodes and corresponding data batches used for computation in a target node. The binding is illustratively based on a set of properties that can include a combination of time-stamps, indexes, calculation of total stream computation cycle, coupled with continuous data analytics to adjust the time intervals associated with result batches and data batches. The continuous data analytics are configured to provide the distributed streaming computation framework with an ability to learn in order to dynamically adjust the properties used for data stream synchronization and to increase the accuracy of the synchronization over time.

An example of a method for calculating the starting time of the batch cycles for all nodes illustratively includes the following operations:

1. Estimating the total WW-Stream computing cycle.
2. Sending starting time intervals across the WW-SCG.

3. Continuously monitoring the time-stamps of the data batches and the result batches.

4. Adjusting the calculations on the fly.

These and other embodiments can synchronize data stream computations on a WW-Stream utilizing WW-SCG levels and time-stamp monitoring.

Figure 32:
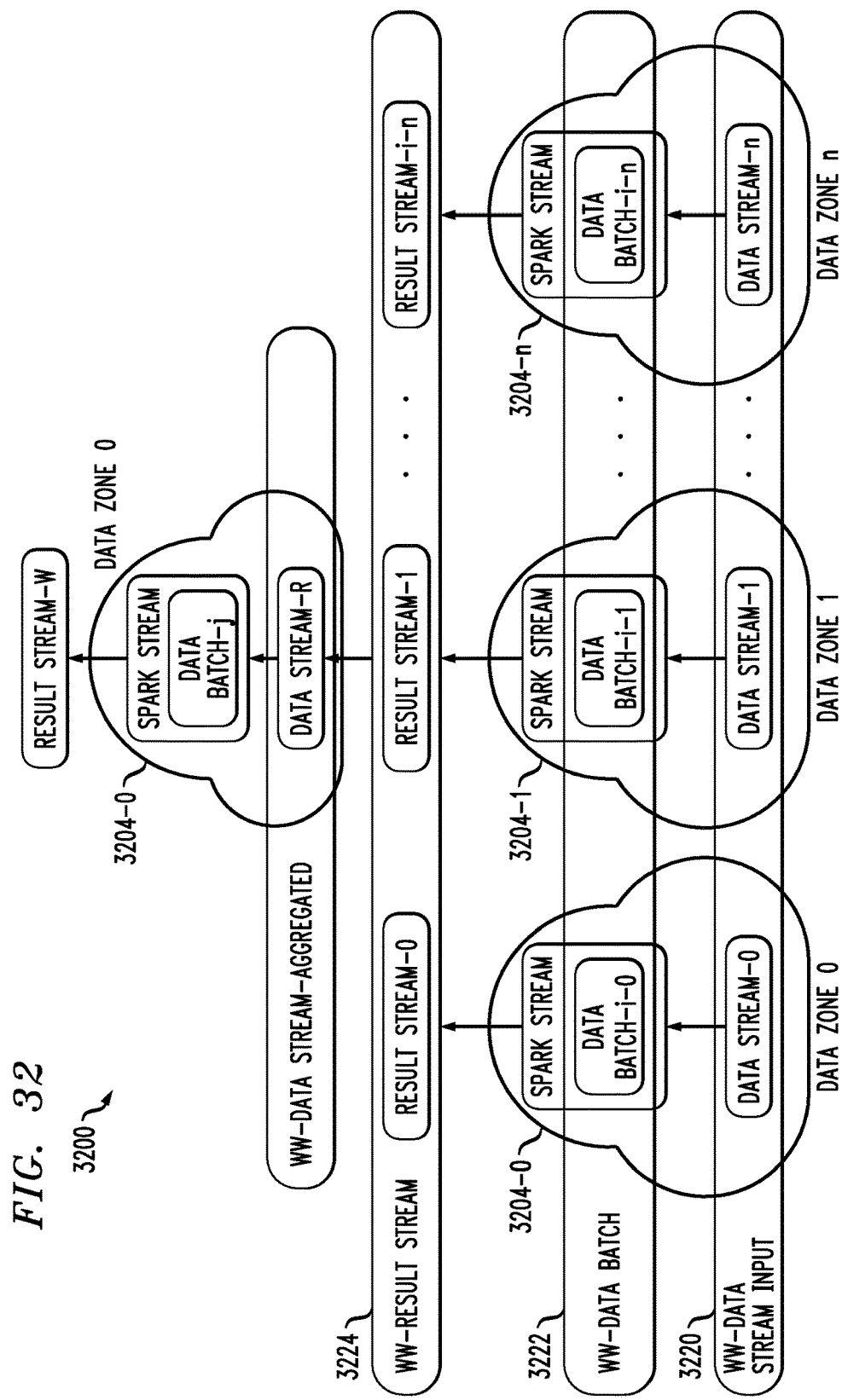

FIG. 32 shows another example of an information processing system 3200 configured with such a WW-DataStream framework. In this embodiment, system 3200 comprises multiple clouds 3204-0, 3204-1, . . . 3204-n, each assumed to correspond to a separate YARN cluster. Cloud 3204-0 includes a Spark streaming component. An application initiated on cloud 3204-0 utilizes the Spark streaming component of that cloud and associated distributed streaming computations are performed using data streams locally accessible to respective clouds 3204-0 through 3204-n at a data input level 3220. The system 3200 includes a Spark streaming computation level 3222, and a data output level 3224. Results of the distributed streaming computations performed using the data streams of the data input level 3220 are surfaced via the data output level 3224 back to the Spark streaming component of the initiating cloud 3204-0. These results are further processed in the Spark streaming component in order to provide an appropriate output result stream ("Result Stream-W") back to the requesting client.

The data input level 3220, Spark streaming computation level 3222 and data output level 3224 correspond to respective WW-DataStream, WW-DataBatch and WW-ResultStream global data structures in this embodiment. These and other related global data structures such as WW-SCG collectively provide an exemplary WW-DataStream framework.

The illustrative embodiment of FIG. 32 is particularly configured for distribution of Spark streaming computations, but can be adapted to perform other types of distributed streaming computations. The distribution of streaming computations can be across any geographic territory, from clusters located in the same data center to clusters distributed across the world. The distribution can be done across physical domains, such as different physical hardware clusters, or across logical or virtual entities, such as two microsegments defined by a virtual network framework.

These illustrative embodiments execute portions of Spark streaming computations on each of the data streams in a given WW-DataStream framework instance, and aggregate the results from the individual data streams into a global computation result. As noted above, the WW-DataStream framework allows for the independent and parallel execution of Spark streaming computations on each of the data streams in the same or different clusters. Such arrangements ensure that the distributed streaming computations are performed as close as possible to the corresponding data streams without violating data access or movement restrictions of any data zone.

The WW-DataStream framework in the embodiment of FIG. 32 is highly flexible and allows computation code to be written in any language that supports the Spark Core API, including JAVA, R, Python and Scala.

The WW-DataStream framework in some embodiments is configured to leverage a WWH catalog service to determine the particular clusters to be involved in a given set of distributed streaming computations. This also involves locating the needed data sources for each of the associated data streams.

The WW-DataStream framework in some embodiments is configured to manage the distribution of streaming computations across disparate data processing clusters of a WWH platform, including choosing the appropriate data processing clusters and managing the various data processing requirements and data governance involved when aggregating computation results derived from separate, dispersed data streams.

The WW-DataStream framework in some embodiments allows streaming computations to be distributed in a recursive fashion that is transparent to an originating client or other user.

In these and other embodiments, the distributed streaming computations may be performed utilizing multiple instances of local code running on respective nodes within respective ones of the data processing clusters and at least one instance of global code running on an initiating node within or otherwise associated with a particular one of the data processing clusters. The global code receives respective results from the multiple instances of the local code running on the respective nodes within the respective ones of the data processing clusters and aggregates those results. An application running on a client device or on a given cluster node may provide one or more of the local code, the global code and a list of data resources to a distributed processing application master of a WWH component. The list of data resources illustratively identifies particular data streams against which one or more of the local code and the global code are to be executed.

Figure 33:
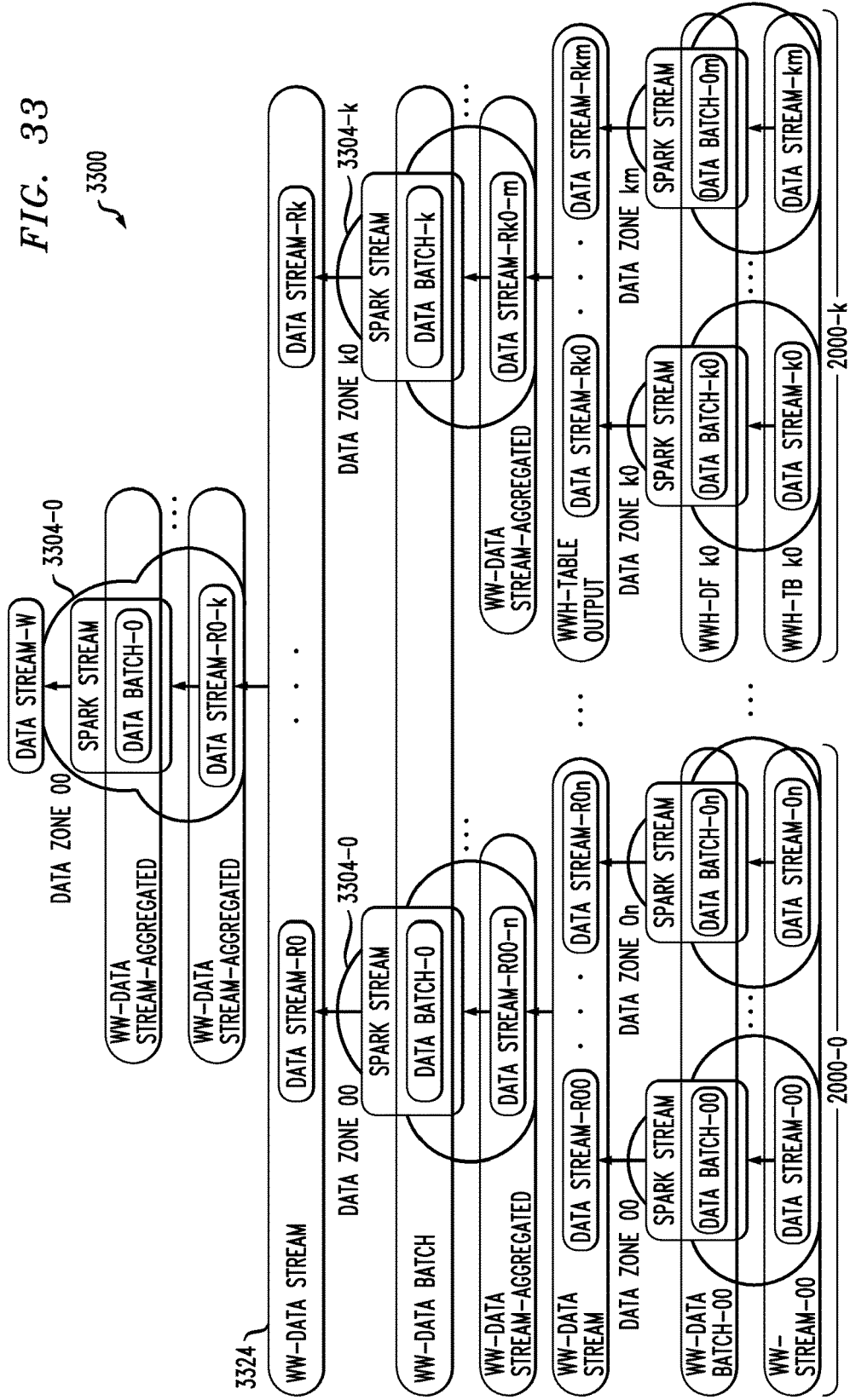

FIG. 33 illustrates an information processing system 3300 in which multiple WW-DataStream frameworks of the type shown in FIG. 32 are combined in order to support recursiveness in distributed streaming computations. The system 3300 comprises multiple instances of the system 2000 of FIG. 20, denoted as systems 2000-0 through 2000-k. The data output level of each of the systems 2000-0 through 2000-k is associated with a different one of a plurality of additional clouds 3304-0 through 3304-k. Each of these additional clouds 3304 is assumed to comprise an additional YARN cluster of the system 3300. Distributed streaming computation results from the additional clouds 3304 are surfaced through a data output level 3324.

In this embodiment, it is assumed that an initiating application is originated in the cloud 3304-0 and utilizes local data streams of that local cloud and its underlying instance of the system 2000 as well as remote data streams of other ones of the clouds 3304 and their respective underlying instances of the system 2000. The cloud 3304-0 aggregates computation results from the data output level 3324 into a global result stream ("Data Stream-W") that is made available to the requesting client. The data streams utilized in generating the global result stream remain protected within the data zones of their respective clouds.

Numerous other implementations of recursion in distributed streaming computations can be implemented utilizing WW-DataStream frameworks of the type described in conjunction with the embodiments of FIGS. 20, 32 and 33.

Figure 34:
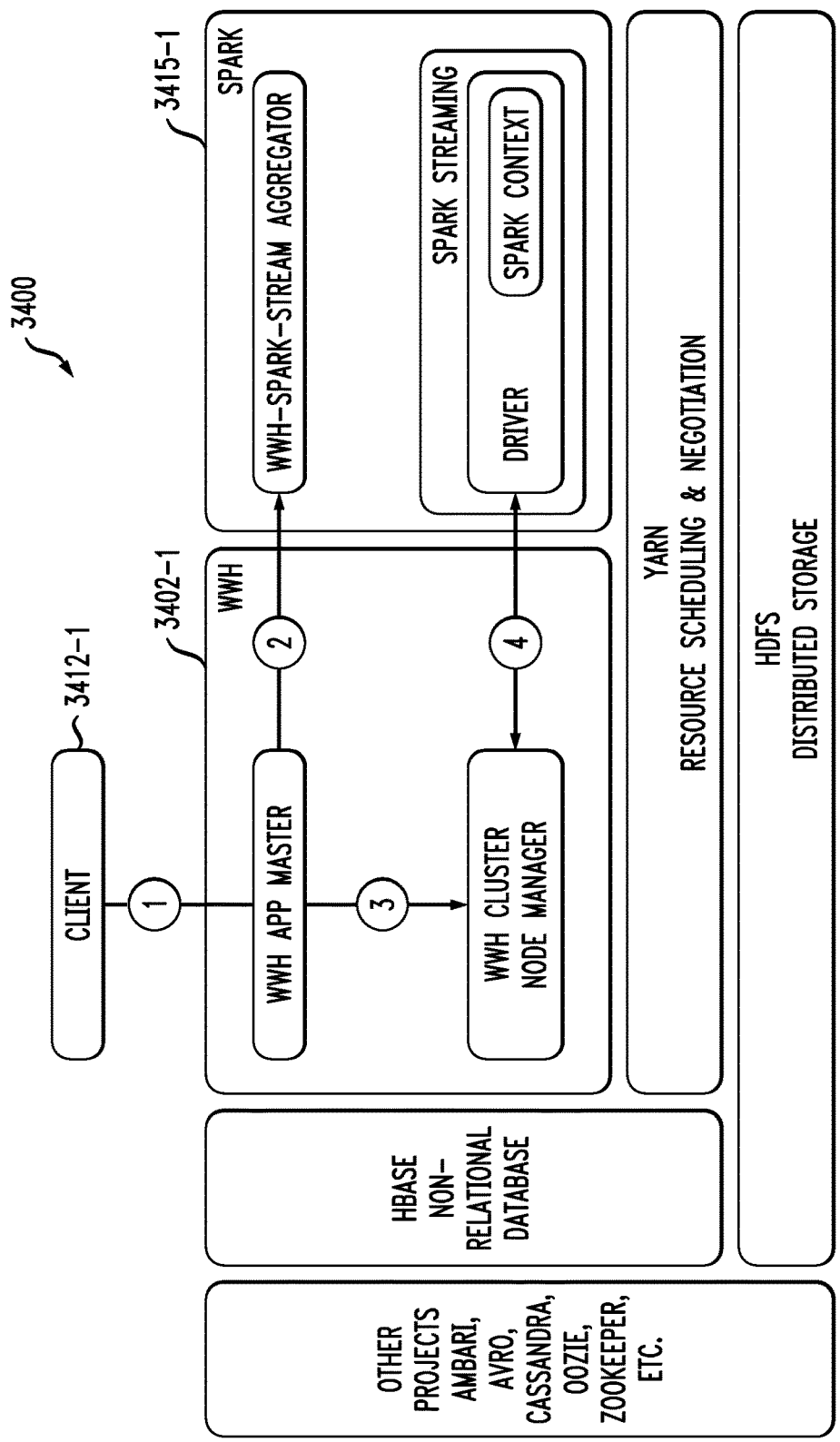

FIG. 34 illustrates another embodiment of an information processing system 3400 with scalable distributed streaming computation functionality. The system 3400 includes a WWH component 3402-1, a client 3412-1 and a Spark component 3415-1. The WWH component 3402-1 and Spark component 3415-1 are assumed to be implemented on a single data processing cluster associated with a particular data zone.

The WWH component 3402-1 may comprise at least a portion of one or more WWH nodes of a WWH platform of the type previously described. Additionally or alternatively, it may comprise at least portions of one or more distributed data processing clusters. The WWH component 3402-1 includes a WWH application master, as well as a WWH cluster node manager. The WWH application master is an example of what is more generally referred to herein as a "distributed processing application master."

The WWH component 3402-1 communicates with the client 3412-1 over one or more networks. For example, the client 3412-1 can be implemented on a client device that is separate from the node or nodes that implement at least portions of the WWH component 3402-1. It is also possible that the client 3412-1 can be implemented at least in part on the same processing device or set of processing devices that implements at least a portion of the WWH component 3402-1.

The WWH component 3402-1 is configured to interact with the Spark component 3415-1. The Spark component 3415-1 comprises a Spark streaming component that includes a Spark driver program providing Spark context support. The Spark driver program is an example of what is more generally referred to herein as a "stream processing driver." The Spark component 3415-1 further comprises a WWH Spark stream aggregator.

The diagram of FIG. 34 also illustrates a number of processing operations performed within the system 3400. The operations are labeled 1 through 4 in the figure, and more specifically include the following:

1. Client 3412-1 initiates a Spark application involving distributed streaming computations by communicating with WWH application master of WWH component 3402-1.

2. The WWH application master of WWH component 3402-1 communicates with the WWH Spark stream aggregator of the Spark component 3415-1.

3. Within the WWH component 3402-1, the WWH application master communicates with the WWH cluster node manager.

4. The WWH cluster node manager of WWH component 3402-1 interacts with the Spark streaming driver of the Spark component 3415-1.

The WWH Spark stream aggregator of Spark component 3415-1 in this embodiment receives and aggregates the approximately synchronized result batches generated by the distributed streaming computations. It performs a global computation utilizing those result batches and generates a corresponding result batch for the global computation that is returned to the client 3412-1.

After starting the WWH Spark stream aggregator, the WWH application master starts the WWH cluster node manager which will then act as a local client to the Spark streaming component and start the local Spark streaming computation by interacting with the Spark streaming driver. As the local Spark streaming computation generates result batches, those batches are returned to the WWH cluster node manager which in turn forwards them to the WWH Spark stream aggregator for use in the global computation and generation of the final result batch to be sent to the client 3412-1.

These particular operations and others referred to herein are presented by way of illustrative example only and can be varied in other embodiments.

Figure 35:
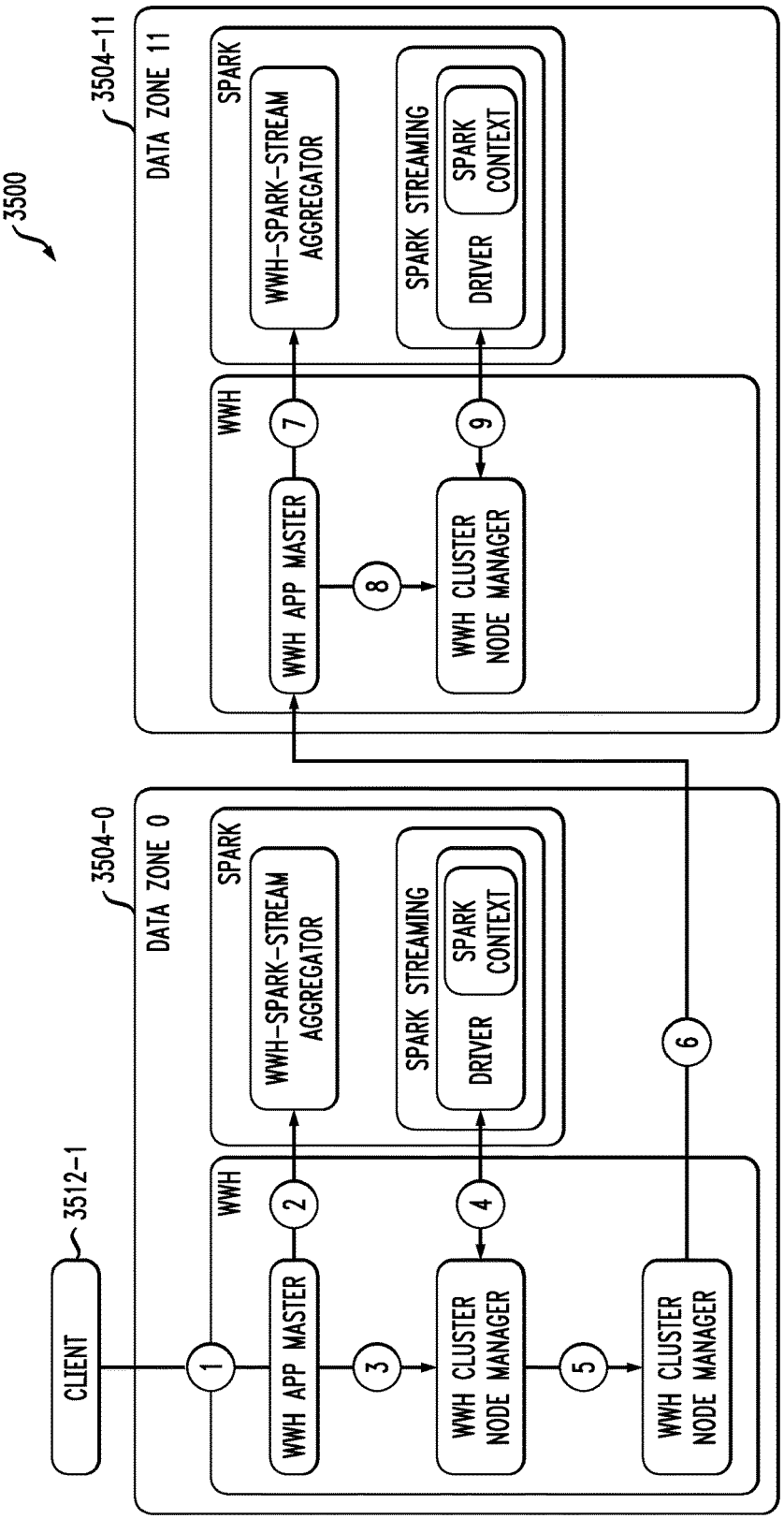

An extension of the single-cluster embodiment of FIG. 34 to multiple clusters is illustrated in information processing system 3500 of FIG. 35. In this embodiment, system 3500 comprises a plurality of distributed data processing clusters 3504-0 and 3504-11 associated with respective data zones denoted Data Zone 0 and Data Zone 11. The system 3500 further comprises a client 3512-1 that is in communication with the cluster 3504-0. The client 3512-1 may be implemented on a separate processing device that is coupled to the cluster 3504-0 via one or more networks that are not explicitly shown. Alternatively, the client 3512-1 can be implemented at least in part on one of the nodes of the cluster 3504-0.

The cluster 3504-0 is designated as a "local" cluster relative to the client 3512-1 in this embodiment and the other cluster 3504-11 is an example of what is also referred to as a "remote" cluster relative to that client.

Each of the clusters 3504-0 and 3504-11 includes WWH and Spark components similar to those previously described in conjunction with the embodiment of FIG. 34.

In the FIG. 35 embodiment, a WW-DataStream distributed streaming computation is done across the multiple clusters 3504-0 and 3504-11 and their respective data zones. Data Zone 0 of cluster 3504-0 is the initiating data zone and Data Zone 11 of cluster 3504-11 is a remote data zone relative to the initiating data zone.

The diagram of FIG. 35 also illustrates a number of processing operations performed within the system 3500. The operations are labeled 1 through 9 in the figure, and more specifically include the following:

1. The client 3512-1 starts a WW-DataStream computation by starting a WWH application master in the cluster 3504-0.

2. The WWH application master in cluster 3504-0 starts a WWH Spark stream aggregator that will receive the result batches from all remote computations, perform a global computation, and then generate another result batch in the data stream sent to the client 3512-1.

3. The WWH application master of cluster 3504-0 starts a first WWH cluster node manager within cluster 3504-0. This WWH cluster node manager becomes the local client for the local computation of the data stream being generated in Data Zone 0.

4. The first WWH cluster node manager started by the WWH application master of cluster 3504-0 starts a local Spark streaming application which will in turn generate result batches as the computation is executed. The WWH application master of cluster 3504-0 will send these result batches as they are generated to the WWH Spark stream aggregator of cluster 3504-0.

5. The WWH application master of cluster 3504-0 starts a second WWH cluster node manager within cluster 3504-0. This WWH cluster node manager becomes the remote client for the remote computation of the data stream being generated in Data Zone 11.

6. The second WWH cluster node manager started by the WWH application master of cluster 3504-0 starts a remote Spark streaming application in Data Zone 11 which will in turn generate result batches as the computation is executed. This involves starting a WWH application master in the cluster 3504-11, illustrating the recursive nature of the process in the present embodiment.

7. The WWH application master in cluster 3504-11 starts a WWH Spark stream aggregator that will receive the local result batches, perform a global computation, and then generate another result batch in the data stream sent to its requesting client, which is the second WWH cluster node manager of cluster 3504-0.

8. The WWH application master of cluster 3504-11 starts a first WWH cluster node manager within cluster 3504-11. This WWH cluster node manager becomes the local client for the local computation of the data stream being generated in Data Zone 11.

9. The first WWH cluster node manager started by the WWH application master of cluster 3504-11 starts a local Spark streaming application which will in turn generate result batches as the computation is executed. The WWH application master of cluster 3504-11 will send these result batches as they are generated to the WWH Spark stream aggregator of cluster 3504-11.

Again, these particular operations and others referred to herein are presented by way of illustrative example only and can be varied in other embodiments.

Figure 36:
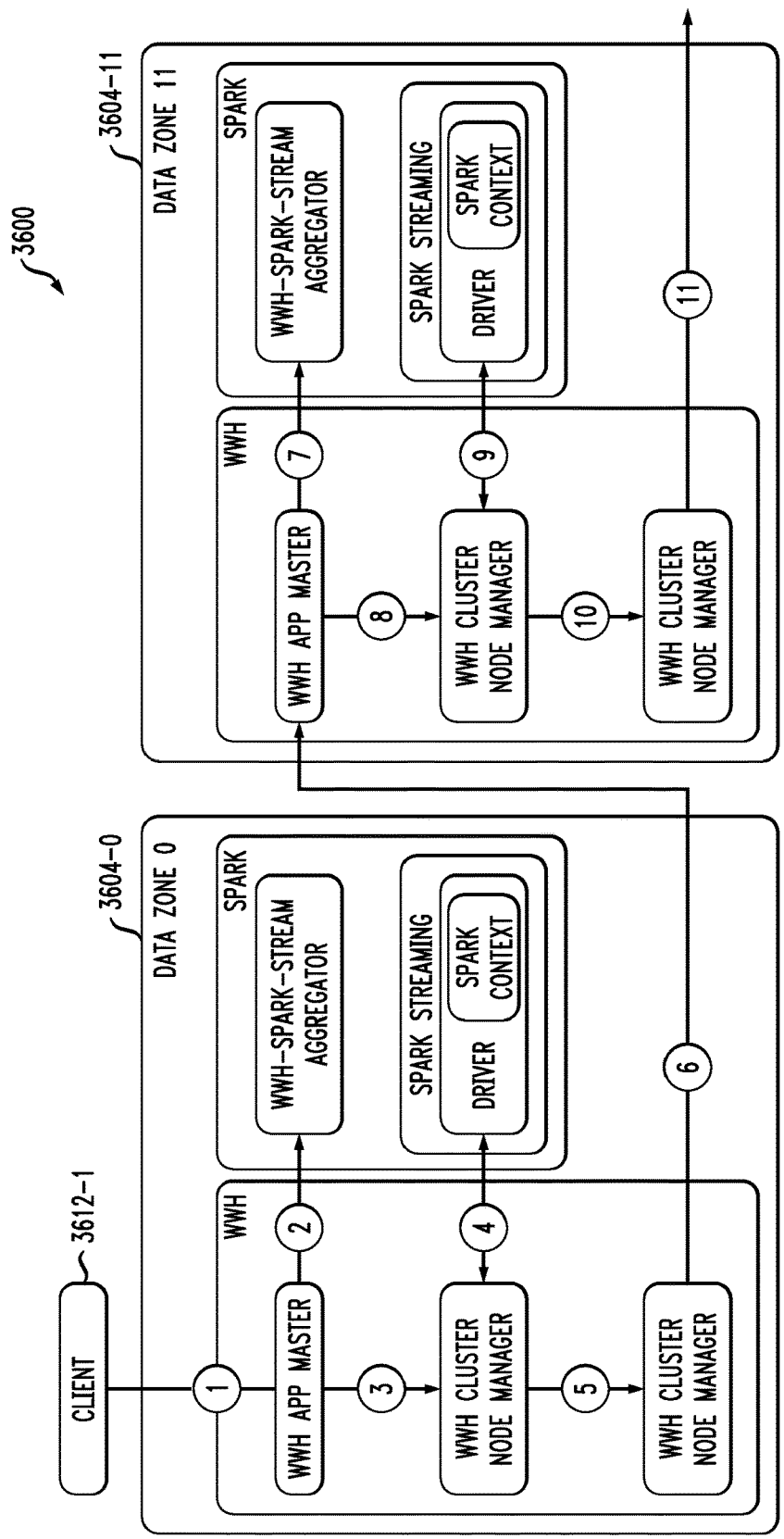

Further recursion functionality is illustrated in information processing system 3600 of FIG. 36, which extends the operation of the FIG. 35 embodiment to additional processing operations labeled 10 and 11. The configuration of system 3600 is generally the same as that of system 3500, and includes clusters 3604-0 and 3604-11 associated with respective data zones denoted Data Zone 0 and Data Zone 11, and a client 3612-1 in communication with cluster 3604-0. The additional processing operations in this embodiment are more particularly as follows:

10. The WWH application master of cluster 3504-11 starts a second WWH cluster node manager within cluster 3504-11. This WWH cluster node manager becomes the remote client for remote computation of another data stream being generated in another cluster and associated data zone not explicitly shown in the figure.

11. The second WWH cluster node manager started by the WWH application master of cluster 3504-11 starts a remote Spark streaming application in the other cluster and associated data zone which will in turn generate result batches as the computation is executed. This involves starting a WWH application master in the additional cluster, again illustrating the recursive nature of the process in the present embodiment.

The recursion illustrated in conjunction with the examples above can be carried on into further clusters and associated data zones as needed to complete the distributed streaming computations required by a given application.

Accordingly, a given WWH application master in a given cluster can generate one or more WWH cluster node managers each one of which can become the remote client for a computation in a remote data zone which can in turn start other WWH cluster node managers that become remote clients for computations in other remote data zones.

Recursion can similarly occur in each of the clusters and associated data zones of a given system implementation. For example, each of the clusters can create additional multiple WWH cluster node managers that become remote clients of Spark stream applications in remote data zones.

When a given WWH application master of one of the clusters starts one or more WWH cluster node managers that become remote clients of remote data zones, this in effect creates one or more additional nodes and possibly one or more additional levels in a corresponding WW-SCG characterizing the distributed streaming computations.

With reference again to system 3200 of FIG. 32, it should be noted that the result stream provided as input into the Spark stream component of cloud 3204-0 in Data Zone 0 is referred to as a WW-DataStream-Aggregated result steam because it comprises the aggregation of several result streams forming the WW-ResultStream of level 3224. A WW-DataStream-Aggregated result stream of this type is also generated by the WWH Spark stream aggregator of cluster 3604-0 in Data Zone 0 of system 3600 in the FIG. 36 embodiment.

Figure 37:
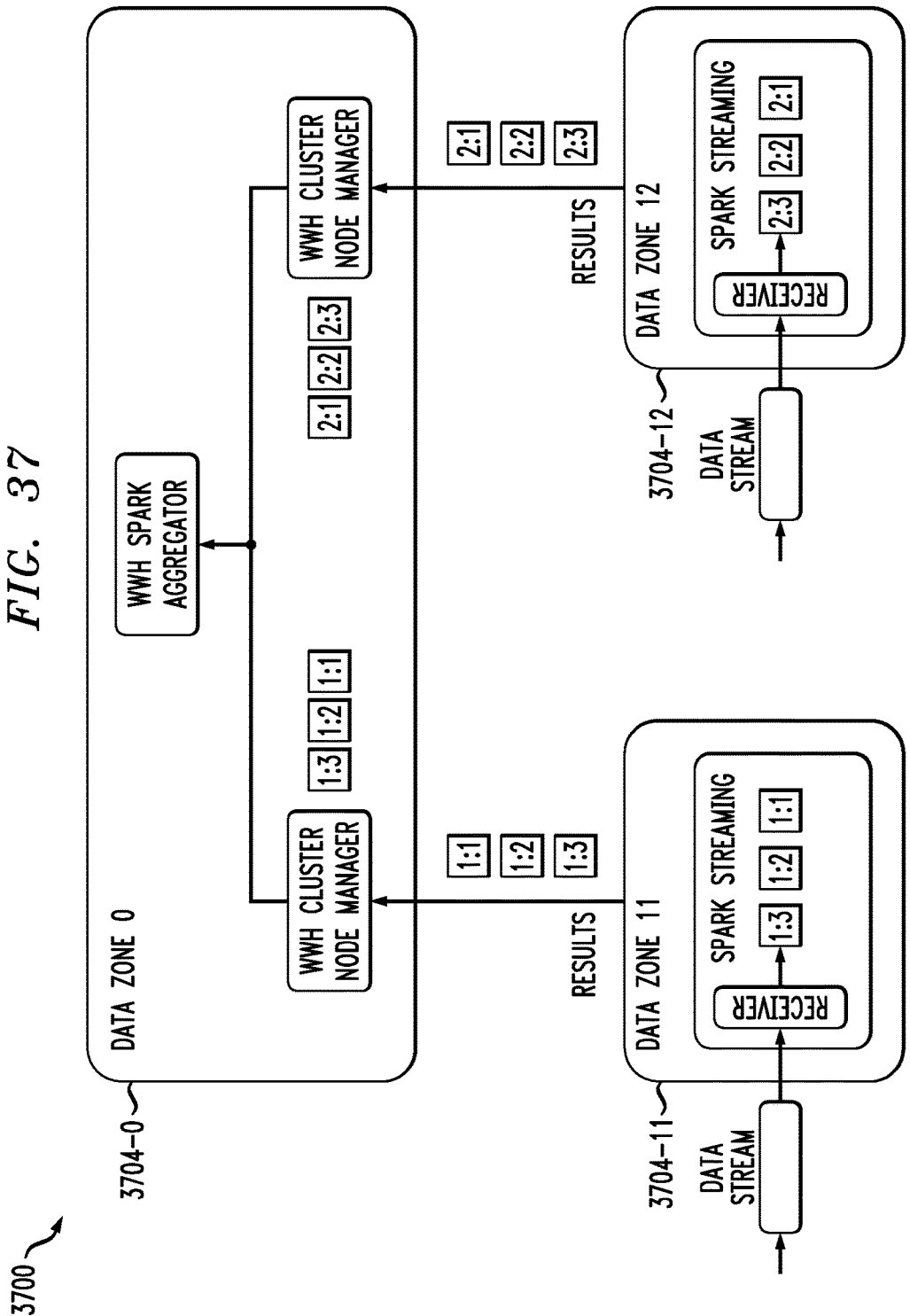

FIG. 37 shows an example of the aggregation of result streams in an information processing system 3700 comprising clusters 3704-0, 3704-11 and 3704-12 associated with respective data zones denoted Data Zone 0, Data Zone 11 and Data Zone 12 in an illustrative embodiment. As shown in the figure, multiple WWH cluster node managers of the cluster 3704-0 act as respective remote clients for the Spark streaming computations performed in respective clusters 3704-11 and 3704-12. Result batches received by the WWH cluster node managers from the Spark streaming computations performed in the clusters 3704-11 and 3704-12 are forwarded to a WWH Spark stream aggregator of cluster 3704-0. The WWH Spark stream aggregator illustratively performs the previously-described tasks associated with approximately and eventually synchronizing the result batches to create a WW-DataStream-Aggregated result stream which will then be input into the Spark streaming computation performed by cluster 3704-0 in Data Zone 0. Other arrangements can be used in other embodiments. For example, one or more tasks associated with approximate and eventual synchronization in other embodiments can be performed at least in part utilizing other system components.

In some embodiments, the distributed data streaming computations comprise Spark streaming computations of a Spark iterative application. Examples of such embodiments will now be described with reference to FIGS. 38-40.

These embodiments each comprise a plurality of data processing clusters associated with the respective data zones. The clusters and their associated data zones are again organized in accordance with a global computation graph for performance of the distributed data streaming computations. The global computation graph is illustratively a DAG such as the graph 2100 previously described in conjunction with FIGS. 21-23. Such a graph utilizes a global data structure referred to herein as a WW-SCG.

Figure 38:
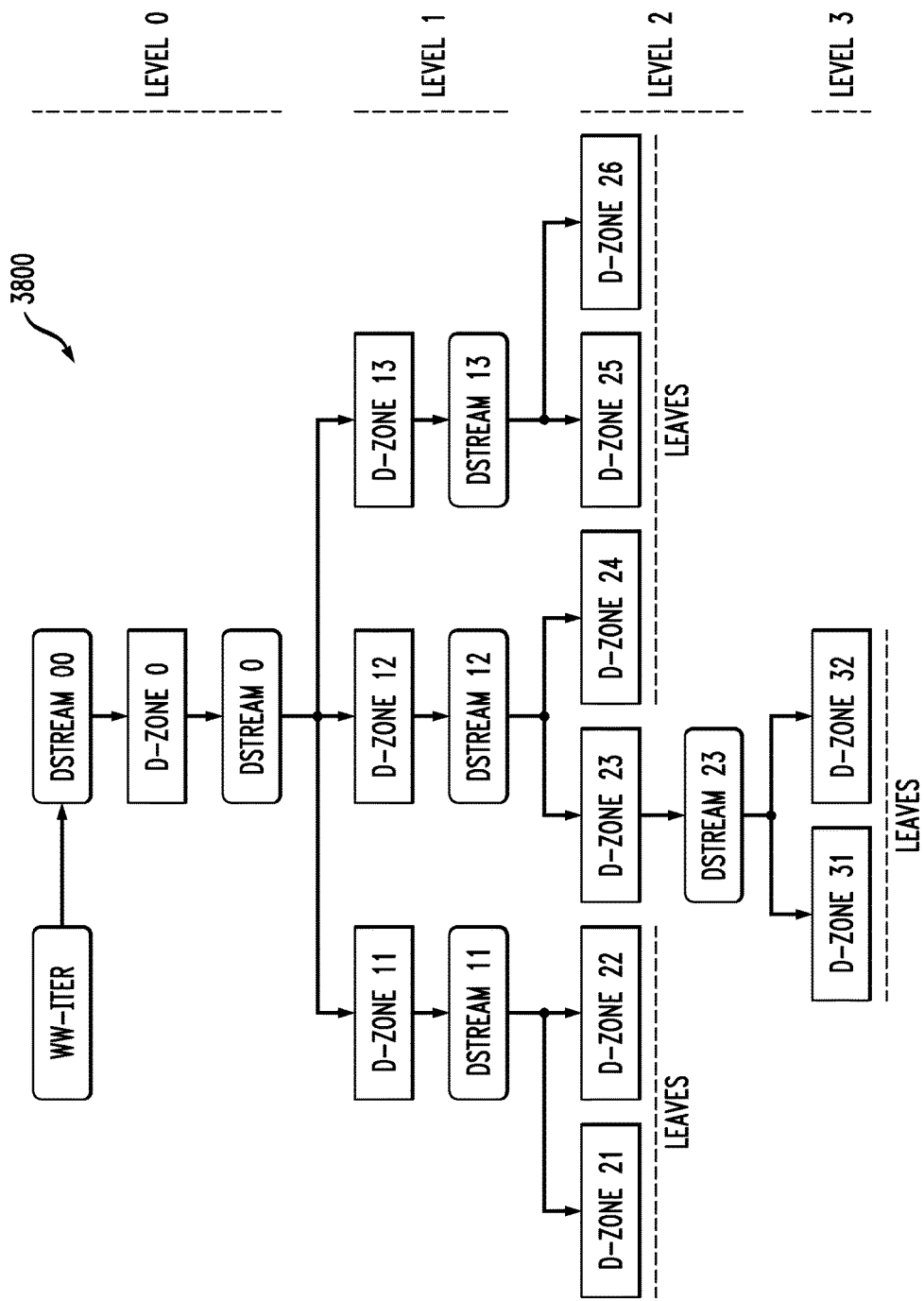

FIG. 38 illustrates implementation of a Spark iterative application in a global computation graph 3800 that has a structure corresponding generally to the previously-described global computation graph 2100. In this embodiment, the global computation graph 3800 comprises a plurality of nodes corresponding to respective ones of the data processing clusters. The plurality of nodes are arranged in multiple levels each including at least one of the nodes.

In a typical Spark batch computation, a user initiates a computation that causes allocation of resources for that computation, execution of the computation and de-allocation of the resources. The Spark RDDs utilized in the computation are generally built in main memory of a processing device and consequently there is overhead associated with moving data from secondary storage into main memory to create the RDDs used in the computation. The result of a Spark computation can in some cases trigger other Spark computations each of which may in turn trigger other Spark computations and so on. One typical example is the execution of a while loop where, after each computation, a test is performed to decide whether another round of computation, also referred to as iteration, should be done.

When Spark batch mode is used for an iterative computation, the allocation and de-allocation of resources happens at every iteration, not only adding substantial overhead for allocating and de-allocating resources, but also losing the entire context of the previous computations that could be leveraged in the next iteration, such as values that have been stored in cache and other variables.

In Spark iterative mode, Spark allocates resources when the computation starts, executes all iterations, and de-allocates the resources only when the last iteration completes.

Illustrative embodiments herein extend the above-described WW-DataStream framework to support Spark iterative modes of computation. For example, some embodiments extend Spark iterative computing to allow users to iteratively control the execution of a worldwide scale set of distributed streaming computations. Users illustratively interact with a single WW-Spark iterative application and that application propagates and triggers distributed actions, potentially geographically distributed across the world. Users have the perception that they are interacting with only the single WW-Spark iterative application and they are hidden away from the implementation details and the complexity of orchestrating the execution of parts of the computation across a distributed multi-cluster environment.

In some embodiments, a WW-Spark iterative mode of operation is built on top of a WW-Spark streaming application. In an embodiment of this type, the WW-Spark iterative mode is itself implemented as a WW-Spark streaming application, layered over and distributed across the same WW-SCG utilized for the distributed streaming computations. As the computation is distributed across all of the nodes, a data stream is created at each node in the WW-SCG and this data stream will then be used to become the input data stream for a Spark streaming application at the next level.

As illustrated in FIG. 38, data streams are created and chained together following the same flow as the control flow of the WW-SCG. More particularly, the data streams become the communication mechanism to trigger the flow of execution of the iterations across all nodes in the graph 3800. The WW-Spark streaming application in this embodiment is more particularly referred to as a World Wide Iterative ("WW-Iter") application that as illustrated controls the generation of the data streams in the graph 3800.

Figure 39:
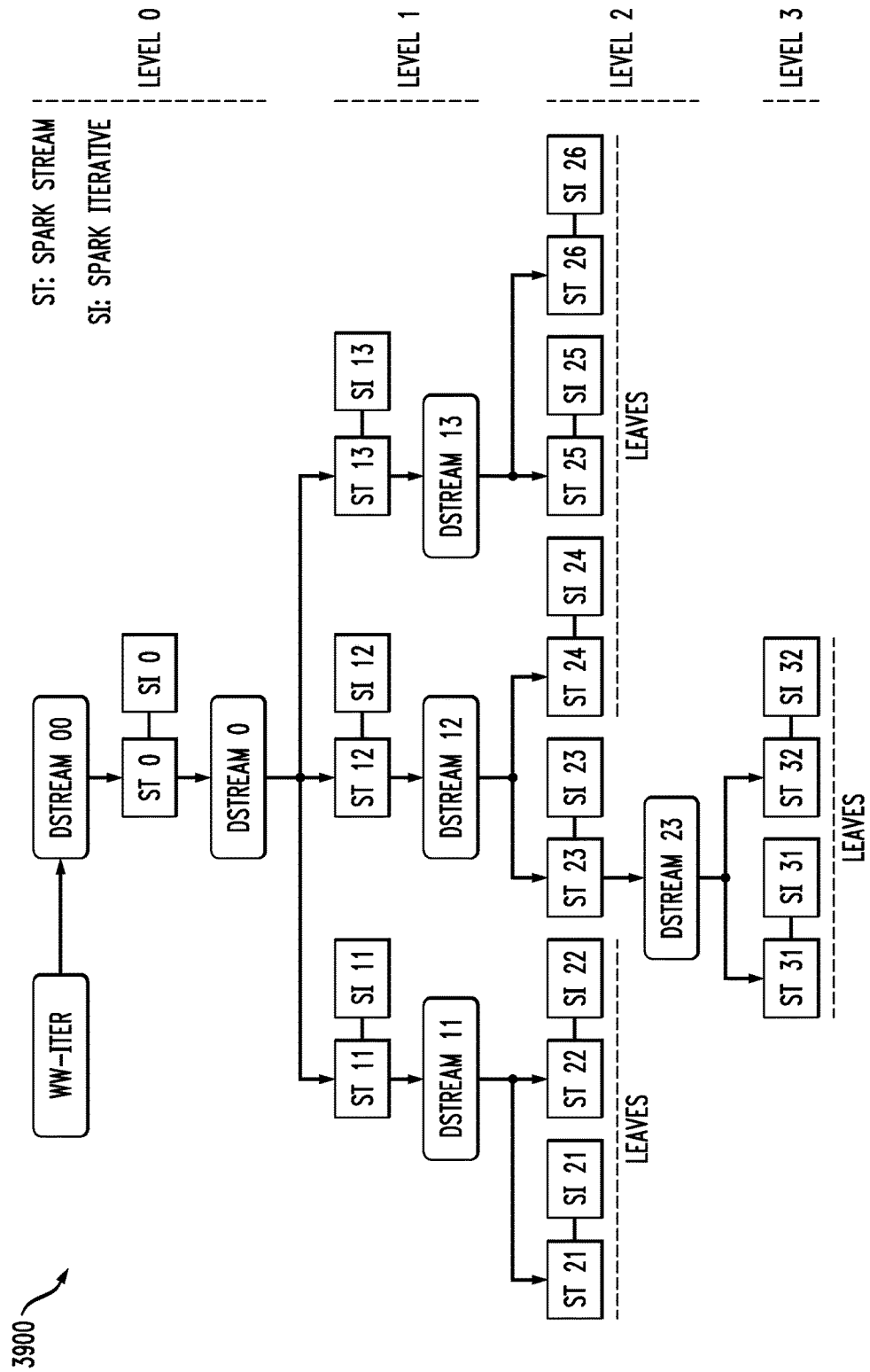

FIG. 39 shows a more detailed view of a global computation graph 3900 for use in implementing a Spark iterative application WW-Iter. In this embodiment, each of the nodes of the graph 3900 comprises both a local Spark streaming application instance ("ST") and a local Spark iterative application instance ("SI").

In such an embodiment, the local Spark streaming application instance of a given one of the nodes other than a leaf node is configured to receive an input data stream from another one of the nodes at a higher level of the global computation graph, to provide an output data stream as an input data stream to another one of the nodes at a lower level of the global computation graph, and to generate one or more triggers for controlling execution of the local Spark iterative application instance of the given node.

The terms "higher" and "lower" with reference to a global computation graph generally denote proximity to the root node level, which is considered the highest level in the global computation graph. Accordingly, Level 0 in the global computation graph 3900 is considered higher than Level 1, Level 2 and Level 3. Other level relation conventions can be used in other embodiments.

The local Spark iterative application instances are illustratively triggered utilizing control flow that propagates from a root node of the global computation graph 3900 toward leaf nodes of the global computation graph 3900 via one or more intermediate nodes of the global computation graph 3900. As indicated previously, the control flow illustratively comprises data streams generated by respective ones of the nodes.

A given one of the local Spark streaming application instances in a corresponding node at a particular level of the global computation graph 3900 other than a root node level is more particularly configured to receive data from a data stream generated at a node in the level above the particular level, and to pass the data to a data stream that will be the input for a node in the level below the particular level, unless the given node is a leaf node in which case the streaming ends at that node. The given local Spark streaming application instance also passes the trigger to the local Spark iterative application on its corresponding node so that the next iteration can be executed. The local Spark iterative application instance executes each of the required local iterations, and receives commands to perform respective ones of the iterations through local Spark streaming code provided as part of the input data stream to the corresponding Spark streaming application instance.

Accordingly, the embodiments illustrated in FIGS. 38 and 39 implement the WW-Iter application as a WW-Spark streaming application in which data streams are created from the root node of the global computation graph and propagated from the root node to the leaf nodes through the global computation graph. The data streams provide a control flow that passes parameters through the global computation graph and triggers the performance of iterative operations at each of the nodes of the graph. The full context of a previous iteration is preserved until the full computation ends.

Figure 40:
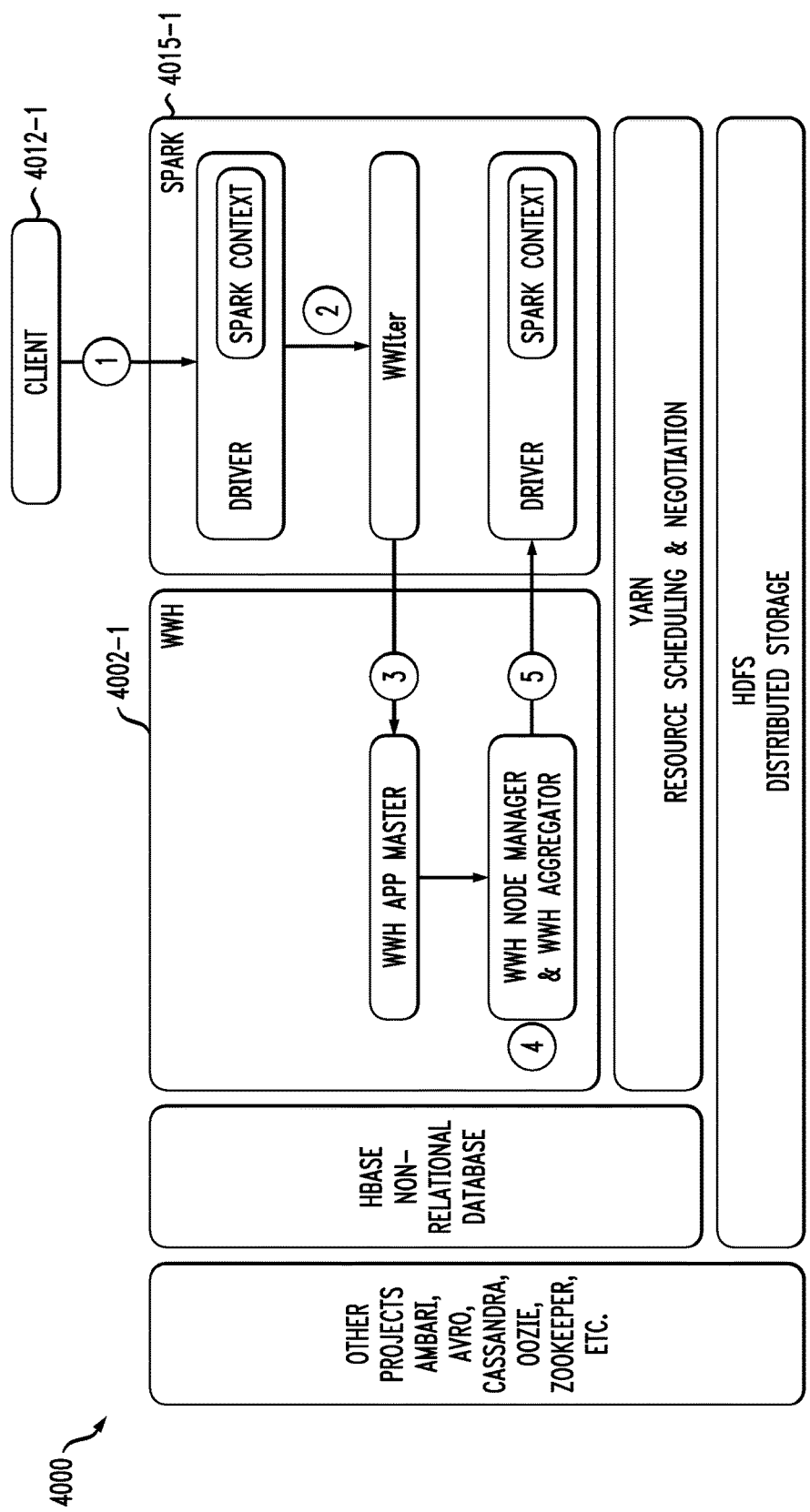

FIG. 40 shows an information processing system 4000 comprising a WWH component 4002-1, a client 4012-1 and a Spark component 4015-1. The WWH component 4002-1 and Spark component 4015-1 are assumed to be implemented on a single data processing cluster associated with a particular data zone.

The WWH component 4002-1 may comprise at least a portion of one or more WWH nodes of a WWH platform of the type previously described. Additionally or alternatively, it may comprise at least portions of one or more distributed data processing clusters. The WWH component 4002-1 includes a WWH application master, as well as a WWH cluster node manager and WWH aggregator. The WWH component 4002-1 is configured to interact with the Spark component 4015-1.

The Spark component 4015-1 communicates with the client 4012-1 over one or more networks. The Spark component 4015-1 comprises multiple Spark driver programs each providing Spark context support.

The diagram of FIG. 40 also illustrates a number of processing operations performed within the system 4000. The operations are labeled 1 through 5 in the figure, and more specifically include the following:

1. Client 4012-1 communicates with the Spark component 4015-1 to implement a Spark streaming application in iterative mode.
2. A first Spark driver program of the Spark component 4015-1 starts a WW-Iter application.
3. The WW-Iter application communicates with the WWH application master of the WWH component 4002-1.
4. The WWH application master of the WWH component 4002-1 communicates with the WWH node manager and WWH aggregator of the WWH component 4002-1.
5. The WWH node manager and WWH aggregator of the WWH component 4002-1 communicates with a second Spark driver program of the Spark component 4015-1.

These particular operations and others referred to herein are presented by way of illustrative example only and can be varied in other embodiments.

In the FIG. 40 embodiment, client 4012-1 starting a WW-Spark application causes the WW-Iter application to generated. The WW-Iter application is itself a Spark streaming application that causes data streams to be generated at nodes of a WW-SCG in the manner previously described in conjunction with FIGS. 38 and 39.

Additional or alternative Spark modes can be supported in other embodiments. For example, in one or more other embodiments, the distributed data streaming computations comprise Spark streaming computations of a Spark interactive application. A given Spark interactive application may comprise an extension of a Spark iterative application. The Spark interactive application in some embodiments is configured to support user-controlled triggering of local Spark interactive application instances at respective ones of the nodes via a command-line interface. Each execution triggered by a user may cause a different computation from the previous one to be executed. This is in contrast to the Spark iterative mode in which each iteration generally executes the same code and therefore can benefit from the same context and from the same allocation of resources.

Such arrangements allow users to interactively control the execution of distributed computations on a world wide scale. For example, users can interact with a single Spark interactive application and that application propagates and triggers distributed actions, potentially geographically distributed across the world. The users have the perception that they are interacting with a single WW-Spark application and they are hidden away from the implementation details and the complexity of orchestrating the execution of parts of the computation across a distributed multi-cluster environment.

Embodiments implementing Spark streaming, iterative or interactive functionality can leverage the above-described WWH catalog to reference, address and locate appropriate entities for participation in a given distributed computation arrangement. For example, the WWH catalog can be used to determine the particular individual clusters and associated data zones that will be part of a WW-SCG for distributed streaming computations as well as the specific data sources that will be used in the computations. Leveraging the WWH catalog not only facilitates the use of high-level abstractions such as WW-DataStream but also hides away from a user the specific locations of the individual data streams and their respective data sources, thereby adding additional security.

As noted above, local and global data structures in illustrative embodiments are advantageously configured to support data heterogeneity and data diversity. Such arrangements expand the range of data streams that can be included in a given distributed computation as it relaxes any constraints that might otherwise be associated with requiring that all data zones agree on the format of the data streams or on the uniformity of the data streams before a computation is actually performed.

With regard to data heterogeneity, each of the data streams of a WW-DataStream can have a different format. Each data stream can therefore comprise data that differs from the data of the other data streams.

With regard to data diversity, each of the data streams of a WW-DataStream can be created from a different data source than the other data streams, can be analyzed independently of the other data streams, and can be analyzed in parallel with the other data streams.

An example of a Spark streaming application that can be implemented using a WW-DataStream framework includes an IoT application in which data sources comprising sensors at the edge of a network generate respective data streams that need to be analyzed as close as possible to those respective data sources, possibly due to bandwidth constraints, regulatory compliance or other factors.

An example of a Spark iterative application that can be implemented using a WW-DataStream framework includes an application for training a machine learning model where at each iteration a cost function or quality function is evaluated in order to determine if the model needs further refinement.

An example of a Spark interactive application that can be implemented using a WW-DataStream framework includes an application in which data scientists coordinate training of a deep learning model, where different approaches may be used depending on previous results, and a given user interacts with the system to reconfigure and redesign the code but where the input data streams should remain the same and the entire computation can benefit from preserving the previous results.

The foregoing are only illustrative examples, and numerous other applications can be implemented using the multi-cluster distributed streaming, iterative and interactive modes of operation disclosed herein.

Additional illustrative embodiments to be described below in conjunction with FIGS. 41-57 include multi-cluster distributed data processing platforms configured to implement scalable distributed computations utilizing multiple distinct computational frameworks and/or multiple distinct clouds.

In some embodiments utilizing multiple distinct computational frameworks, distributed computations are initiated across a plurality of data processing clusters associated with respective data zones, and local processing results of the distributed computations from respective ones of the data processing clusters are combined. Each of the data processing clusters is configured to process data from a data source of the corresponding data zone using a local data structure and an associated computational framework of that data processing cluster, with a first one of data processing clusters utilizing a first local data structure configured to support a first computational framework, and at least a second one of the data processing clusters utilizing a second local data structure different than the first local data structure and configured to support a second computational framework different than the first computational framework. The local processing results of the distributed computations from respective ones of the data processing clusters are combined utilizing a global data structure configured based at least in part on the local data structures in order to produce global processing results of the distributed computations.

Figure 41:
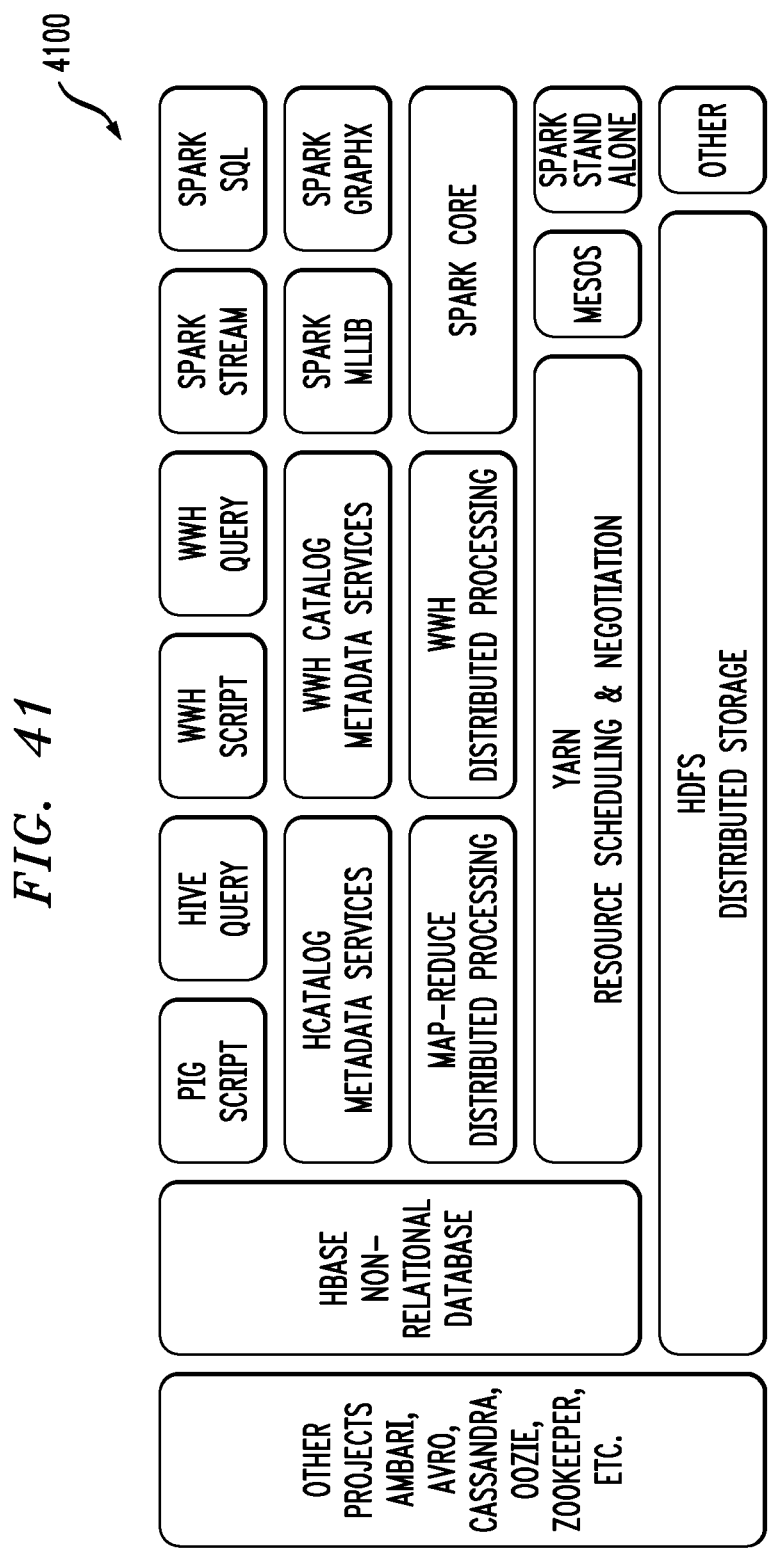
FIGS. 41-57 show illustrative embodiments of multi-cluster distributed data processing platforms configured to implement scalable distributed computations utilizing multiple distinct computational frameworks and/or multiple distinct clouds.

FIG. 41 is a stack diagram showing relationships between components of an information processing system 4100 with scalable distributed computation functionality using multiple distinct frameworks in an illustrative embodiment. This diagram is similar to the stack architecture previously described in conjunction with FIG. 10, but the Spark Core component now includes support for distributed Spark streaming functionality of the type described in conjunction with FIGS. 16 through 40 in addition to the Spark batch mode extensions Spark SQL, Spark MLlib and Spark GraphX.

For example, a given multiple framework embodiment can be configured in which the first computational framework comprises a MapReduce framework and the second computational framework comprises a Spark framework. The Spark framework in such an embodiment may comprise one of a Spark batch framework and a Spark streaming framework.

As another example, a given multiple framework embodiment can be configured such that at least one of the data processing clusters is configured in accordance with a Spark batch framework and one or more other ones of the data processing clusters are configured in accordance with a Spark streaming framework. In an embodiment of this type, the Spark batch framework illustratively implements one or more batch mode extensions comprising at least one of a Spark SQL extension, a Spark MLlib extension and a Spark GraphX extension, and the Spark streaming framework may be configured to support at least one of Spark iterative processing and Spark interactive processing.

These and other multi-framework embodiments utilize global data structures that are based on distributed "data lots," where a given data lot can comprise a data stream, a data set, a table or any other designated grouping or collection of data, without regard to how the data is represented. For example, a data lot can include a table, structured or unstructured data in a file, a graph in a graph database, or any other representation or abstraction.

A given multi-framework embodiment is illustratively configured to apply multiple distinct computational frameworks to different data lots in different processing clusters associated with respective data zones. Such an embodiment applies to each data lot in a given distributed computation arrangement the particular computational framework that is best suited to analysis of that data lot. The applied computational frameworks illustratively include MapReduce frameworks, Spark batch frameworks and Spark non-batch frameworks, although numerous additional or alternative computational frameworks may be used.

Like the data streams previously described herein in conjunction with FIGS. 16-40, data lots can be separated into batches for processing. For example, data lots can be separated into lot batches based on criteria such as the size or number of bytes of each lot batch, time-stamps or other information indicating time of generation or time of receipt within a particular range, and common properties shared by members of a lot batch such relating to a particular geographic location. Numerous additional or alternative criteria as well as combinations thereof can be used to delineate lot batches.

A data lot need not be divided into sequential lot batches. Accordingly, a lot batch can be given by the union of several different non-sequential parts of a data lot.

Global data structures utilized to represent data lots in illustrative embodiments include World Wide Data Lot ("WW-DataLot"), World Wide Lot Batch ("WW-LotBatch") and World Wide Result Lot ("WW-ResultLot"). These global data structures are configured in manner similar to the respective WW-DataStream, WW-DataBatch and WW-ResultBatch global data structures previously described herein in the context of data streams, and are assumed to implement substantially the same properties and functionality but in the more general context of data lots rather than data streams. For example, the WW-DataLot, WW-LotBatch and WW-ResultLot global data structures exhibit the properties of approximate synchronization and eventual synchronization previously described herein.

Additional global data structures utilized in these embodiments include a World Wide Lot Stream ("WW-LotStream") which comprises a stream of data, where the individual components of data that form the stream are data lots themselves. The WW-LotStream also exhibits the properties and functionality of the WW-DataStream previously described herein. For example, the data lots being processed in a given cluster associated with a corresponding data zone may be viewed as comprising a lot stream that is partitioned into lot batches generating result lots that can be lot streams themselves.

Illustrative embodiments are additionally configured to provide what is referred to herein as "framework effectiveness," meaning that each of the lot batches is processed independently and in parallel in different clusters associated with respective different data zones, using the particular computational framework that is most appropriate for performing computations using that particular type of lot batch.

The data lots of a WW-DataLot can be mapped into lot batches of a WW-LotBatch in a variety of different ways.

For example, in the case of homogeneous batch data lots, in which all the data lots in the WW-DataLot are batches of the same type, such as a set of files that can be analyzed as a single batch, the data lot at each data zone can be mapped into a lot batch and constitute the unit for computation analysis.

In the case of homogeneous stream data lots, in which all the data lots in the WW-DataLot are data streams of the same type, such as streams of data coming from IoT sensors, and each data stream can be split into multiple individual data batches, each data batch can be mapped into a lot batch and constitute the unit for computation analysis.

In the case of heterogeneous batch data lots, in which all the data lots in the WW-DataLot are batches but data from different data sources can be represented differently, such as a data zone that has a set of files that can be analyzed as a single batch, while another data zone has a set of tables, while another has a set of graphs, the data lot at each data zone can be mapped into a lot batch and constitute the unit for computation analysis, even though the lot batches will be fundamentally different at each data zone.

In the case of heterogeneous stream data lots, in which all the data lots in the WW-DataLot are data streams but data from different data sources can be represented differently, such as a data zone that has a data stream of temperature measures in Celsius sampled at every 500 milliseconds, while another data zone has a data stream of air pressure measures, while another has a data stream of temperature measures in Fahrenheit measured at every second, the data lot at each data zone can be mapped different into a lot batch and constitute the unit for computation analysis, even though the lot batches will be fundamentally different at each data zone. For example, the data zone that measures temperature at every 500 milliseconds can be configured to map two samples into a single lot batch.

In the case of heterogeneous batch data lots and stream data lots, in which the data lots in the WW-DataLot are either a batch or a data stream, and data from different data sources can be represented differently, such as a data zone has a data stream of temperature measures in Celsius sampled at every 500 milliseconds, while another data zone has a data stream of air pressure measures, while another has a stream of temperature measures in Fahrenheit measured at every second, while another data zone may have historical temperatures for the past ten years for the same region being measured now in real-time and stored in tables, while yet another data zone may have historical pressure data for the same geographical regions being measured now and stored in a semi-structured set of files. In this case, the data lot at each data zone can be mapped differently into a lot batch and constitute the unit for computation analysis, even though the lot batches will be fundamentally different at each data zone. For example, the goal may be to compare and contrast the standard deviation of the historical and the current temperatures and the air pressure over a period of five minutes. In such a situation, the lot batch at the locations receiving streams will be of a duration of five minutes, where the values are collected locally and a standard deviation calculated locally, while the location that has a table may need to be triggered at every five minutes or may run in a Spark iterative mode, where at every five minutes it does a batch calculation looking at the standard deviation for those five minutes for each of the previous 20 years, by mapping into a lot batch only the entries in the table corresponding to the specific geographic region and to the specific time frame.

Figure 42:
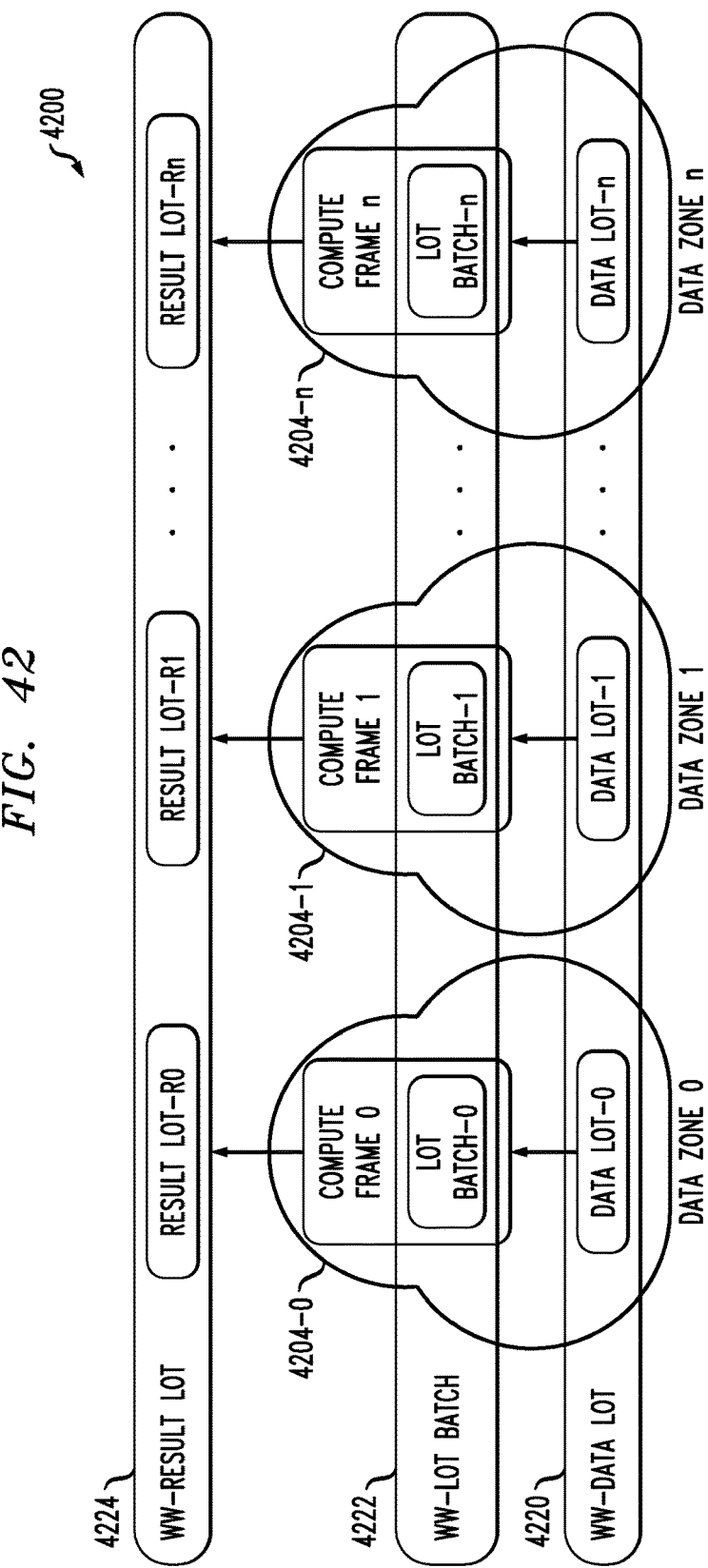

FIG. 42 illustrates one example of a multi-cloud arrangement for distributed computations using multiple computational frameworks. In this particular embodiment, distributed computation functionality is implemented in an information processing system 4200 using multiple distinct clusters corresponding to respective clouds 4204-0, 4204-1, . . . 4204-$n$ of respective different data zones denoted Data Zone 0, Data Zone 1, . . . Data Zone n.

The clouds 4204 may be of the same type or of different types. For example, some embodiments may include a mixture of multiple distinct clouds 4204 of different types, such as an Amazon Web Services cloud, a Microsoft Azure cloud and an on-premises cloud that illustratively comprises a virtual machine based cloud. One or more of the clouds 4204 may be implemented using a corresponding Cloud Foundry platform and local Big Data cluster, although numerous other arrangements are possible.

Each of the clouds 4204 in this embodiment is assumed to comprise a corresponding YARN cluster that includes a computational framework component as illustrated. The computational framework components manage respective lot batches denoted Lot Batch-0, Lot Batch-1, . . . Lot Batch-n within their respective YARN clusters. These lot batches are associated with a common WW-LotBatch global data structure and generated from underlying distributed data lots denoted Data Lot-0, Data Lot-1$i$, . . . Data Lot-n, each commonly associated with a WW-DataLot global data structure. Results of computations performed in the respective clusters are provided as result lots denoted Result Lot-R0, Result Lot-R1, . . . Result Lot-Rn within a WW-ResultLot global data structure.

As indicated above, the data lots in a given embodiment may comprise any of a wide variety of different types of structured and unstructured data, including relational database tables, text documentation, pictures, video, device data, log files, genomic sequences, weather readings, social data feeds and many others.

The information processing system 4200 provides an illustrative implementation of multiple-framework distributed computation. Such an arrangement allows computations to be performed in a distributed manner utilizing multiple computational frameworks across multiple clusters associated with different data zones. The multiple frameworks utilize the above-noted global data structures including WW-DataLot, WW-LotBatch and WW-ResultLot that are associated with respective input data level 4220, computational framework level 4222 and data output level 4224 in this embodiment.

The distributed computations in this embodiment are performed as close as possible to their respective data lot sources in the corresponding portions of the input data level 4220 of the respective clouds 4204. Results of the computations from the computation level 4222 are surfaced to the data output level 4224 while the corresponding data remains within the respective data zones of the clouds 4204.

The individual member data lots of the WW-DataLot may be geographically distributed relative to one another. Each data lot and its associated computations can benefit from the advantages of data locality in that the data lot is created and analyzed as close as possible to its corresponding data source.

The system 4200 illustratively exposes a data scientist or other user to an abstraction of a wwDataLot, also referred to herein as a wwLot, comprising a set of lots $lot_i$ and represented as wwLot=$\{lot_1, lot_2, \ldots, lot_m\}$. The terms wwDataLot and wwLot are used interchangeably herein, and may be viewed as examples of the global data stream data structures also referred to herein as WW-DataLot.

In the context of a wwDataLot, the lots do not need to exist in a single central location and can be scattered around several other locations.

Consider by way of example a set of lots DataLotSet, represented as DataLotSet=$\{lotInSet_0, lotInSet_1, \ldots, lotInSet_n\}$. A wwDataLot is said to be derived from DataLotSet, represented as wwDataLot=$\delta$(DataLotSet), when each lot in the wwDataLot is a subset of a lot in one of the lots in DataLotSet. More formally, $\forall lot_i \in$wwDataLot, where $1 \leq i \leq m$, $\exists lotInSet_j \in$DataLotSet, such that $lot_i \subseteq lotInSet_j$. The elements in wwDataLot need not comprise a unique set and need not include all of the elements in DataLotSet. Accordingly, the elements in wwDataLot need only be a subset of the elements in DataLotSet.

In some embodiments, the same abstraction of a wwDataLot may be given both input and output data lots, illustratively using wwDataLot$^{Input}$ to refer to the input data lots and wwDataLot$^{Output}$ to refer to the output data lots.

Multiple framework embodiments disclosed herein utilize a global computational graph similar to that represented by the WW-SCG global data structure described previously but extended to accommodate data lots. The global computational graph in the case of data lots will also be referred to as WW-SCG for clarity and simplicity of description and is assumed to exhibit the properties and functionality previously described in conjunction with the distributed streaming embodiments of FIGS. 16-40. For example, naming conventions similar to those previously described in conjunction with FIGS. 24-26 can be adapted in a straightforward manner for use with data lots. Accordingly, the illustrative embodiment of FIG. 25 can be readily adapted for performing distributed computations using data lots and lot streams rather than data streams and batch streams.

Figure 43:
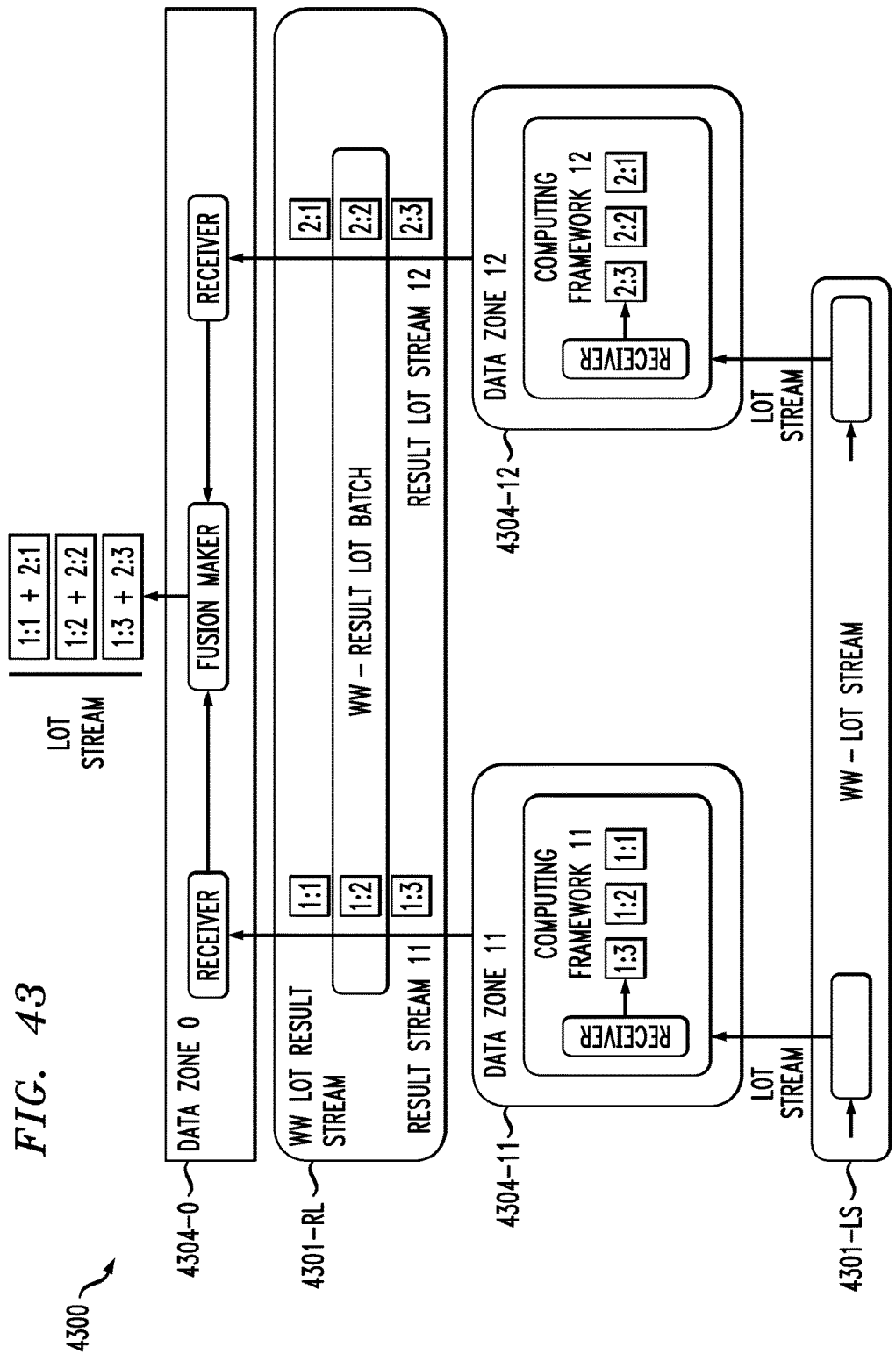

With reference now to FIG. 43, an information processing system 4300 is illustratively configured to process lot streams in a manner analogous to the processing of data streams in system 2600 of FIG. 26. The system 4300 comprises data processing clusters 4304-0, 4304-11 and 4304-12 associated with respective data zones denoted Data Zone 0, Data Zone 11 and Data Zone 12. The system 4300 performs distributed computations utilizing multiple computational frameworks in accordance with global data structures including a WW-LotStream 4301-LS and a WW-ResultLot 4301-RL. Other global data structures utilized in this embodiment but not explicitly illustrated are assumed to include a WW-LotBatch and a WW-SCG.

As shown in the figure, a target node corresponding to cluster 4304-0 includes receivers that receive result lots from source nodes corresponding to respective clusters 4304-11 and 4304-12. A fusion maker module of cluster 4304-0 concatenates or otherwise combines several result lots into one lot stream.

Illustrative embodiments utilize different computational frameworks in different ones of the clusters. For example, in the FIG. 43 embodiment, clusters 4304-11 and 4304-12 utilize respective distinct computational frameworks denoted Computing Framework 11 and Computing Framework 12. These computational frameworks are applied in implementing parallel and distributed computation for respective different lot streams of the WW-LotStream within the system 4300.

Figure 44:
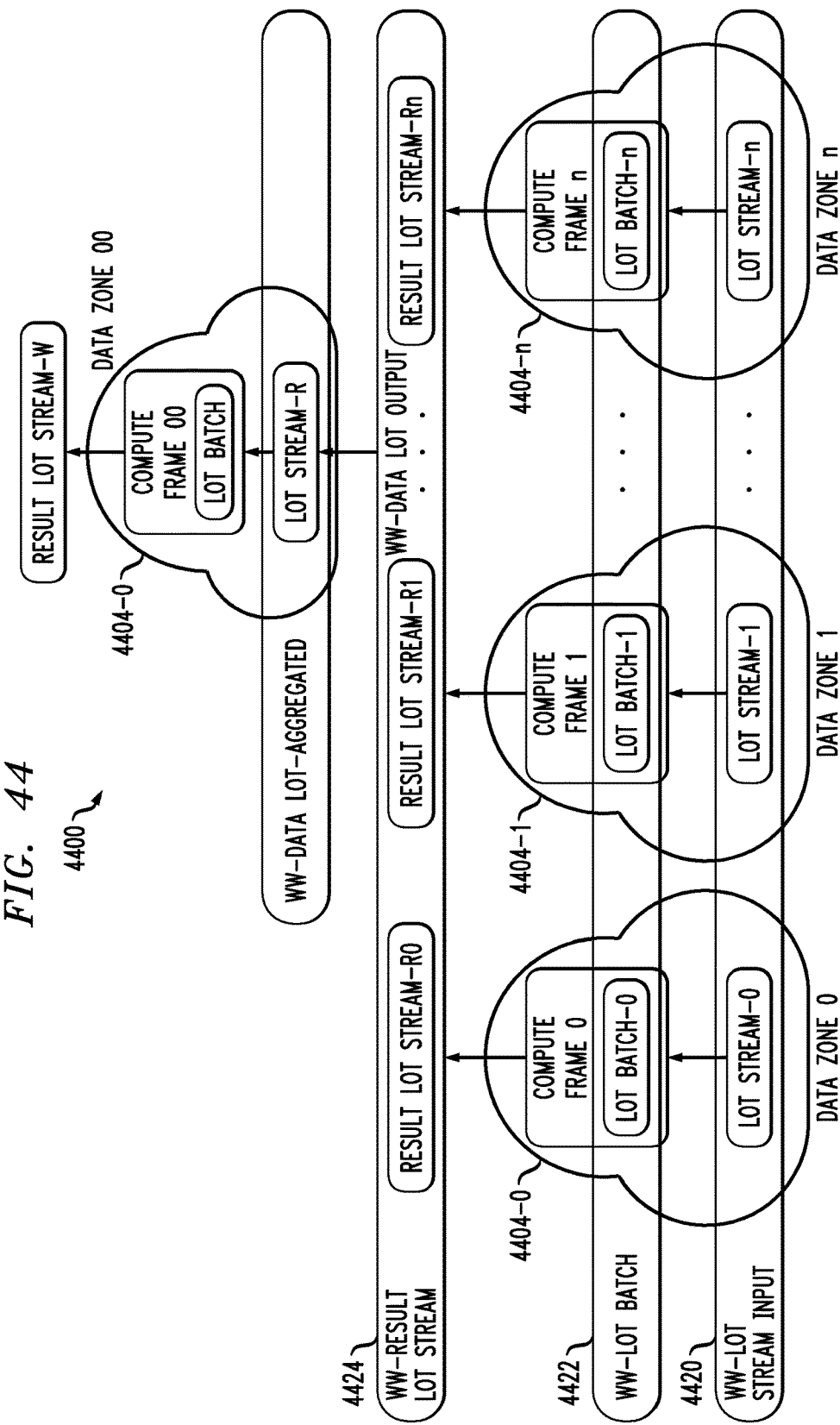

FIG. 44 shows another example of an information processing system 4400 configured with such a WW-LotStream framework. In this embodiment, system 4400 comprises multiple clouds 4404-0, 4404-1, . . . 4404-*n*, each assumed to correspond to a separate YARN cluster. Cloud 4404-0 includes a computational framework component. An application initiated on cloud 4404-0 utilizes the computational framework of that cloud and associated distributed computations are performed using lot streams locally accessible to respective clouds 4404-0 through 4404-*n* at a data input level 4420. The system 4400 includes a computational framework level 4422, and a data output level 4424. Results of the distributed computations performed using the lot streams of the data input level 4420 are surfaced via the data output level 4424 back to the computational framework component of the initiating cloud 4404-0. These results are further processed in the computational framework component in order to provide an appropriate output result lot stream ("Result Lot Stream-W") back to the requesting client.

The data input level 4420, computational framework level 4422 and data output level 4424 correspond to respective WW-LotStream, WW-LotBatch and WW-ResultLot global data structures in this embodiment. These and other related global data structures such as WW-SCG collectively provide an exemplary WW-LotStream framework.

The illustrative embodiment of FIG. 44 is particularly configured for distribution of computations using multiple distinct computational frameworks in different ones of the clouds 4404 and their respective data zones. The distribution of computations can be across any geographic territory, from clusters located in the same data center to clusters distributed across the world. The distribution can be done across physical domains, such as different physical hardware clusters, or across logical or virtual entities, such as two micro-segments defined by a virtual network framework.

These illustrative embodiments execute portions of distributed computations on each of the lot streams in a given WW-LotStream framework instance, and aggregate the results from the individual lot streams into a global computation result. As noted above, the WW-LotStream framework allows for the independent and parallel execution of distributed computations on each of the lot streams in the same or different clusters. Such arrangements ensure that the distributed computations are performed as close as possible to the corresponding lot streams without violating data access or movement restrictions of any data zone.

The WW-LotStream framework in the embodiment of FIG. 44 is highly flexible and allows computation code to be written in any language that supports the Spark Core API, including JAVA, R, Python and Scala.

The WW-LotStream framework in some embodiments is configured to leverage a WWH catalog service to determine the particular clusters to be involved in a given set of distributed computations. This also involves locating the needed data sources for each of the associated lot streams.

The WW-LotStream framework in some embodiments is configured to manage the distribution of computations across disparate data processing clusters of a WWH platform, including choosing the appropriate data processing clusters and managing the various data processing requirements and data governance involved when aggregating computation results derived from separate, dispersed lot streams.

The WW-LotStream framework in some embodiments allows computations to be distributed in a recursive fashion that is transparent to an originating client or other user.

In these and other embodiments, the distributed computations may be performed utilizing multiple instances of local code running on respective nodes within respective ones of the data processing clusters and at least one instance of global code running on an initiating node within or otherwise associated with a particular one of the data processing clusters. The global code receives respective results from the multiple instances of the local code running on the respective nodes within the respective ones of the data processing clusters and aggregates those results. An application running on a client device or on a given cluster node may provide one or more of the local code, the global code and a list of data resources to a distributed processing application master of a WWH component. The list of data resources illustratively identifies particular lot streams against which one or more of the local code and the global code are to be executed.

Figure 45:
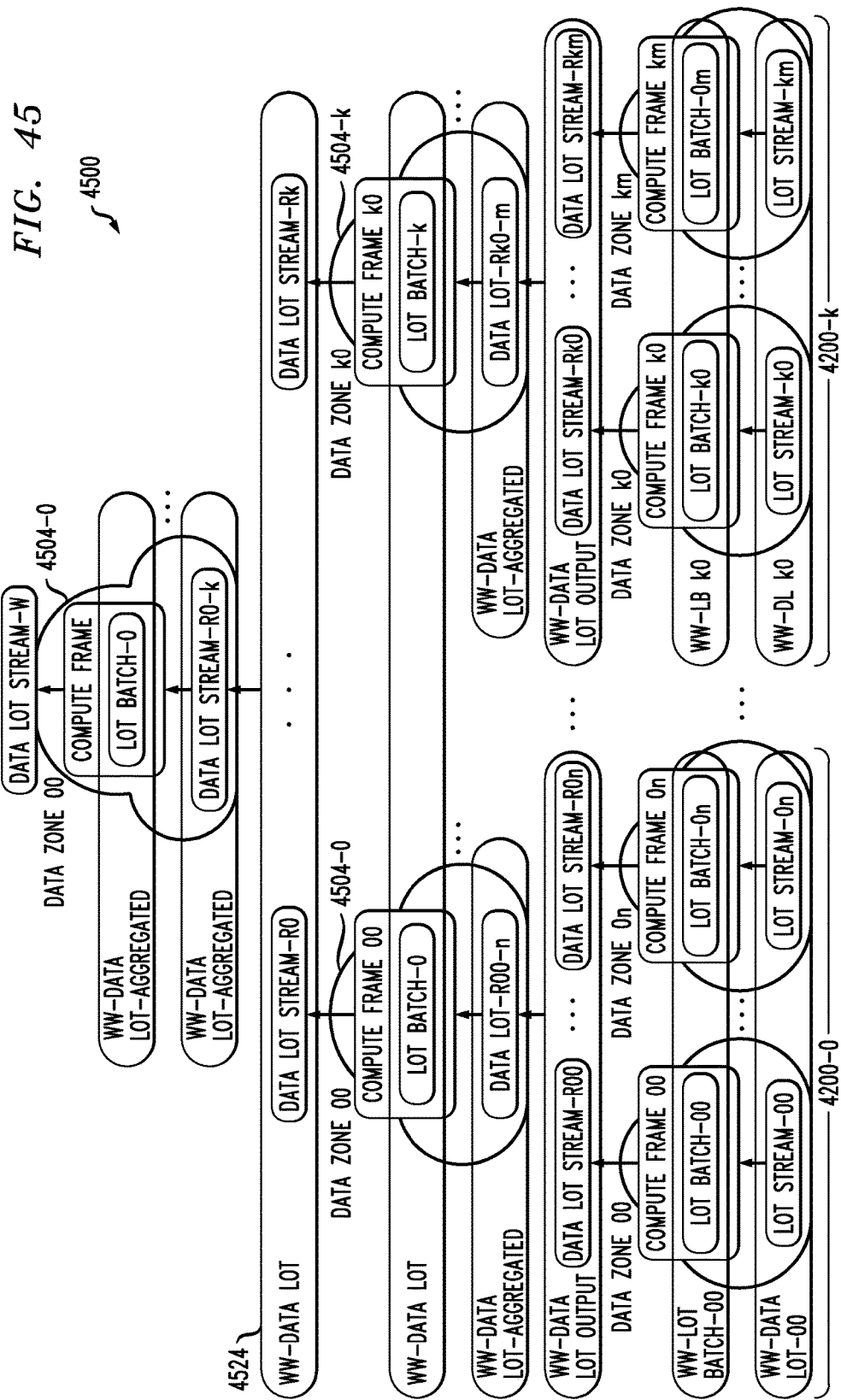

FIG. 45 illustrates an information processing system 4500 in which multiple WW-LotStream frameworks of the type shown in FIG. 44 are combined in order to support recursiveness in distributed computations. The system 4500 comprises multiple instances of the system 4200 of FIG. 42, denoted as systems 4200-0 through 4200-*k*. The data output level of each of the systems 4200-0 through 4200-*k* is associated with a different one of a plurality of additional clouds 4504-0 through 4504-*k*. Each of these additional clouds 4504 is assumed to comprise an additional YARN cluster of the system 4500. Distributed computation results from the additional clouds 4504 are surfaced through a data output level 4524.

In this embodiment, it is assumed that an initiating application is originated in the cloud 4504-0 and utilizes local lot streams of that local cloud and its underlying instance of the system 4200 as well as remote lot streams of other ones of the clouds 4504 and their respective underlying instances of the system 4200. The cloud 4504-0 aggregates computation results from the data output level 4524 into a global result lot stream ("Data Lot Stream-W") that is made available to the requesting client. The lot streams utilized in generating the global result lot stream remain protected within the data zones of their respective clouds.

Numerous other implementations of recursion in distributed computations can be implemented utilizing WW-LotStream frameworks of the type described in conjunction with the embodiments of FIGS. 42, 44 and 45.

Figure 46:
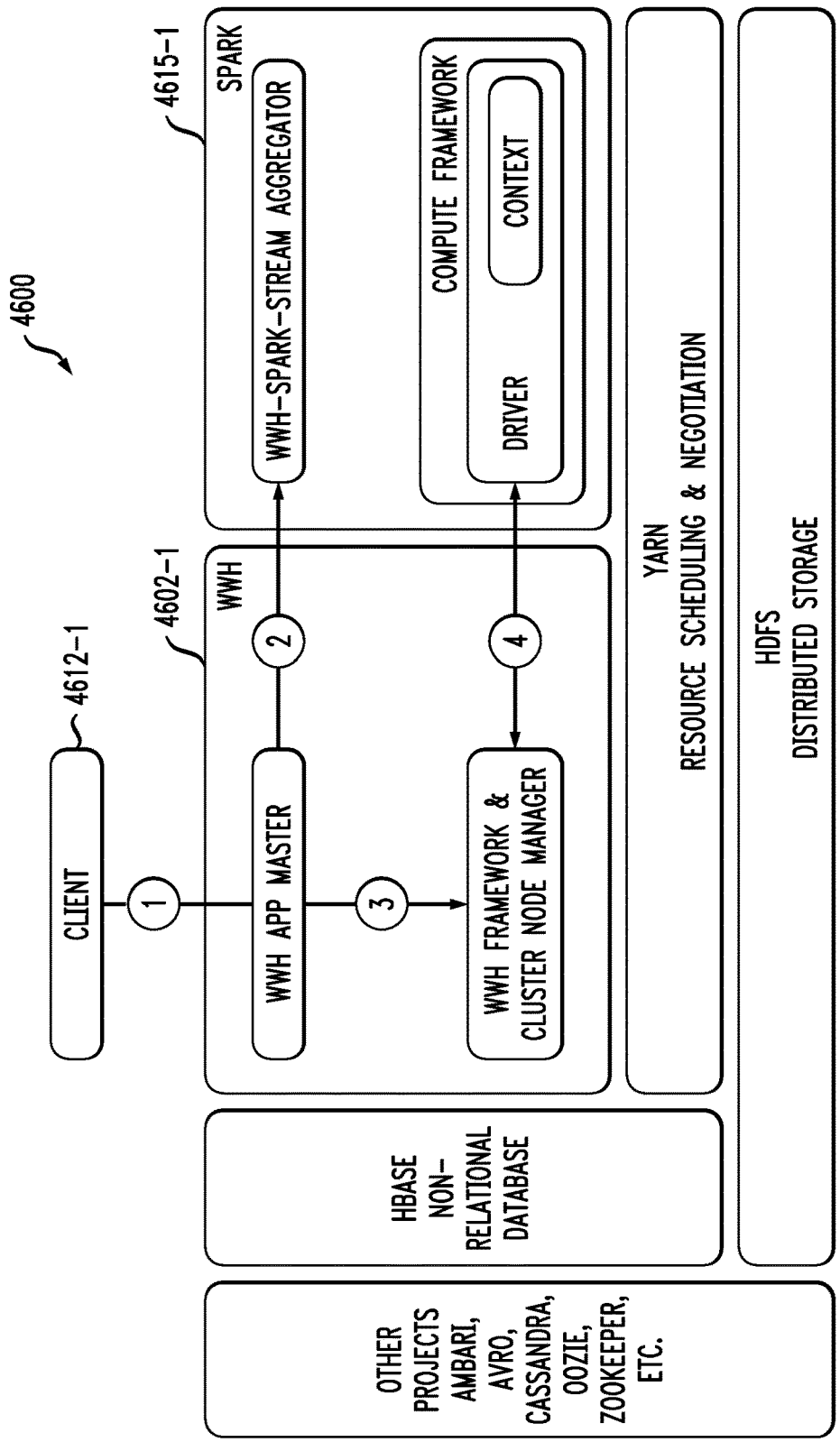

FIG. 46 illustrates another embodiment of an information processing system 4600 with scalable distributed computation functionality. The system 4600 includes a WWH component 4602-1, a client 4612-1 and a Spark component 4615-1. The WWH component 4602-1 and Spark component 4615-1 are assumed to be implemented on a single data processing cluster associated with a particular data zone.

The WWH component 4602-1 may comprise at least a portion of one or more WWH nodes of a WWH platform of the type previously described. Additionally or alternatively, it may comprise at least portions of one or more distributed data processing clusters. The WWH component 4602-1 includes a WWH application master, as well as a WWH framework and cluster node manager. The WWH component 4602-1 communicates with the client 4612-1 over one or more networks.

The WWH component 4602-1 is configured to interact with the Spark component 4615-1. The Spark component 4615-1 comprises a Spark compute framework component that includes a Spark driver program providing Spark context support. The Spark component 4615-1 further comprises a WWH Spark stream aggregator.

The diagram of FIG. 46 also illustrates a number of processing operations performed within the system 4600.

The operations are labeled 1 through 4 in the figure, and more specifically include the following:

1. Client 4612-1 initiates a Spark application involving distributed computations by communicating with WWH application master of WWH component 4602-1.

2. The WWH application master of WWH component 4602-1 communicates with the WWH Spark stream aggregator of the Spark component 4615-1.

3. Within the WWH component 4602-1, the WWH application master communicates with the WWH framework and cluster node manager.

4. The WWH framework and cluster node manager of WWH component 4602-1 interacts with the Spark driver program of the Spark component 4615-1.

The WWH Spark stream aggregator of Spark component 4615-1 in this embodiment receives and aggregates the approximately synchronized result lots generated by the distributed computations. It performs a global computation utilizing those result lots and generates a corresponding lot stream for the global computation that is returned to the client 4612-1.

After starting the WWH Spark stream aggregator, the WWH application master starts the WWH framework and cluster node manager which will then act as a local client to the Spark compute framework component and start the local Spark computation by interacting with the Spark driver. As the local Spark computation generates result lots, those result lots are returned to the WWH framework and cluster node manager which in turn forwards them to the WWH Spark stream aggregator for use in the global computation and generation of the final lot stream to be sent to the client 4612-1.

These particular operations and others referred to herein are presented by way of illustrative example only and can be varied in other embodiments.

Figure 47:
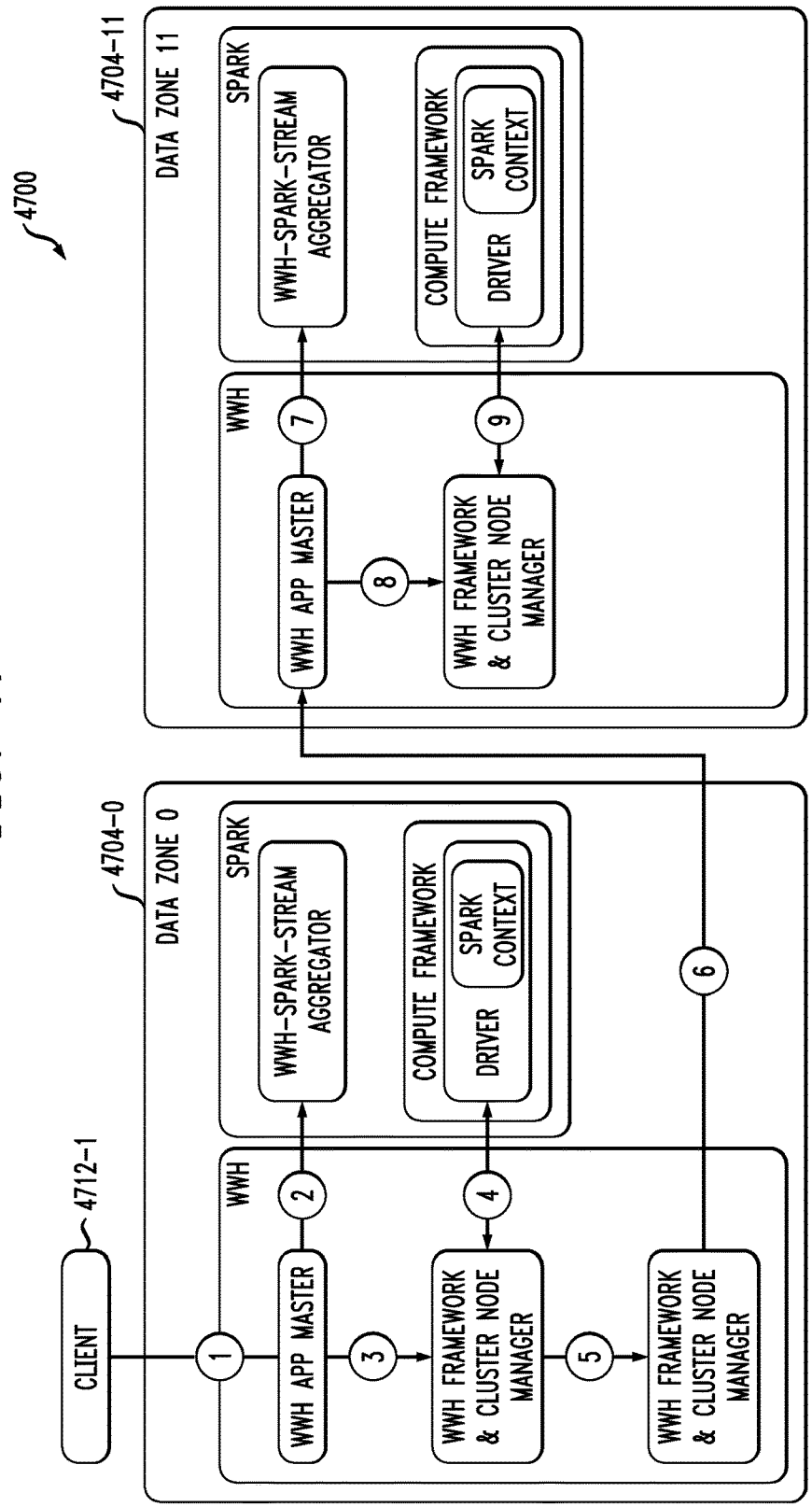

An extension of the single-cluster embodiment of FIG. 46 to multiple clusters is illustrated in information processing system 4700 of FIG. 47. In this embodiment, system 4700 comprises a plurality of distributed data processing clusters 4704-0 and 4704-11 associated with respective data zones denoted Data Zone 0 and Data Zone 11. The system 4700 further comprises a client 4712-1 that is in communication with the cluster 4704-0. The client 4712-1 may be implemented on a separate processing device that is coupled to the cluster 4704-0 via one or more networks that are not explicitly shown. Alternatively, the client 4712-1 can be implemented at least in part on one of the nodes of the cluster 4704-0.

The cluster 4704-0 is designated as a "local" cluster relative to the client 4712-1 in this embodiment and the other cluster 4704-11 is an example of what is also referred to as a "remote" cluster relative to that client.

Each of the clusters 4704-0 and 4704-11 includes WWH and Spark components similar to those previously described in conjunction with the embodiment of FIG. 46.

In the FIG. 47 embodiment, a WW-LotStream distributed streaming computation is done across the multiple clusters 4704-0 and 4704-11 and their respective data zones. Data Zone 0 of cluster 4704-0 is the initiating data zone and Data Zone 11 of cluster 4704-11 is a remote data zone relative to the initiating data zone.

The diagram of FIG. 47 also illustrates a number of processing operations performed within the system 4700. The operations are labeled 1 through 9 in the figure, and more specifically include the following:

1. The client 4712-1 starts a WW-LotStream computation by starting a WWH application master in the cluster 4704-0.

2. The WWH application master in cluster 4704-0 starts a WWH Spark stream aggregator that will receive the result lots from all remote computations, perform a global computation, and then generate the lot stream sent to the client 4712-1.

3. The WWH application master of cluster 4704-0 starts a first WWH framework and cluster node manager within cluster 4704-0. This first WWH framework and cluster node manager becomes the local client for the local computation of the lot stream being generated in corresponding Data Zone 0.

4. The first WWH framework and cluster node manager started by the WWH application master of cluster 4704-0 starts a local Spark application which will in turn generate result lots as the computation is executed. The WWH application master of cluster 4704-0 will send these result lots as they are generated to the WWH Spark stream aggregator of cluster 4704-0.

5. The WWH application master of cluster 4704-0 starts a second WWH framework and cluster node manager within cluster 4704-0. This WWH framework and cluster node manager becomes the remote client for the remote computation of the lot stream being generated in Data Zone 11.

6. The second WWH framework and cluster node manager started by the WWH application master of cluster 4704-0 starts a remote Spark application in Data Zone 11 which will in turn generate result lots as the computation is executed. This involves starting a WWH application master in the cluster 4704-11, illustrating the recursive nature of the process in the present embodiment.

7. The WWH application master in cluster 4704-11 starts a WWH Spark stream aggregator that will receive the local result lots, perform a global computation, and then generate another lot stream that is sent to its requesting client, which is the second WWH framework and cluster node manager of cluster 4704-0.

8. The WWH application master of cluster 4704-11 starts a first WWH framework and cluster node manager within cluster 4704-11. This WWH framework and cluster node manager becomes the local client for the local computation of the lot stream being generated in Data Zone 11.

9. The first WWH framework and cluster node manager started by the WWH application master of cluster 4704-11 starts a local Spark application which will in turn generate result lots as the computation is executed. The WWH application master of cluster 4704-11 will send these result lots as they are generated to the WWH Spark stream aggregator of cluster 4704-11.

Again, these particular operations and others referred to herein are presented by way of illustrative example only and can be varied in other embodiments.

Figure 48:
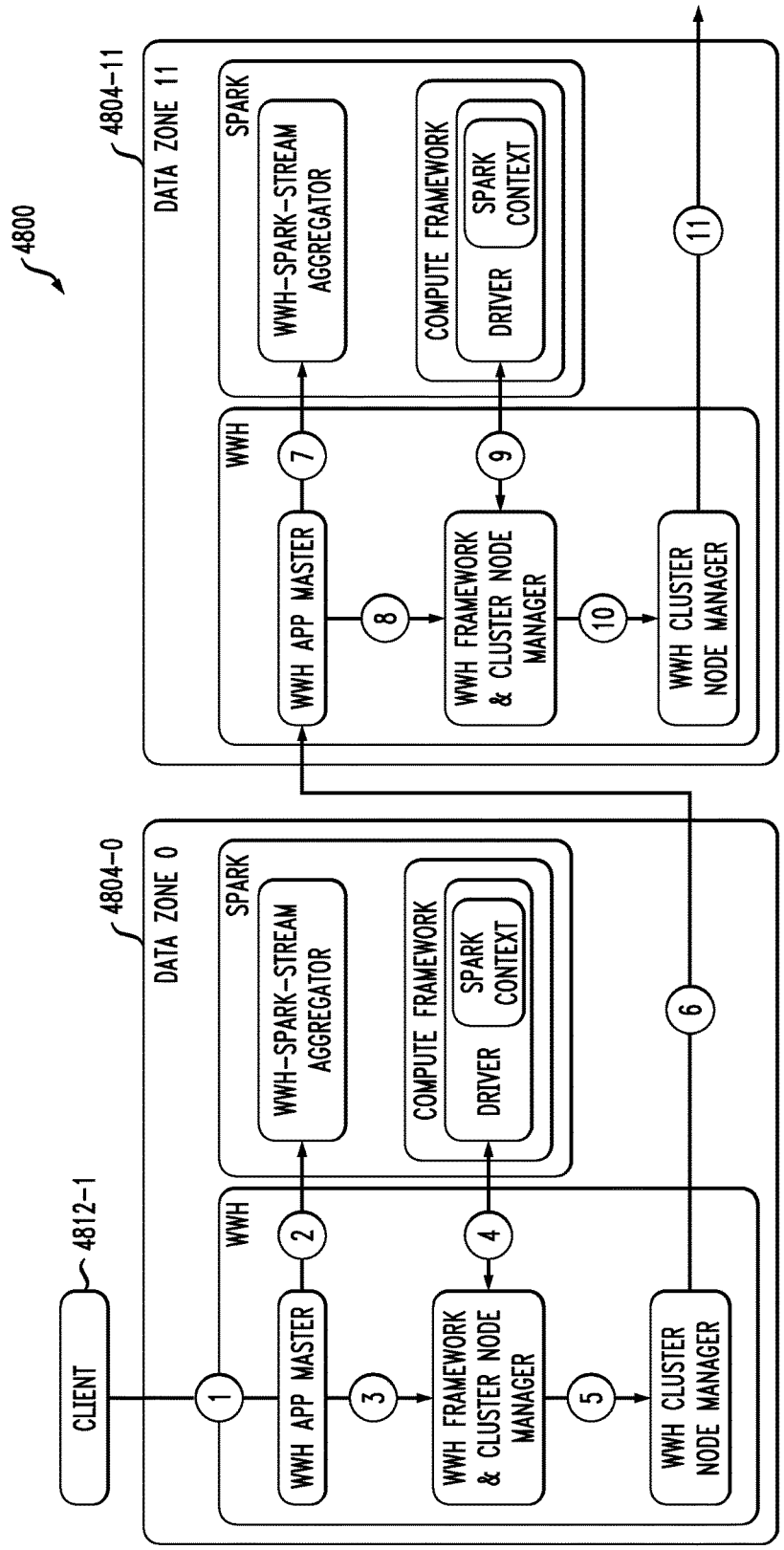

Further recursion functionality is illustrated in information processing system 4800 of FIG. 48, which extends the operation of the FIG. 47 embodiment to additional processing operations labeled 10 and 11. The configuration of system 4800 is generally the same as that of system 4700, and includes clusters 4804-0 and 4804-11 associated with respective data zones denoted Data Zone 0 and Data Zone 11, and a client 4812-1 in communication with cluster 4804-0. The additional processing operations in this embodiment are more particularly as follows:

10. The WWH application master of cluster 4804-11 starts a second WWH framework and cluster node manager within cluster 4804-11. This WWH framework and cluster node manager becomes the remote client for remote computation of another lot stream being generated in another cluster and associated data zone not explicitly shown in the figure.

11. The second WWH framework and cluster node manager started by the WWH application master of cluster 4804-11 starts a remote Spark application in the other cluster and associated data zone which will in turn generate result lots as the computation is executed. This involves starting a WWH application master in the additional cluster, again illustrating the recursive nature of the process in the present embodiment.

The recursion illustrated in conjunction with the examples above can be carried on into further clusters and associated data zones as needed to complete the distributed streaming computations required by a given application.

Accordingly, a given WWH application master in a given cluster can generate one or more WWH framework and cluster node managers each one of which can become the remote client for a computation in a remote data zone which can in turn start other WWH framework and cluster node managers that become remote clients for computations in other remote data zones.

Recursion can similarly occur in each of the clusters and associated data zones of a given system implementation. For example, each of the clusters can create additional multiple WWH framework and cluster node managers that become remote clients of Spark applications in remote data zones.

When a given WWH application master of one of the clusters starts one or more WWH framework and cluster node managers that become remote clients of remote data zones, this in effect creates one or more additional nodes and possibly one or more additional levels in a corresponding WW-SCG characterizing the distributed computations.

Aggregation of multiple result lots into an output lot stream can be performed in a manner analogous to that previously described for the case of aggregation of result batches in system 3700 of FIG. 37. For example, result lots received by first and second WWH framework and cluster node managers in a given cluster can be aggregated using a WWH Spark stream aggregator of that cluster. The WWH Spark stream aggregator illustratively performs the previously-described tasks associated with approximately and eventually synchronizing the result lots to create an aggregated lot stream.

In some embodiments utilizing multiple distinct clouds, distributed computations are initiated across a plurality of data processing clusters associated with respective data zones, and local processing results of the distributed computations from respective ones of the data processing clusters are combined. The data processing clusters are configured to perform respective portions of the distributed computations by processing data local to their respective data zones utilizing at least one local data structure configured to support at least one computational framework. A first one of the data processing clusters is implemented in a first cloud of a first type provided by a first cloud service provider, and at least a second one of the data processing clusters is implemented in a second cloud of a second type different than the first type, provided by a second cloud service provider different than the first cloud service provider. The local processing results of the distributed computations from respective ones of the data processing clusters are combined utilizing a global data structure configured based at least in part on the at least one local data structure in order to produce global processing results of the distributed computations.

A given embodiment utilizing multiple distinct clouds of different types can also be implemented using multiple computational frameworks in the manner previously described in conjunction with FIGS. 41-48. Thus, different computational frameworks can be utilized in different ones of the multiple clouds. Alternatively, a single common computational framework can be utilized in all of the multiple clouds.

Illustrative embodiments advantageously implement world wide scale computations in which the distributed computations do not need to execute on a homogenous infrastructure even when executing in a cloud environment, regardless of whether utilizing Infrastructure-as-a-Service (IaaS), Platform-as-a-Service (PaaS) or any other type of execution environment, or whether executing on a private cloud, public cloud, hybrid cloud, or using any other cloud infrastructure ownership or business model.

The different clouds in a given multiple cloud embodiment can not only utilize different computational frameworks, but also different communication protocols and interfaces to distribute, initiate, monitor and manage computing, different APIs, micro-services or other mechanisms to allocate, monitor, manage and de-allocate resources across data zones, different resource negotiators, schedulers or other resource managers to control allocation and de-allocation of resources, and different types of resources including virtual machines, containers or other units of resource allocation.

Multiple cloud embodiments utilize global data structures similar to those previously described herein for Spark distributed computation and multiple framework distributed computation. The global data structures are extended in a straightforward manner to permit association of different clouds in different data zones with different portions of a given distributed computation.

Decisions regarding the particular clouds to be used for the different portions of the distributed computation can be based on factors such as accessibility of the data, availability of certain services, and amounts of bandwidth available for communication. For example, certain data may only be accessible via a specific cloud IaaS, may require particular analytics functionality only available in certain clouds, or may require large amounts of bandwidth to move from one cloud to another.

Illustrative embodiments of distributed computing systems implemented using multiple distinct clouds will now be described with reference to FIGS. 49-57.

Figure 49:
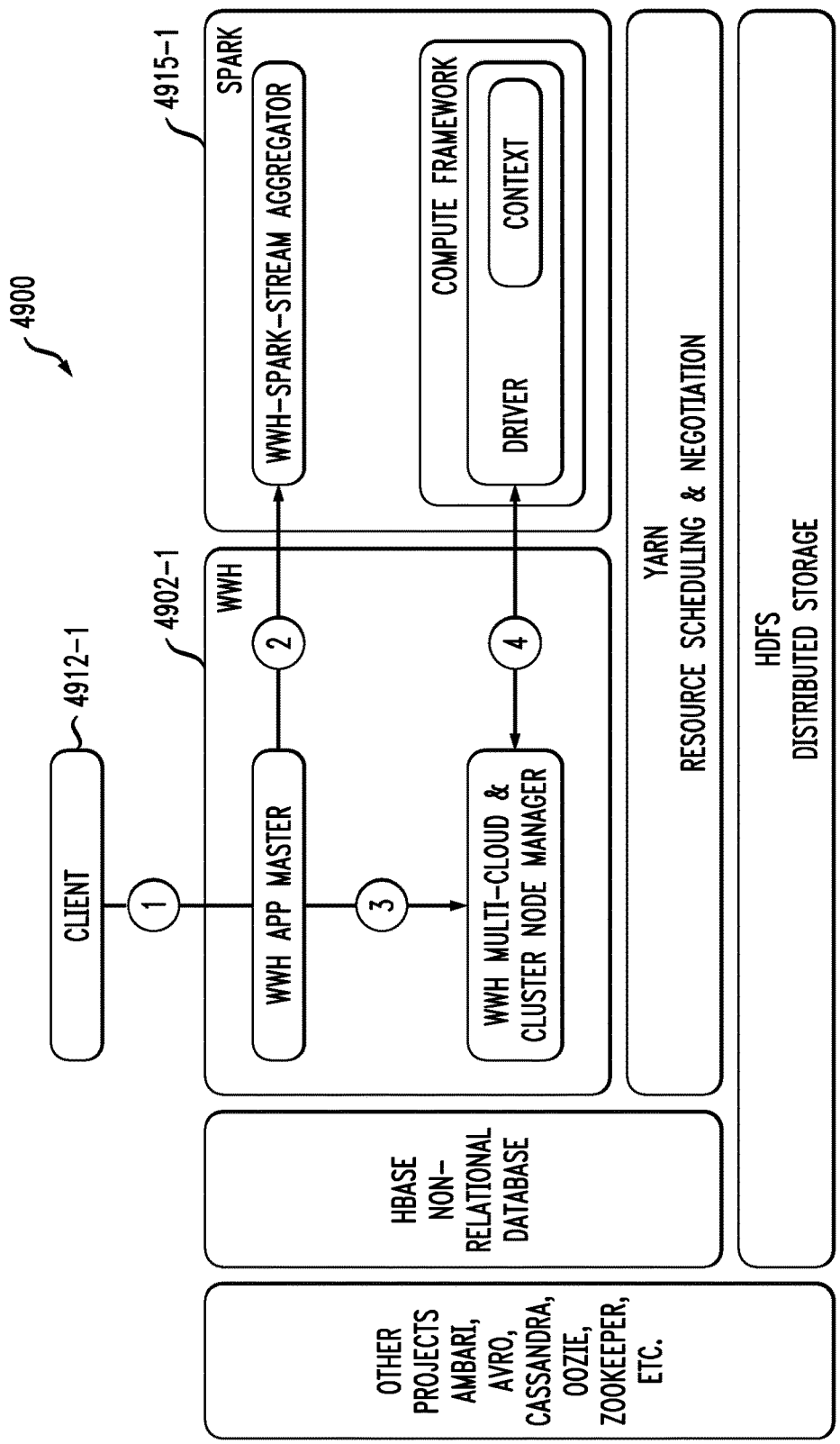

Referring initially to FIG. 49, an information processing system 4900 includes a WWH component 4902-1, a client 4912-1 and a Spark component 4915-1. The WWH component 4902-1 and Spark component 4915-1 are assumed to be implemented on a single data processing cluster associated with a particular data zone. The WWH component 4902-1 and Spark component 4915-1 are configured in substantially the same manner as the corresponding components of system 4600 of FIG. 46, except that the WWH component 4902-1 implements a WWH multi-cloud and cluster node manager. The WWH multi-cloud and cluster node manager determines an appropriate cloud for execution of a portion of a distributed computation, in a manner analogous to the determining of an appropriate computational framework for execution of a portion of a distributed computation as described in conjunction with FIG. 46. The operations labeled 1 through 4 in system 4900 of FIG. 49 are therefore similar to the corresponding operations of system 4600 of FIG. 46 but involve determining an appropriate cloud rather than determining an appropriate computational framework.

Figure 50:
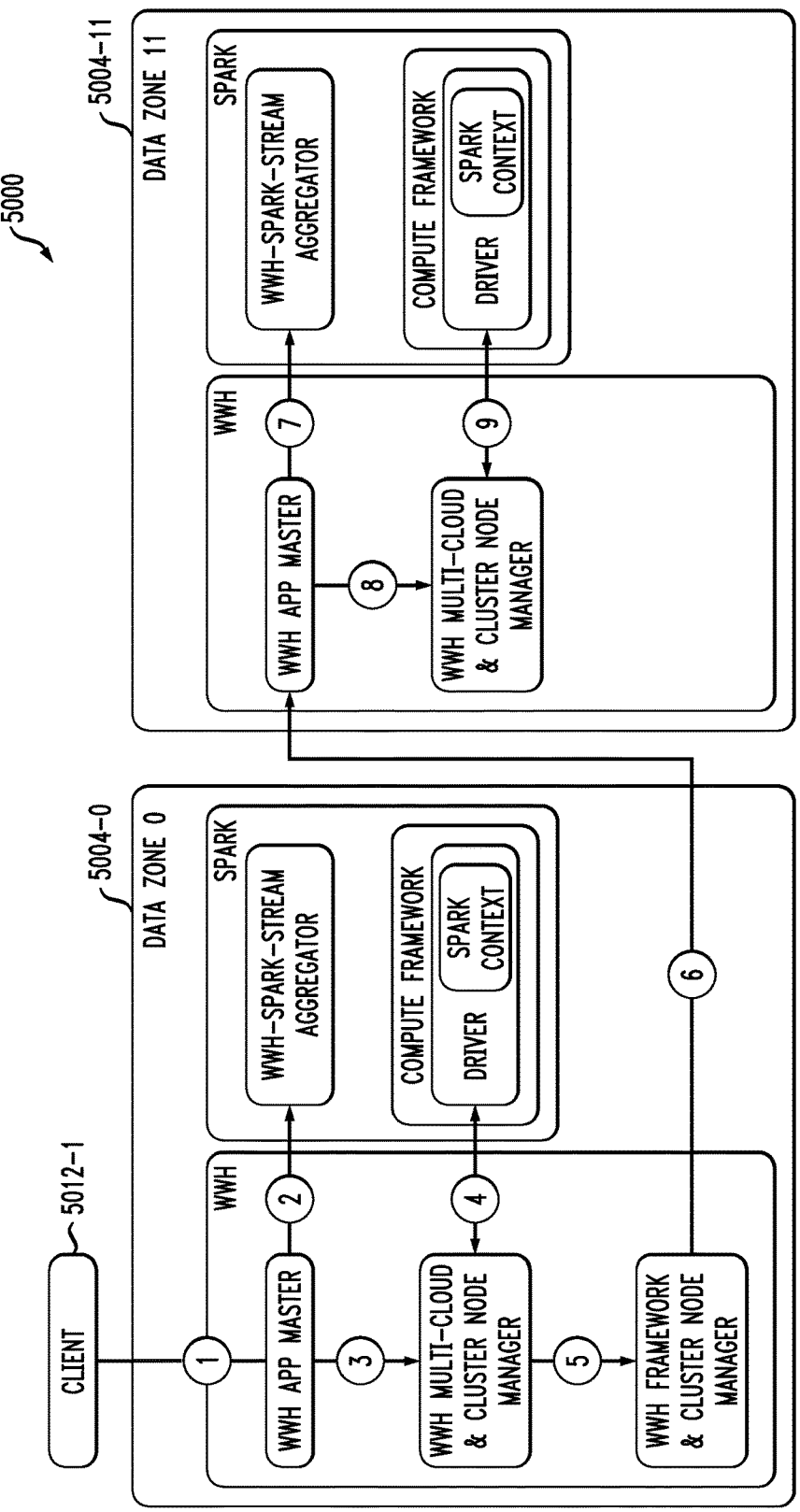

An extension of the single-cluster embodiment of FIG. 49 to multiple clusters is illustrated in information processing system 5000 of FIG. 50. In this embodiment, system 5000 comprises a plurality of distributed data processing clusters 5004-0 and 5004-11 associated with respective data zones denoted Data Zone 0 and Data Zone 11. The system 5000 further comprises a client 5012-1 that is in communication with the cluster 5004-0. Each of the clusters 5004-0 and 5004-11 includes WWH and Spark components similar to those previously described in conjunction with the embodiment of FIG. 49. The system 5000 otherwise operates in a manner similar to that of system 4700 of FIG. 47.

Figure 51:
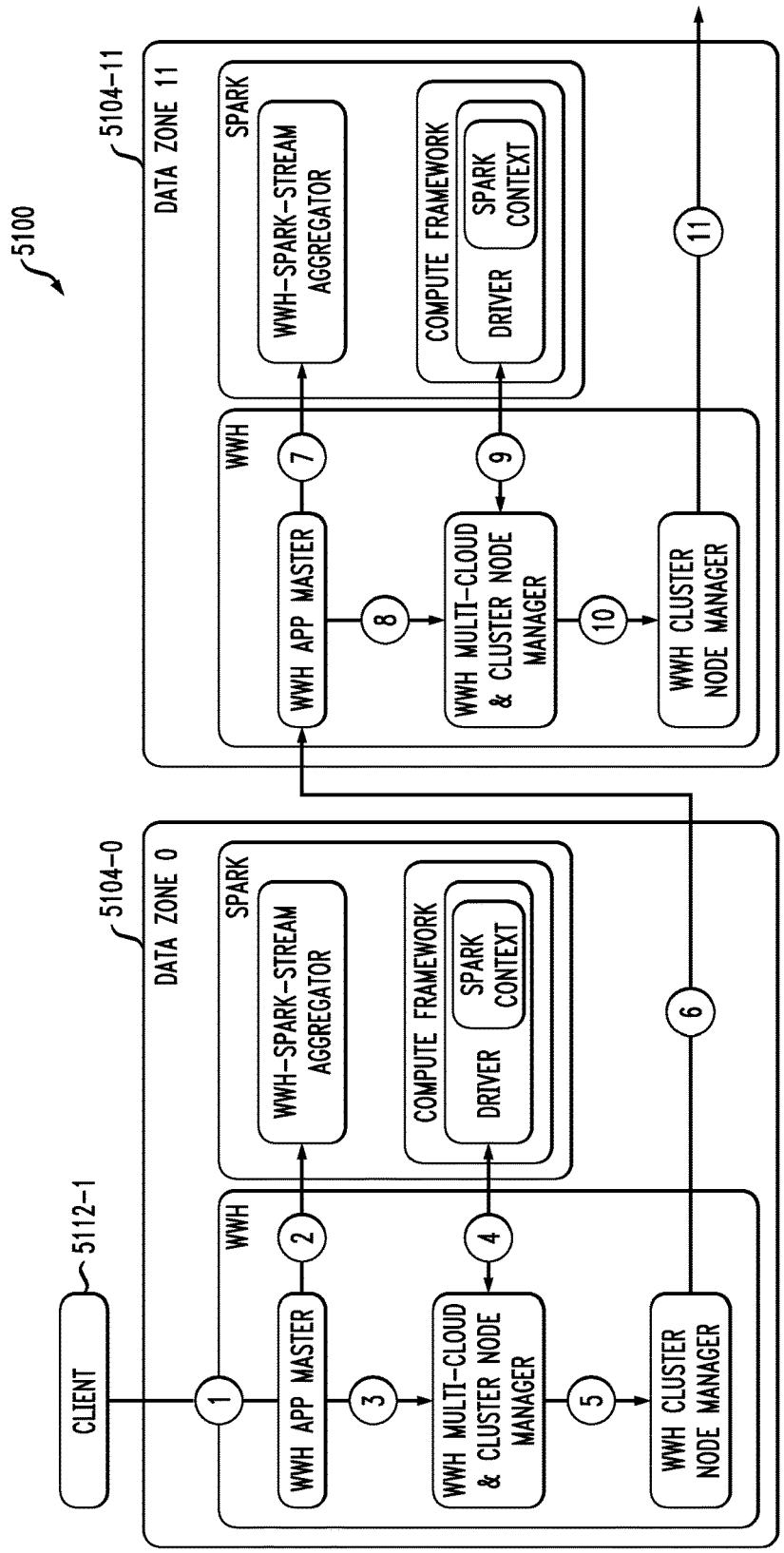

Further recursion functionality is illustrated in information processing system 5100 of FIG. 51, which extends the operation of the FIG. 50 embodiment to additional processing operations labeled 10 and 11. The configuration of system 5100 is generally the same as that of system 5000, and includes clusters 5104-0 and 5104-11 associated with respective data zones denoted Data Zone 0 and Data Zone 11, and a client 5112-1 in communication with cluster 5104-0. The additional processing operations in this embodiment are similar to those previously described in conjunction with system 4800 of FIG. 48.

The WWH multi-cloud and cluster node managers in the illustrative embodiments of FIGS. 49, 50 and 51 are configured to determine the particular cloud that is best suited to perform the computation to be executed. For example, a given WWH multi-cloud and cluster node manager can be configured to select a particular cloud IaaS and associated scheduler that best meets the requirements of the computation. This determination is illustratively based on factors such as characteristics and availability of various clouds and characteristics and availability of the data to be processed as well as principles of data locality. Accordingly, the given WWH multi-cloud and cluster node manager can orchestrate the selection of the most appropriate cloud IaaS and scheduler based on multiple criteria relating to the computation in order to most effectively execute the computation within the system.

The illustrative embodiments to be described below in conjunction with FIGS. 52 through 57 are configured to support both multiple clouds and multiple computational frameworks for distributed computations.

Figure 52:
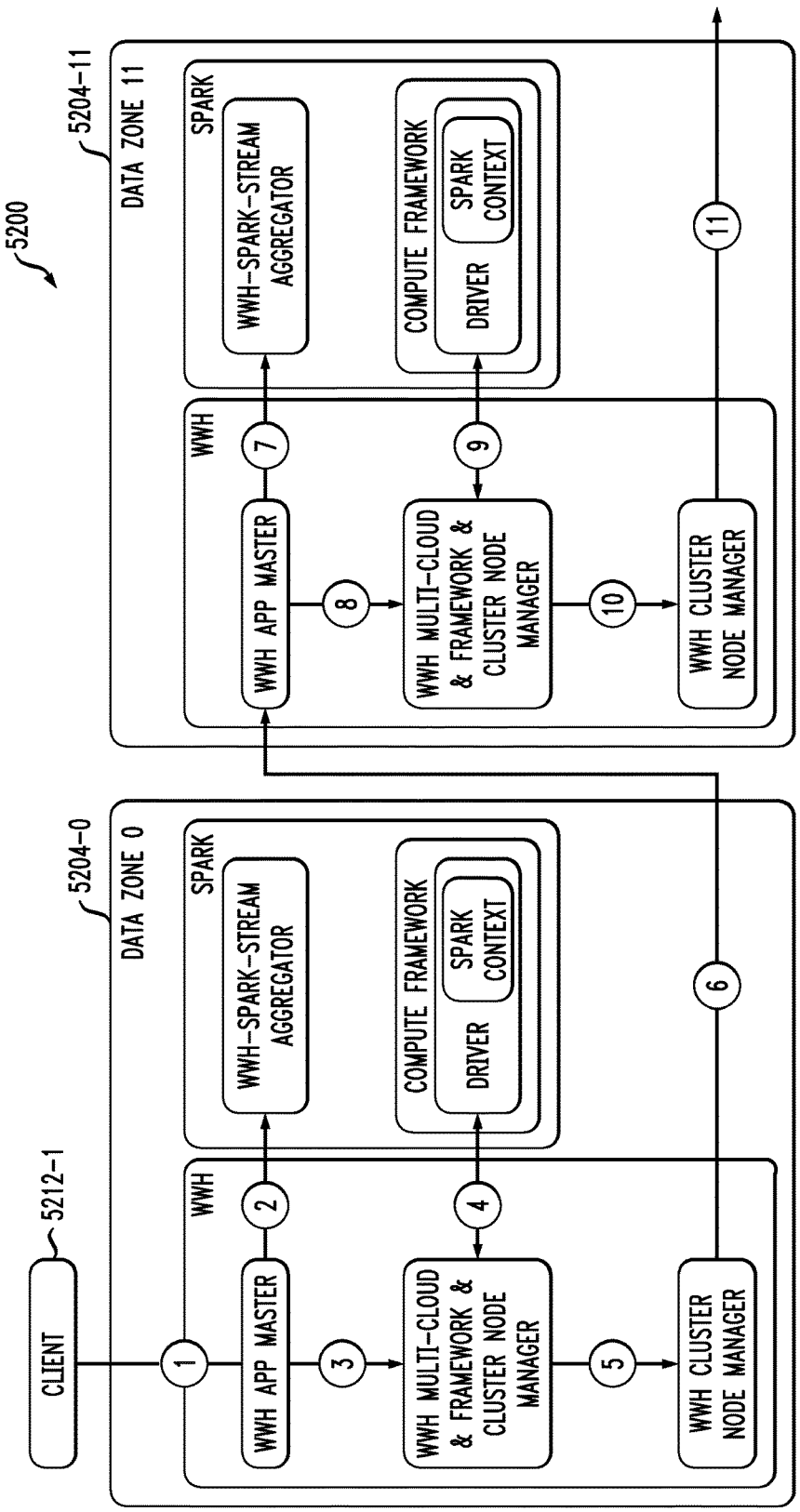

FIG. 52 shows an information processing system 5200 with multi-cloud and multi-framework functionality. The configuration of system 5200 is generally the same as that of system 5100, and includes clusters 5204-0 and 5204-11 associated with respective data zones denoted Data Zone 0 and Data Zone 11, and a client 5212-1 in communication with cluster 5204-0. The processing operations in this embodiment are similar to those previously described in conjunction with FIGS. 49-51. However, in place of the WWH multi-cloud and cluster node managers of FIGS. 49-51, the system 5200 comprises respective WWH multi-cloud, multi-framework and cluster node managers. These managers are configured to determine both an appropriate cloud and an appropriate computational framework for a given computation using techniques similar to those described above. For example, when multiple decisions need to be made by a WWH multi-cloud, multi-framework and cluster node manager, such as computational framework and cloud IaaS, some of the requirements imposed by the choice of framework may also influence the choice of cloud IaaS and vice versa.

In such arrangements, the WWH multi-cloud, multi-framework and cluster node manager expands the decision criteria and decision process to determine how the several requirements can be met in the best manner possible, seeking to satisfy as many as possible simultaneously. For example, the choice of the cloud IaaS may dictate the choice of the computing framework, as the selected cloud may only support a specific set of computing frameworks.

Examples of different multi-cloud and multi-framework system configurations are shown in FIGS. 53-57. It is to be appreciated that these are only examples, and numerous other combinations of multiple clouds and multiple computational frameworks can be used in implementing distributed computations in other embodiments.

Figure 53:
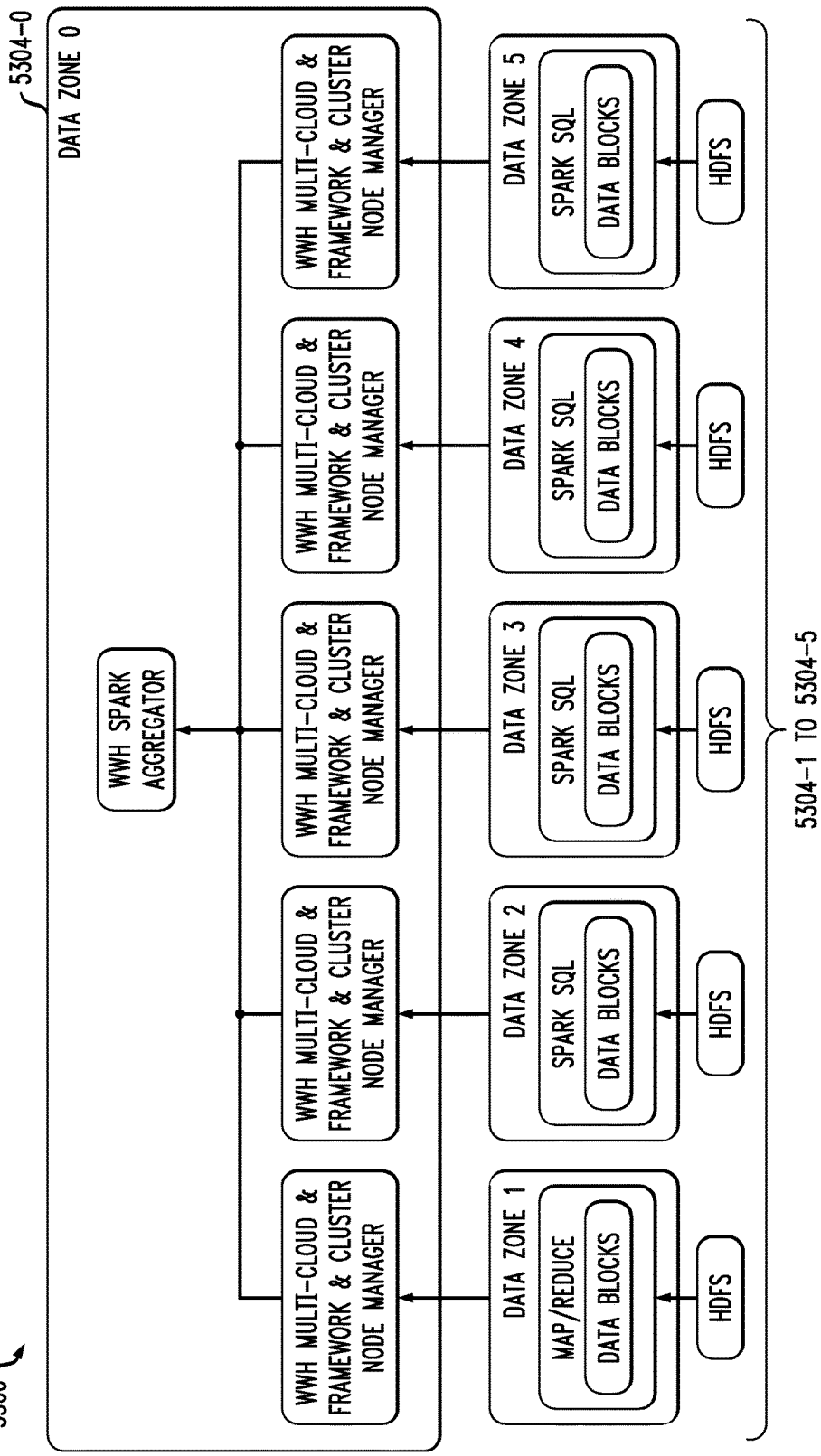

FIG. 53 shows an information processing system 5300 comprising a plurality of data processing clusters including a cluster 5304-0 associated with a data zone denoted Data Zone 0 and additional clusters 5304-1 through 5304-5 associated with respective additional data zones denoted Data Zone 1 through Data Zone 5. The cluster 5304-0 includes a plurality of WWH multi-cloud, multi-framework and cluster node managers each initiating a computation in a corresponding one of the additional data zones Data Zone 1 through Data Zone 5. The cluster 5304-0 further includes a WWH Spark aggregator that aggregates local processing results of the additional clusters 5304-1 through 5304-5.

In this embodiment, cluster 5304-1 in Data Zone 1 implements a MapReduce framework and clusters 5304-2 through 5304-5 in respective Data Zones 2 through 5 each implement a Spark SQL framework. Each of the frameworks operates on data blocks from an associated HDFS storage system within its corresponding data zone.

Figure 54:
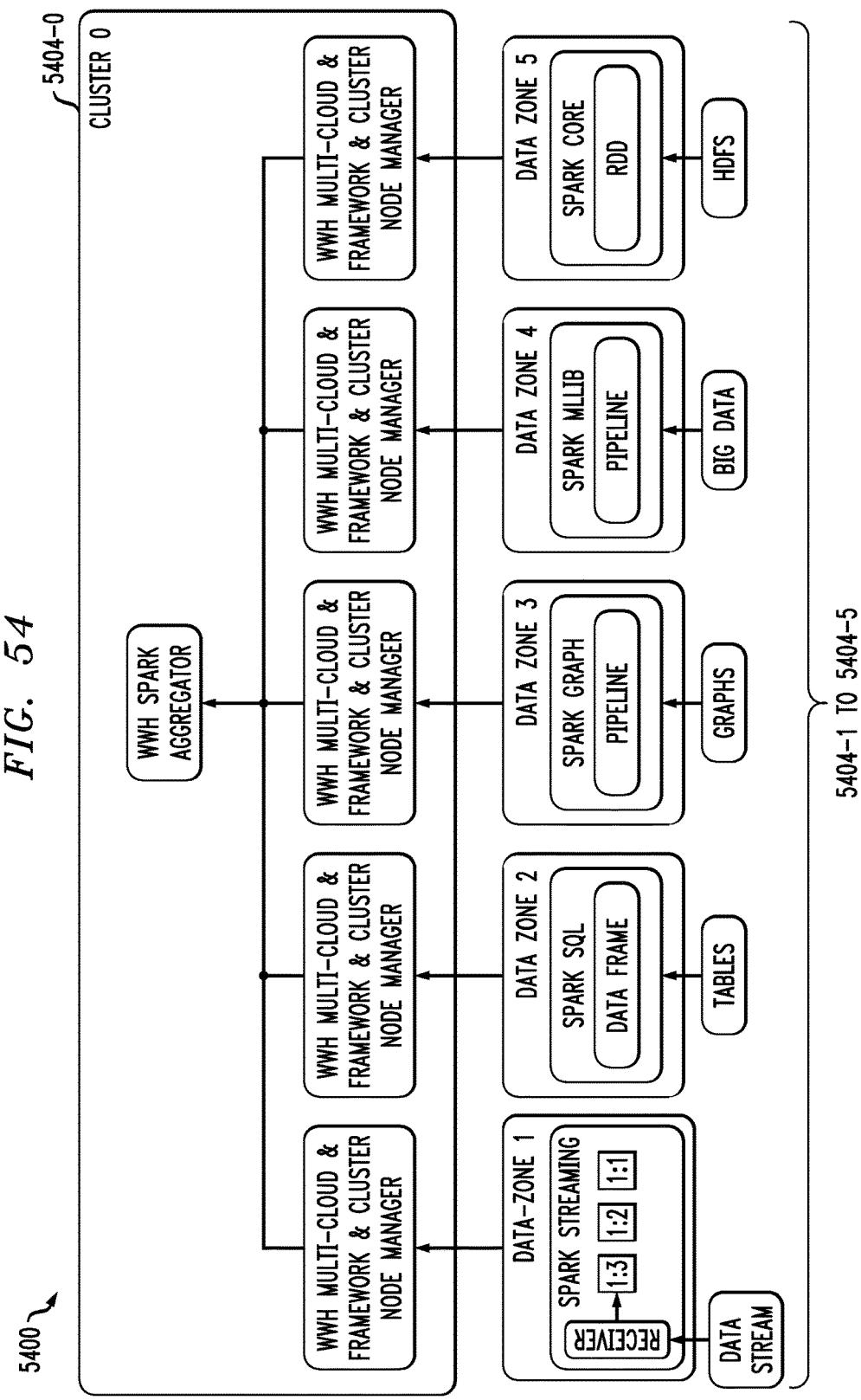

FIG. 54 shows an information processing system 5400 comprising a plurality of data processing clusters including a cluster 5404-0 associated with Data Zone 0 and additional clusters 5404-1 through 5404-5 associated with respective Data Zone 1 through Data Zone 5. The cluster 5404-0 includes a plurality of WWH multi-cloud, multi-framework and cluster node managers each initiating a computation in a corresponding one of Data Zone 1 through Data Zone 5. The cluster 5404-0 further includes a WWH Spark aggregator that aggregates local processing results of the additional clusters 5404-1 through 5404-5.

In this embodiment, cluster 5404-1 in Data Zone 1 implements a Spark streaming framework and clusters 5404-2 through 5404-5 in respective Data Zones 2 through 5 implement respective Spark SQL, Spark GraphX, Spark MLlib and Spark Core frameworks. Each of the frameworks utilizes different data abstractions to represent its data and operates on data in different forms. More particularly, the Spark streaming framework in cluster 5404-1 operates on a data stream, while the Spark SQL, Spark GraphX, Spark MLlib and Spark Core frameworks in respective clusters 5404-2 through 5404-5 operate on respective tables, graphs, Big Data files and HDFS files.

Figure 55:
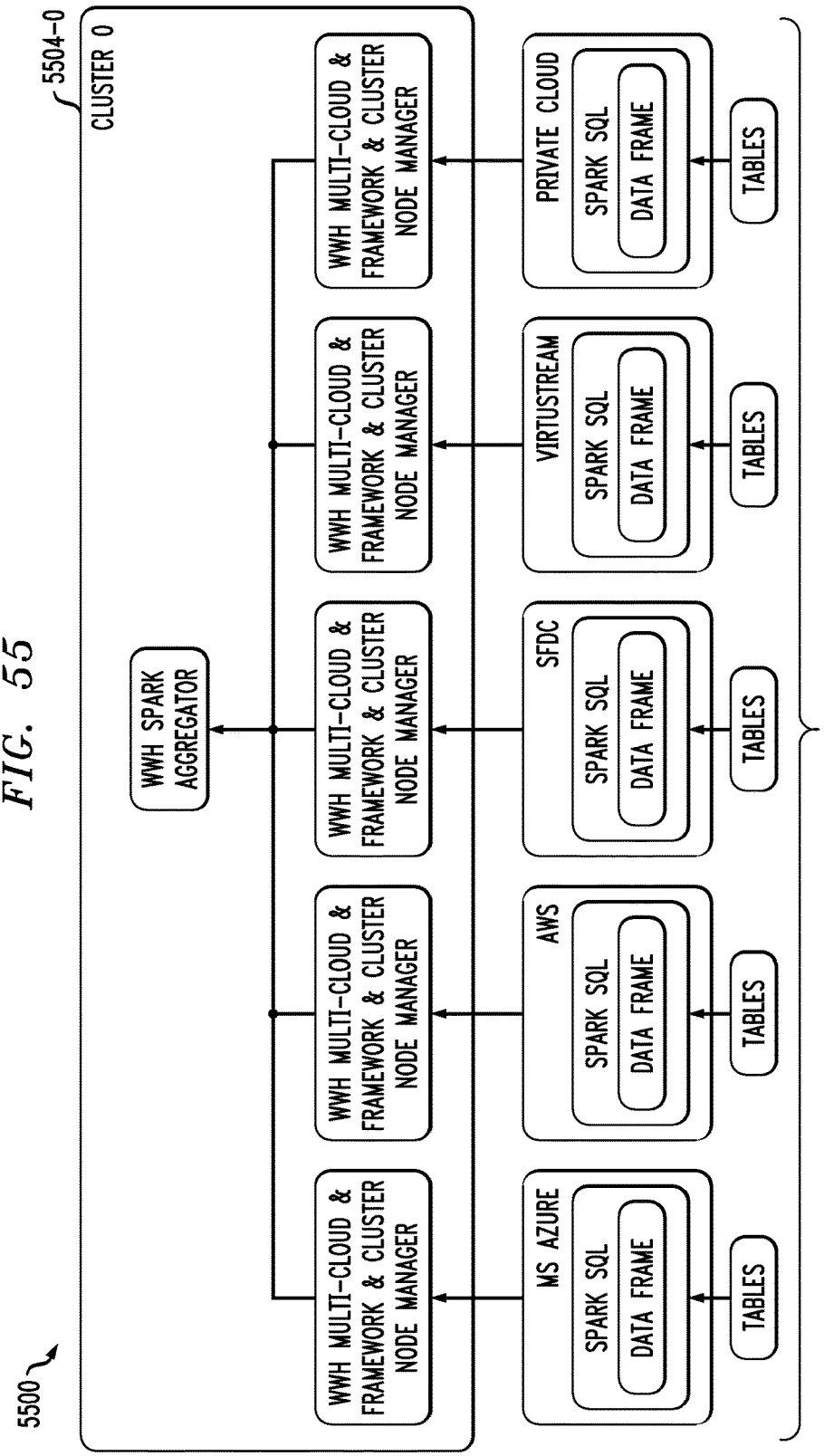

Another example of a multi-cloud, multi-framework embodiment is shown in FIG. 55. As illustrated in the figure, an information processing system 5500 comprises a plurality of data processing clusters including a cluster 5504-0 also denoted Cluster 0 and additional clusters 5504-1 through 5504-5 associated with respective distinct clouds including an MS Azure cloud, an AWS cloud, an SFDC ("salesforce dot com") cloud, a Virtustream cloud and a private cloud. Each of the clusters 5504 may additionally be associated be a separate data zone, although such data zones are not explicitly denoted in the figure.

The cluster 5504-0 includes a plurality of WWH multi-cloud, multi-framework and cluster node managers each initiating a computation in a corresponding one of the clusters 5504-1 through 5504-5. The cluster 5504-0 further includes a WWH Spark aggregator that aggregates local processing results of the additional clusters 5504-1 through 5504-5.

In this embodiment, each of the cluster 5504-1 through 5504-5 implements a Spark SQL framework utilizing a WW-DataFrame abstraction based on data frames to process input data comprising tables.

Figure 56:
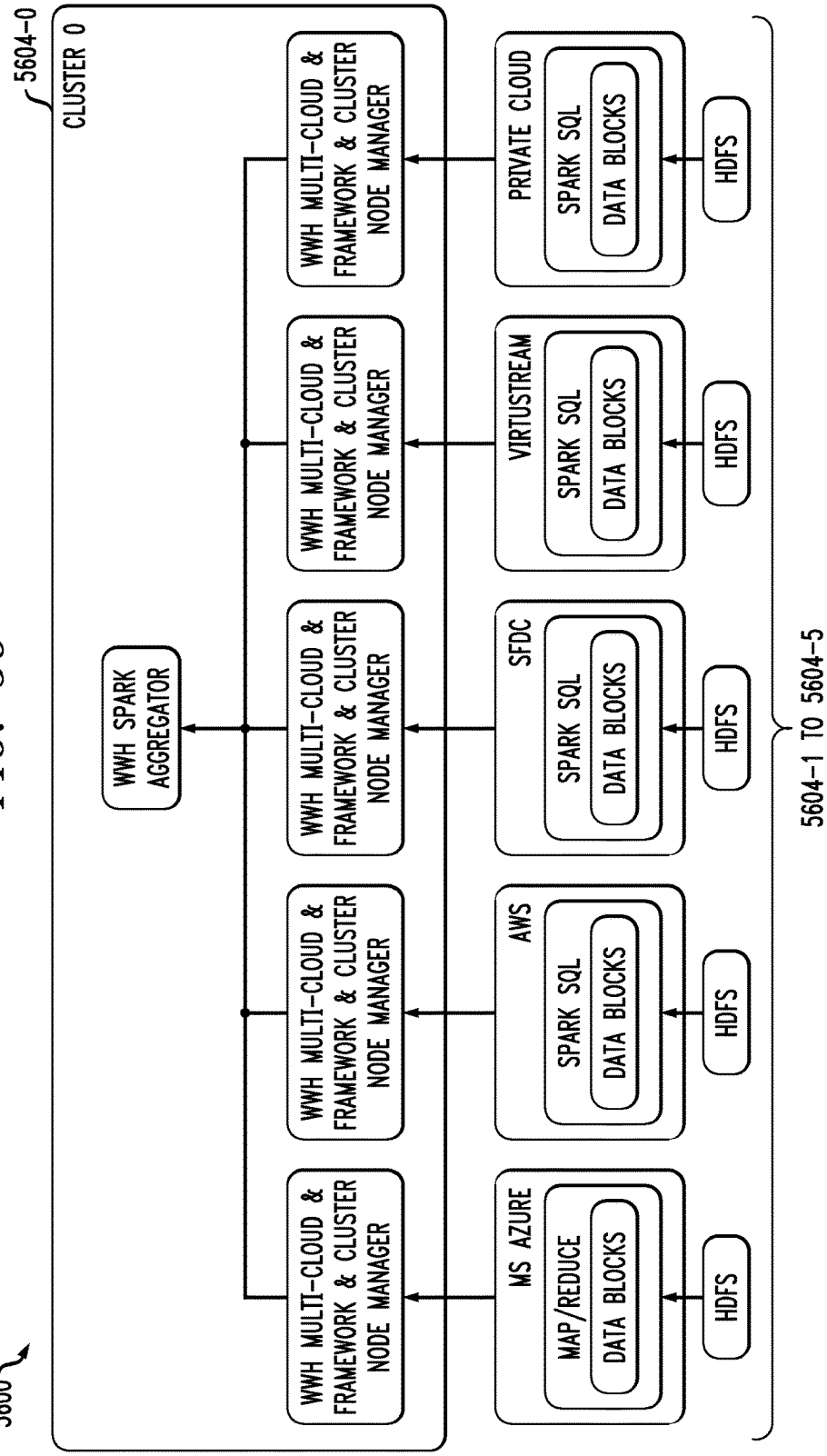

FIG. 56 shows an information processing system 5600 that includes clusters 5604-0 through 5604-5 arranged in a manner similar to that of the FIG. 55 embodiment, but with the cluster 5604-1 implementing a MapReduce framework and clusters 5604-2 through 5604-5 each implementing a Spark SQL framework. Each of these frameworks operates on data blocks from an associated HDFS storage system within its corresponding cloud. The clouds may be associated with respective data zones.

Figure 57:
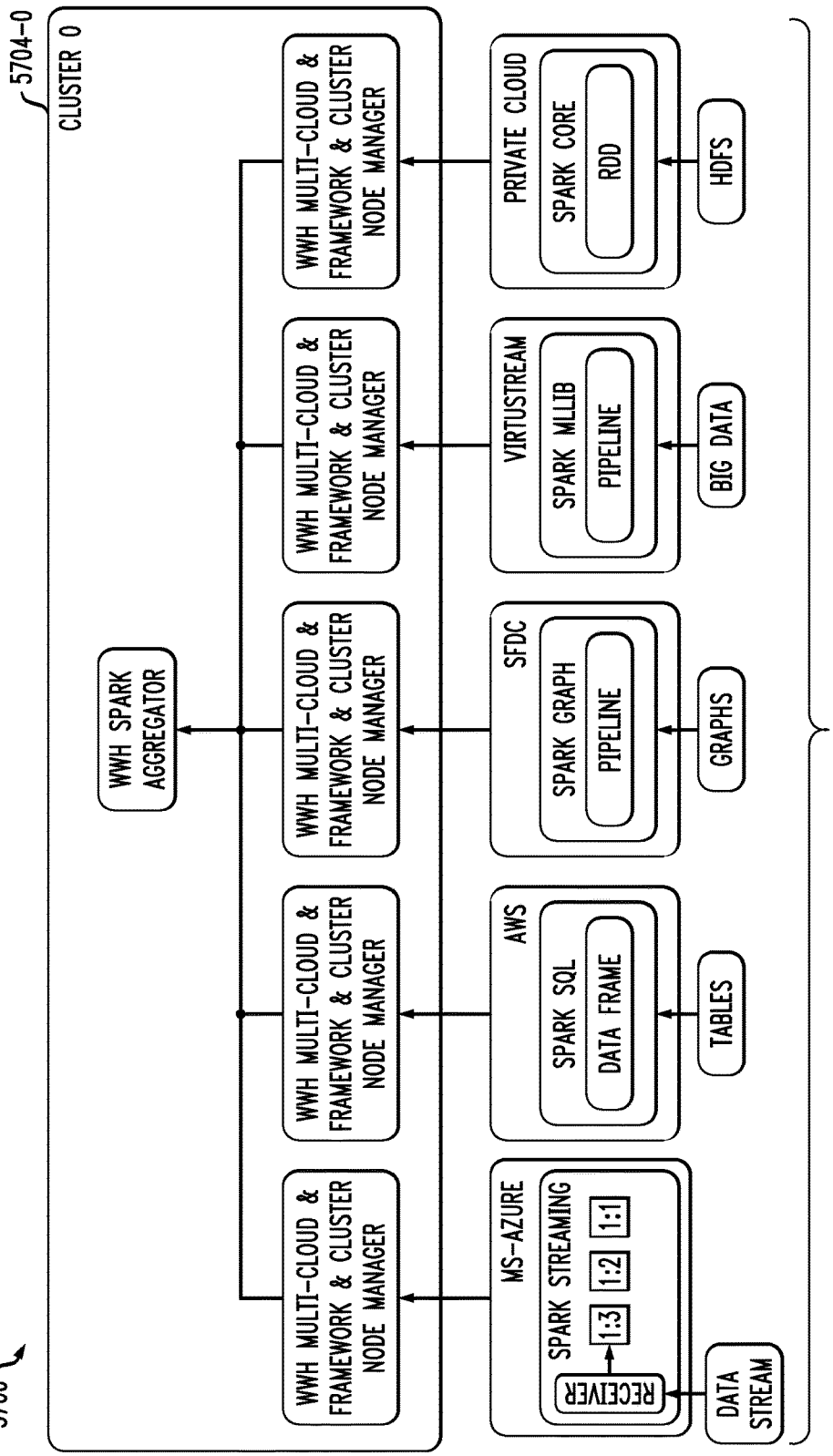

FIG. 57 shows an information processing system 5700 that includes clusters 5704-0 through 5704-5 arranged in a manner similar to that of the embodiments of FIGS. 55 and 56, but with the cluster 5704-1 implementing a Spark streaming framework and clusters 5704-2 through 5704-5 implementing respective Spark SQL, Spark GraphX, Spark MLlib and Spark Core frameworks. Each of the frameworks utilizes different data abstractions to represent its data and operates on data in different forms. More particularly, the Spark streaming framework in cluster 5704-1 operates on a data stream, while the Spark SQL, Spark GraphX, Spark MLlib and Spark Core frameworks in respective clusters 5704-2 through 5704-5 operate on respective tables, graphs, Big Data files and HDFS files. Again, the various clouds shown in the figure may be associated with respective data zones.

As indicated previously, these and other illustrative embodiments herein can be configured to leverage a WWH catalog in distributing computations among multiple clusters associated with respective data zones. For example, the WWH catalog can be used to manage metadata relating to specific details and requirements on the data abstraction used at each data zone as well as the mapping preferences and recommendations for each data abstraction and the best computational framework to be utilized for its analysis. The metadata managed using the WWH catalog can additionally or alternatively include information such as specific details and requirements that a given computing framework imposes on the infrastructure to be used, and specific details and requirements on the different cloud configurations and their respective IaaS, scheduler and resource negotiator requirements, as well as information characterizing the particular computational framework to be used.

Illustrative embodiment support computing framework heterogeneity in that each of the data zones and its associated cluster can use a different computing framework.

Also, cloud infrastructure heterogeneity is supported, in that each of the data zones and its associated cluster can use different cloud IaaS arrangements or different schedulers, resource negotiators and other components.

Moreover, each of the data zones and their associated clusters can represent their data lots in a different manner, thereby providing data abstraction diversity within a given distributed computing system.

An example of a distributed system that can utilize multiple distinct data abstractions as disclosed herein is a system in which data comes into each data zone at different times, from different groups of researchers, all doing similar types of research without realizing that the data generated in an isolated manner can actually generate additional insight when analyzed together. Without any synchronization during data creation time, different data zones end up with data represented in different ways. Such a system can be configured in accordance with techniques disclosed herein to perform accurate and efficient distributed computations over such data using different data abstractions.

Another example is a distributed system in which IoT sensors from different device manufacturers generate data in different formats. Even if they generate data on standardized formats, there are usually several acceptable data formats or different version of these formats for certain data types. Again, such a system can be configured in accordance with techniques disclosed herein to perform accurate and efficient distributed computations over such data using different data abstractions. This is achieved without the need for the different data zones to agree on a particular standard data format. Also, there is no need for any data zone to perform a complex Extract, Transform and Load (ETL) process or other similar process in order to put its data in a different format for computation.

A further example is a system in which computing infrastructure capability differs markedly between data zones. More particularly, a system may include a data zone in which data is generated as a data stream and managed through an IoT gateway, and another data zone in which historical data is stored in a data warehouse. The amount and type of computation that can be done in the IoT gateway fundamentally differs from the amount of computation that can or needs to be done on the warehouse. Illustrative embodiments can be configured to easily accommodate these and other differences in computing infrastructure capabilities between multiple data zones of a given system. Similar embodiments can be configured to accommodate differences in cloud requirements and characteristics between data zones.

The foregoing are only examples, and numerous other applications can be implemented using multiple computational frameworks and/or multiple clouds for distributed computing as disclosed herein.

The particular processing operations and other system functionality described in conjunction with the diagrams of FIGS. 1 through 57 are presented by way of illustrative example only, and should not be construed as limiting the scope of the invention in any way. Alternative embodiments can use other types of processing operations for implementing distributed computations in multi-cluster distributed data processing platforms. For example, the ordering of the process steps may be varied in other embodiments, or certain steps may be performed concurrently with one another rather than serially. Also, one or more of the process steps may be repeated periodically for different types of computation functionality, or multiple instances of the described processes can be performed in parallel with one another on different sets of distributed data processing clusters within a given information processing system.

Scalable distributed computation functionality such as that described in conjunction with the diagrams of FIGS. 1 through 57 can be implemented at least in part in the form of one or more software programs stored in memory and executed by a processor of a processing device such as a computer or server within a distributed data processing platform. As will be described below, a memory or other storage device having executable program code of one or more software programs embodied therein is an example of what is more generally referred to herein as a "processor-readable storage medium."

It is apparent from the above that illustrative embodiments can be configured to perform Big Data analytics processing and other types of distributed computations using a multitude of disparate data sources, many of which cannot be consolidated for a variety of reasons, including concerns with regards to data residency, data sovereignty, data ownership, data anonymization, data governance, or the raw size of the data which puts severe constraints on the network bandwidth and speed requirements for data transmission.

For example, with regard to geographic limits on data movement, some data types such as genetic records cannot be shared across geographic borders due to laws, regulations or even tax consequences. Illustrative embodiments can be configured to run the analysis locally but to share the results, thereby more readily complying with these regulations while also allowing for the processing of the data to be developed, coordinated, and handled centrally as a single clustered system.

As another example, with regard to data anonymization, data may include sensitive personal data for which potential disclosure should be limited wherever possible. Thus, it is highly undesirable to collect all the data in a single location that is open to misuse or security breach. Illustrative embodiments can be configured to allow a first level of analysis to occur locally within a given distributed data processing cluster, with only anonymized and filtered data centralized for follow-on analysis.

In addition, with regard to data ownership, in many cases companies, governments, and other public and private institutions may not wish to share raw data for a variety of reasons, including disclosure risk, competitive advantage, or necessary permissions for sharing the data. Illustrative embodiments allow such data to be processed "in place" within a distributed data processing cluster controlled by the data owner, thereby permitting limited and controlled access to the data for analytics purposes without undermining owner control over other possible uses of the data.

Accordingly, the illustrative embodiments provide significant advantages in these and other cases in which it is not feasible to centralize the data for analytics processing and other types of processing.

Again, the use of particular frameworks as part of a WWH platform is by way of illustrative example only. Numerous alternative frameworks can be utilized as part of a given WWH platform, including in some embodiments any framework supported by YARN, as well as other frameworks in non-YARN embodiments.

The multi-cluster distributed data processing platforms of illustrative embodiments disclosed herein provide significant advantages relative to conventional arrangements.

As mentioned previously, illustrative embodiments move the computation instead of moving the data and create an abstraction to distributed Big Data in order to overcome the drawbacks of conventional systems, providing significant advantages in terms of both performance and privacy, and related advantages such as the facilitation of GRC, as outlined in detail elsewhere herein.

It is to be appreciated that the particular types of system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as WWH nodes 102 and distributed data processing clusters 104, or portions thereof, can be implemented as respective tenants of such a multi-tenant environment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of a given distributed data processing cluster or associated data processing node in a particular embodiment are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, multi-cluster distributed data processing platforms, application frameworks, processing nodes, local and remote data resources and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    initiating distributed computations across a plurality of data processing clusters associated with respective data zones; and
    combining local processing results of the distributed computations from respective ones of the data processing clusters;
    each of the data processing clusters being configured to process data from a data source of the corresponding data zone using a local data structure and an associated computational framework of that data processing cluster;
    a first one of data processing clusters utilizing a first local data structure configured to support a first computational framework; and
    at least a second one of the data processing clusters utilizing a second local data structure different than the first local data structure and configured to support a second computational framework different than the first computational framework;
    wherein at least one of the data processing clusters is configured in accordance with a Spark batch framework and one or more other ones of the data processing clusters are configured in accordance with a Spark streaming framework;
    wherein the Spark batch framework implements one or more batch mode extensions comprising at least one of a Spark SOL extension, a Spark MLlib extension and a Spark GraphX extension;
    wherein the local processing results of the distributed computations from respective ones of the data processing clusters are combined utilizing a global data structure configured based at least in part on the local data structures in order to produce global processing results of the distributed computations; and
    wherein the method is performed by at least one processing device comprising a processor coupled to a memory.

2. The method of claim 1 wherein the first computational framework comprises a MapReduce framework and the second computational framework comprises a Spark framework.

3. The method of claim 2 wherein the Spark framework comprises one of a Spark batch framework and a Spark streaming framework.

4. The method of claim 1 wherein the Spark streaming framework is configured to support at least one of Spark iterative processing and Spark interactive processing.

5. The method of claim 1 wherein the plurality of data processing clusters associated with the respective data zones are organized in accordance with a global computation graph for performance of the distributed computations and wherein the global computation graph comprises a plurality of nodes corresponding to respective ones of the data processing clusters and further wherein the plurality of nodes are arranged in multiple levels each including at least one of the nodes.

6. The method of claim 5 wherein a particular one of the data processing clusters corresponding to a root node of the global computation graph initiates the distributed computations in accordance with a control flow that propagates from the root node toward leaf nodes of the global computation graph via one or more intermediate nodes of the global computation graph and wherein local processing results from respective ones of the data processing clusters corresponding to respective ones of the nodes propagate back from those nodes toward the root node.

7. The method of claim 5 wherein the global data structure is organized in levels with different levels of the global data structure corresponding to respective ones of the levels of the global computation graph and wherein a given one of the levels of the global data structure comprises local processing results generated by nodes of the corresponding level in the global computation graph.

8. A method comprising:
initiating distributed computations across a plurality of data processing clusters associated with respective data zones; and
combining local processing results of the distributed computations from respective ones of the data processing clusters;
each of the data processing clusters being configured to process data from a data source of the corresponding data zone using a local data structure and an associated computational framework of that data processing cluster;
a first one of data processing clusters utilizing a first local data structure configured to support a first computational framework; and
at least a second one of the data processing clusters utilizing a second local data structure different than the first local data structure and configured to support a second computational framework different than the first computational framework;
wherein the plurality of data processing clusters associated with the respective data zones are organized in accordance with a global computation graph for performance of the distributed computations and wherein the global computation graph comprises a plurality of nodes corresponding to respective ones of the data processing clusters and further wherein the plurality of nodes are arranged in multiple levels each including at least one of the nodes;
wherein the local processing results of the distributed computations from respective ones of the data processing clusters are combined utilizing a global data structure configured based at least in part on the local data structures in order to produce global processing results of the distributed computations;
wherein portions of the local processing results at a given level of the global data structure are approximately synchronized with one another as belonging to a common iteration of the global data structure; and
wherein the method is performed by at least one processing device comprising a processor coupled to a memory.

9. The method of claim 8 wherein the portions of the local processing results at the given level of the global data structure are determined to belong to the common iteration of the global data structure based at least in part on at least one of a time interval during which the portions of the local processing results were generated, a sequence number associated with generation of the portions of the local processing results and a time-stamp associated with generation of the portions of the local processing results.

10. The method of claim 1 wherein each of the data processing clusters generates its corresponding portion of the local processing results independently of and at least partially in parallel with the other data processing clusters.

11. The method of claim 1 wherein each of the data processing clusters generates its portion of the local processing results asynchronously with respect to portions of the local processing results generated by the other data processing clusters but the portions of the local processing results are eventually synchronized across the plurality of data processing clusters in conjunction with generation of the global processing results in accordance with the global data structure.

12. The method of claim 1 wherein the data processing clusters are implemented in one or more clouds of a particular type provided by a common cloud service provider.

13. A computer program product comprising a non-transitory processor-readable storage medium having stored therein program code of one or more software programs, wherein the program code when executed by at least one processing device causes said at least one processing device:
to initiate distributed computations across a plurality of data processing clusters associated with respective data zones; and
to combine local processing results of the distributed computations from respective ones of the data processing clusters;
each of the data processing clusters being configured to process data from a data source of the corresponding data zone using a local data structure and an associated computational framework of that data processing cluster;
a first one of data processing clusters utilizing a first local data structure configured to support a first computational framework; and
at least a second one of the data processing clusters utilizing a second local data structure different than the first local data structure and configured to support a second computational framework different than the first computational framework;
wherein at least one of the data processing clusters is configured in accordance with a Spark batch framework and one or more other ones of the data processing clusters are configured in accordance with a Spark streaming framework;
wherein the Spark batch framework implements one or more batch mode extensions comprising at least one of a Spark SOL extension, a Spark MLlib extension and a Spark GraphX extension; and
wherein the local processing results of the distributed computations from respective ones of the data processing clusters are combined utilizing a global data structure configured based at least in part on the local data structures in order to produce global processing results of the distributed computations.

14. The computer program product of claim 13 wherein the first computational framework comprises a MapReduce framework and the second computational framework comprises a Spark framework.

15. An apparatus comprising:
at least one processing device having a processor coupled to a memory;
wherein said at least one processing device is configured:
to initiate distributed computations across a plurality of data processing clusters associated with respective data zones; and
to combine local processing results of the distributed computations from respective ones of the data processing clusters;
each of the data processing clusters being configured to process data from a data source of the corresponding data zone using a local data structure and an associated computational framework of that data processing cluster;

a first one of data processing clusters utilizing a first local data structure configured to support a first computational framework; and at least a second one of the data processing clusters utilizing a second local data structure different than the first local data structure and configured to support a second computational framework different than the first computational framework;

wherein at least one of the data processing clusters is configured in accordance with a Spark batch framework and one or more other ones of the data processing clusters are configured in accordance with a Spark streaming framework;

wherein the Spark batch framework implements one or more batch mode extensions comprising at least one of a Spark SQL extension, a Spark MLlib extension and a Spark GraphX extension; and wherein the local processing results of the distributed computations from respective ones of the data processing clusters are combined utilizing a global data structure configured based at least in part on the local data structures in order to produce global processing results of the distributed computations.

16. The apparatus of claim 15 wherein the first computational framework comprises a MapReduce framework and the second computational framework comprises a Spark framework.

17. The computer program product of claim 13 wherein the plurality of data processing clusters associated with the respective data zones are organized in accordance with a global computation graph for performance of the distributed computations and wherein the global computation graph comprises a plurality of nodes corresponding to respective ones of the data processing clusters and further wherein the plurality of nodes are arranged in multiple levels each including at least one of the nodes.

18. The computer program product of claim 17 wherein a particular one of the data processing clusters corresponding to a root node of the global computation graph initiates the distributed computations in accordance with a control flow that propagates from the root node toward leaf nodes of the global computation graph via one or more intermediate nodes of the global computation graph and wherein local processing results from respective ones of the data processing clusters corresponding to respective ones of the nodes propagate back from those nodes toward the root node.

19. The apparatus of claim 15 wherein the plurality of data processing clusters associated with the respective data zones are organized in accordance with a global computation graph for performance of the distributed computations and wherein the global computation graph comprises a plurality of nodes corresponding to respective ones of the data processing clusters and further wherein the plurality of nodes are arranged in multiple levels each including at least one of the nodes.

20. The apparatus of claim 19 wherein a particular one of the data processing clusters corresponding to a root node of the global computation graph initiates the distributed computations in accordance with a control flow that propagates from the root node toward leaf nodes of the global computation graph via one or more intermediate nodes of the global computation graph and wherein local processing results from respective ones of the data processing clusters corresponding to respective ones of the nodes propagate back from those nodes toward the root node.

* * * * *